US012757269B2

(12) United States Patent
Pan

(10) Patent No.: US 12,757,269 B2
(45) Date of Patent: Oct. 6, 2026

(54) METHOD AND APPARATUS FOR RELAY USER EQUIPMENT (UE) ADDING MULTIPLE TARGET END UEs FOR UE-TO-UE RELAY COMMUNICATION IN A WIRELESS COMMUNICATION SYSTEM

(71) Applicant: ASUS Technology Licensing Inc., Taipei City (TW)

(72) Inventor: Li-Te Pan, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 285 days.

(21) Appl. No.: 18/776,972

(22) Filed: Jul. 18, 2024

(65) Prior Publication Data

US 2025/0031258 A1 Jan. 23, 2025

Related U.S. Application Data

(60) Provisional application No. 63/528,016, filed on Jul. 20, 2023, provisional application No. 63/541,228, filed on Sep. 28, 2023.

(51) Int. Cl.
*H04W 76/14* (2018.01)
*H04W 88/04* (2009.01)
*H04W 92/18* (2009.01)

(52) U.S. Cl.
CPC ............ *H04W 76/14* (2018.02); *H04W 88/04* (2013.01); *H04W 92/18* (2013.01)

(58) Field of Classification Search
None
See application file for complete search history.

(56) References Cited

U.S. PATENT DOCUMENTS

2013/0315078 A1* 11/2013 Brown .................... H04W 4/06 370/252
2025/0280350 A1* 9/2025 Wang .................. H04W 40/246
2026/0082399 A1* 3/2026 Chang ................... H04W 36/03

FOREIGN PATENT DOCUMENTS

WO 2023072291 A1 4/2023
WO 2024031850 A1 2/2024

* cited by examiner

*Primary Examiner* — Anh Ngoc M Nguyen
(74) *Attorney, Agent, or Firm* — Blue Capital Law Firm, P.C.

(57) ABSTRACT

A method and device for a relay end UE are disclosed. The relay UE receives a first message from a source end UE, wherein the first message establishes a $1^{st}$ hop PC5 connection with the relay UE for supporting UE-to-UE (U2U) relay communication with any target end UE. The relay UE establishes a first $2^{nd}$ hop PC5 connection with a first target end UE for supporting the U2U relay communication with the source end UE. The relay UE establishes a second $2^{nd}$ hop PC5 connection with a second target end UE for supporting the U2U relay communication with the source end UE. The relay UE sends a second message to the source end UE, wherein the second message is to complete establishment of the $1^{st}$ hop PC5 connection and includes a user info of the first target end UE and a user info of the second target end UE.

16 Claims, 26 Drawing Sheets

| IEI | Information Element | Type/Reference | Presence | Format | Length |
|---|---|---|---|---|---|
| | PROSE DIRECT LINK ESTABLISHMENT REQUEST message identity | ProSe PC5 signalling message type 11.3.1 | M | V | 1 |
| | Sequence number | Sequence number 11.3.2 | M | V | 1 |
| | Source user info | Application layer ID 11.3.4 | M | LV | 2-256 |
| | UE security capabilities | UE security capabilities 11.3.11 | M | LV | 3-9 |
| | UE PC5 unicast signalling security policy | UE PC5 unicast signalling security policy 11.3.12 | M | V | 1 |
| 4F | MIC | MIC 11.3.38 | O | TV | 5 |
| 7B | ProSe identifiers | ProSe identifier 11.3.3 | O | TLV-E | 21-65538 |
| 74 | Key establishment information container | Key establishment information container 11.3.9 | O | TLV-E | 4-65538 |
| 56 | Nonce_1 | Nonce 11.3.10 | O | TV | 17 |
| 5C | MSB of $K_{NRP\text{-}sess}$ ID | MSB of $K_{NRP\text{-}sess}$ ID 11.3.13 | O | TV | 2 |
| 28 | Target user info | Application layer ID 11.3.4 | O | TLV | 3-257 |
| 58 | $K_{NRP}$ ID | $K_{NRP}$ ID 11.3.14 | O | TV | 5 |
| 54 | Relay service code | Relay service code 11.3.26 | O | TV | 4 |
| 7D | UE identity | 5GS mobile identity 11.3.30 | O | TLV-E | 4-n |
| 64 | User security key ID | User security key ID 11.3.32 | O | TLV | 3-n |
| 2A | HPLMN ID | PLMN ID 11.3.33 | O | TLV | 5 |
| 2B | UTC-based counter LSB | UTC-based counter LSB 11.2.14 | O | TV | 2 |
| 65 | UE-to-UE relay UE user info | User info ID 11.3.39 | O | TLV | 3-257 |
| 2D | Target end UE layer-2 ID | Layer-2 ID 11.3.25 | O | TV | 4 |

FIG. 18 (PRIOR ART)

| IEI | Information Element | Type/Reference | Presence | Format | Length |
|---|---|---|---|---|---|
| | PROSE DIRECT LINK ESTABLISHMENT ACCEPT message identity | ProSe PC5 signalling message type 11.3.1 | M | V | 1 |
| | Sequence number | Sequence number 11.3.2 | M | V | 1 |
| | Source user info | Application layer ID 11.3.4 | M | LV | 2-256 |
| | Configuration of UE PC5 unicast user plane security protection | Configuration of UE PC5 unicast user plane security protection 11.3.23 | M | V | 1 |
| 79 | QoS flow descriptions | PC5 QoS flow descriptions 11.3.5 | O | TLV-E | 6-65538 |
| 7C | QoS rules | PC5 QoS rules 11.3.29 | O | TLV-E | 7-65538 |
| 62 | IP address configuration | IP address configuration 11.3.6 | O | TV | 2 |
| 61 | Target link local IPv6 address | Link local IPv6 address 11.3.7 | O | TV | 17 |
| 65 | UE-to-UE relay UE user info | User info ID 11.3.x | O | TLV | 3-257 |
| xx | Target 5G ProSe layer-3 end UE MAC address | MAC address 11.3.x | O | TLV-E | 8 |

FIG. 19 (PRIOR ART)

METHOD AND APPARATUS FOR RELAY USER EQUIPMENT (UE) ADDING MULTIPLE TARGET END UEs FOR UE-TO-UE RELAY COMMUNICATION IN A WIRELESS COMMUNICATION SYSTEM

CROSS-REFERENCE TO RELATED APPLICATIONS

The present application claims the benefit of U.S. Provisional Patent Application Ser. No. 63/528,016 filed on Jul. 20, 2023 and U.S. Provisional Patent Application Ser. No. 63/541,228 filed on Sep. 28, 2023, the entire disclosures of which are incorporated herein in their entirety by reference.

FIELD

This disclosure generally relates to wireless communication networks, and more particularly, to a method and apparatus for relay User Equipment (UE) adding multiple target end UEs for UE-to-UE relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a relay end UE are disclosed. In one embodiment, the relay UE receives a first message from a source end UE, wherein the first message is to establish a $1^{st}$ hop PC5 connection with the relay UE for supporting UE-to-UE (U2U) relay communication with any target end UE. The relay UE further establishes a first $2^{nd}$ hop PC5 connection with a first target end UE for supporting the U2U relay communication with the source end UE. The relay UE also establishes a second $2^{nd}$ hop PC5 connection with a second target end UE for supporting the U2U relay communication with the source end UE. In addition, the relay UE sends a second message to the source end UE, wherein the second message is to complete establishment of the $1^{st}$ hop PC5 connection and includes a user info of the first target end UE and a user info of the second target end UE.

BRIEF DESCRIPTION OF THE DRAWINGS

FIG. 18 is a reproduction of Table 10.3.1.1.1 of 3GPP TS 24.554 V18.1.0.

FIG. 19 is a reproduction of Table 10.3.2.1.1 of 3GPP TS 24.554 V18.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V18.2.0, "Proximity based Services (ProSe) in the 5G System (5GS) (Release 18)"; and TS 24.554 V18.1.0, "Proximity-services (ProSe) in 5G System (5GS) protocol aspects; Stage 3 (Release 18)". The standards and documents listed above are hereby expressly incorporated by reference in their entirety.

Figure 1:
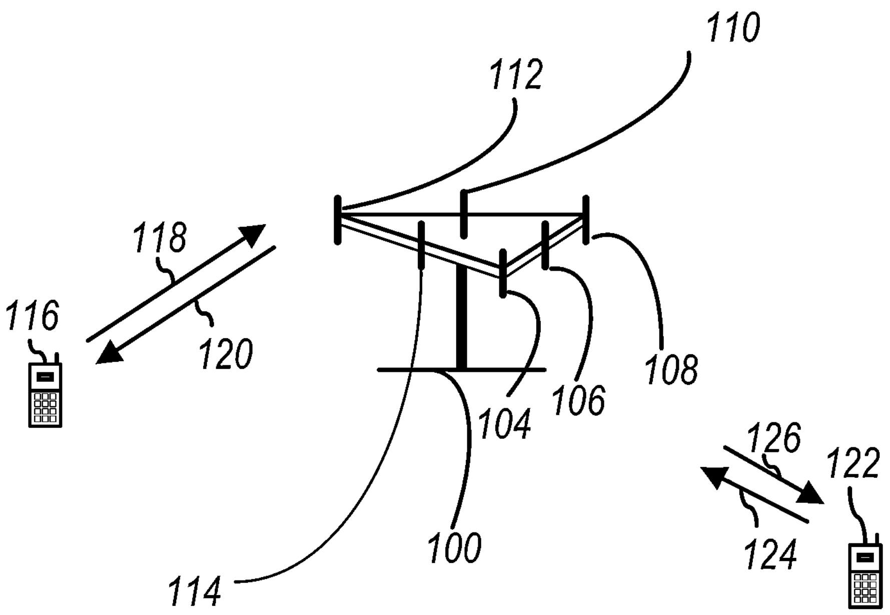
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
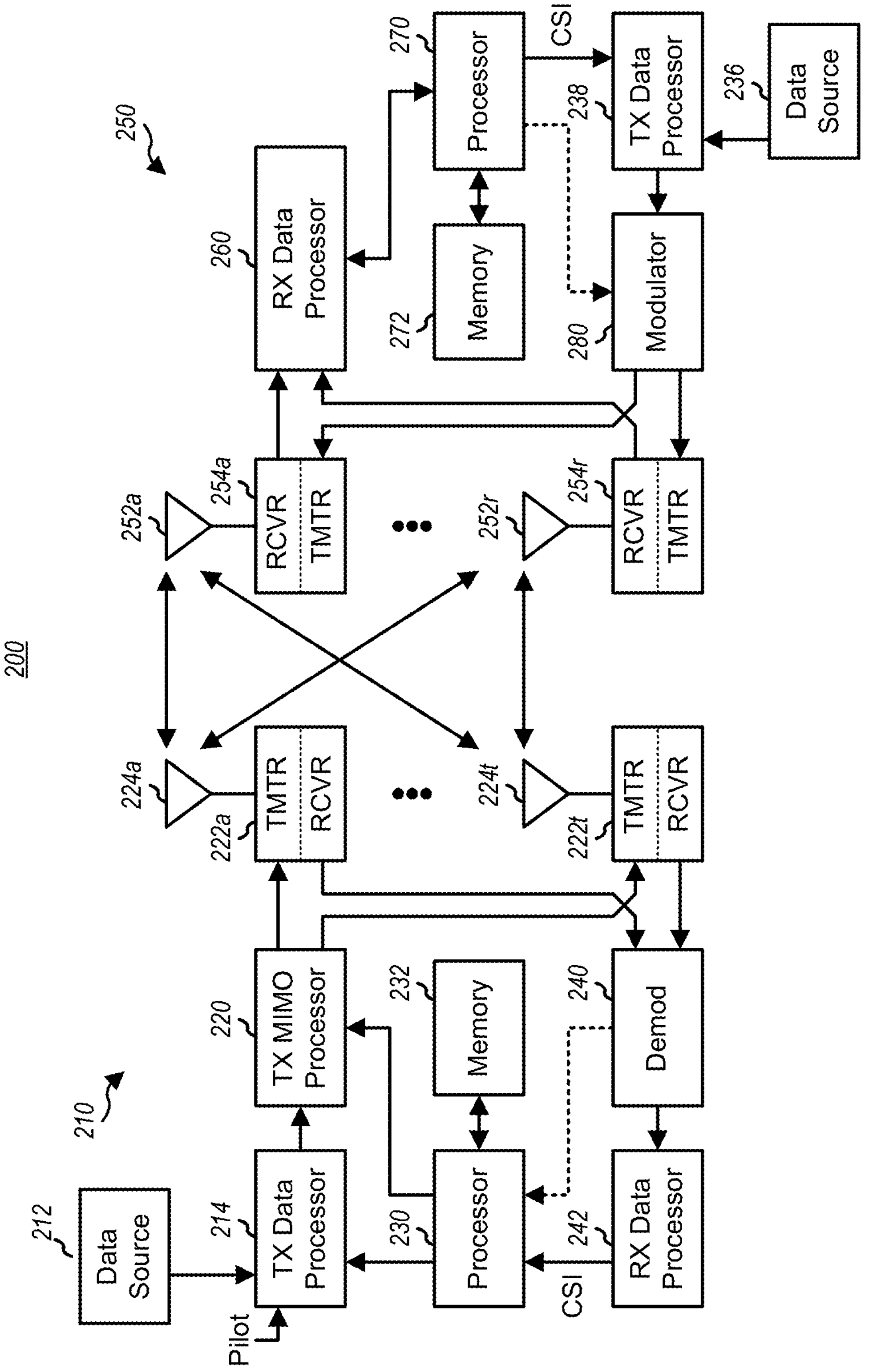
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
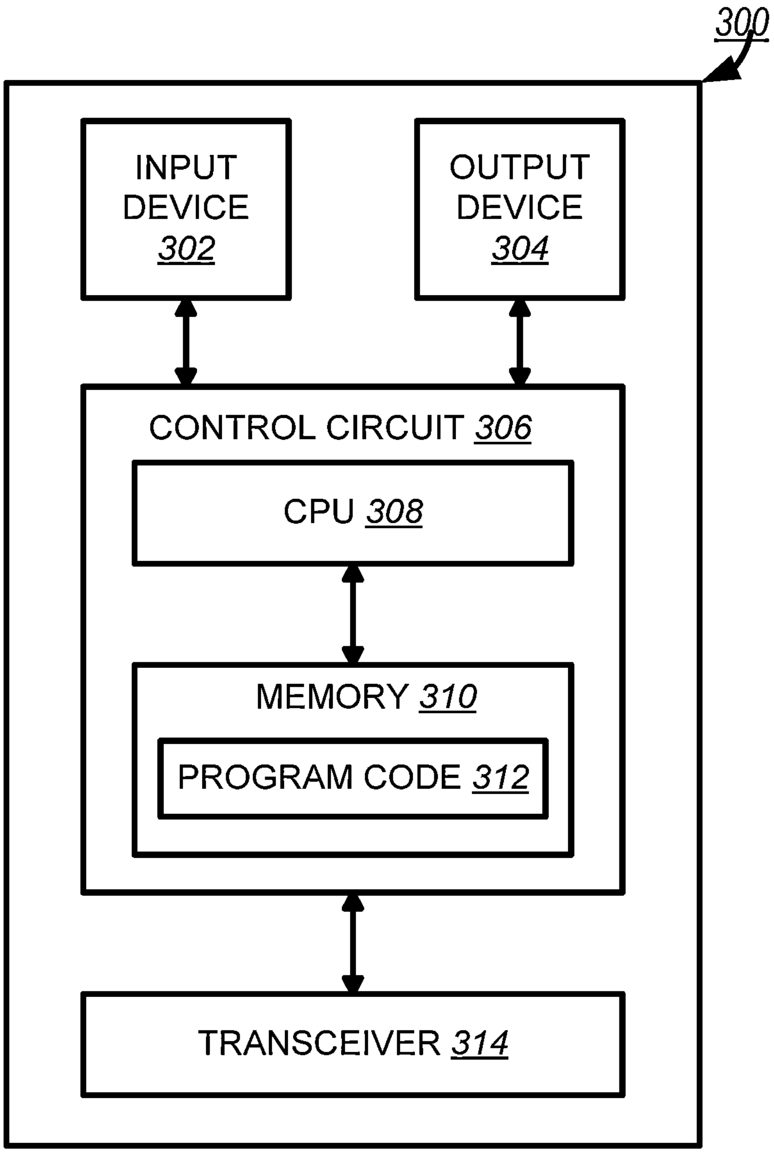
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
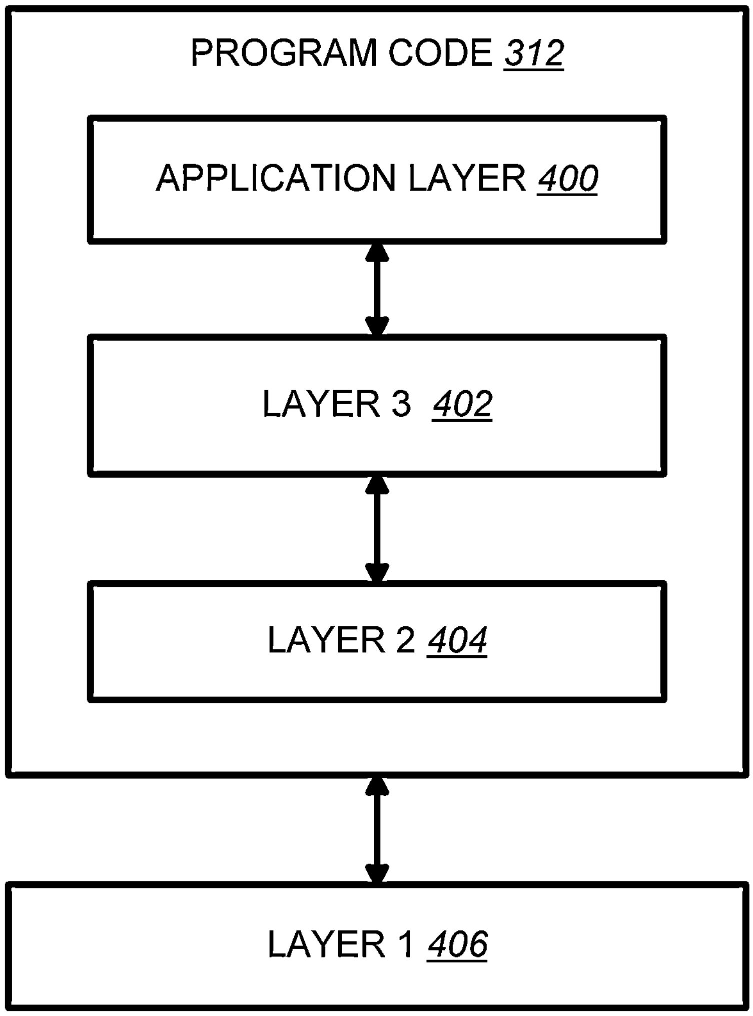
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following:

4.2.8 5G ProSe UE-to-UE Relay Reference Architecture

FIG. 4.2.8-1 shows the Layer-2 and Layer-3 5G ProSe UE-to-UE Relay reference architecture. The 5G ProSe End UEs communicate with each other via a 5G ProSe UE-to-UE Relay.

Figure 5:
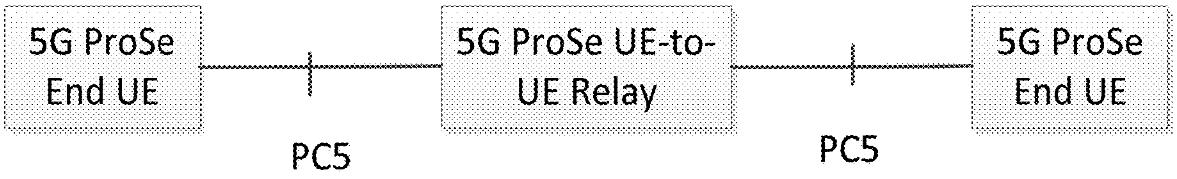
FIG. 5 (PRIOR ART)
FIG. 5 is a reproduction of FIG. 4.2.8-1 of 3GPP TS 23.304 V18.2.0.

[FIG. 4.2.8-1 of 3GPP TS 23.304 V18.2.0, entitled "Reference architecture for 5G ProSe UE-to-UE Relay", is reproduced as FIG. 5]

Each 5G ProSe End UE and the 5G ProSe UE-to-UE Relay may have subscriptions from the same PLMN or different PLMNs.

[ . . . ]

5.8.4 Identifiers for 5G ProSe UE-to-UE Relay Discovery 5.8.4.1 General

The 5G ProSe UE-to-UE Relay Discovery message contains two sets of identifiers, a Direct Discovery set and a UE-to-UE Relay Discovery set.

- The Direct Discovery set of identifiers are part of the contents of the 5G ProSe Direct Discovery message as defined in clause 5.8.1.
- The UE-to-UE Relay Discovery set of identifiers contain information to support the discovery of the 5G ProSe UE-to-UE Relay and extensions of the Direct Discovery.

5G ProSe UE-to-UE Relay shall modify the UE-to-UE Relay Discovery set of identifiers, and forward the Direct Discovery set and the UE-to-UE Relay Discovery set of identifiers during the discovery procedures.

5.8.4.2 Common Identifiers for 5G ProSe UE-to-UE Relay Discovery

The following parameters are used for the 5G ProSe UE-to-UE Relay Discovery Announcement message (Model A), where Source Layer-2 ID and Destination Layer-2 ID are used for sending and receiving the message, and User Info ID and Relay Service Code are contained in the message:

- Source Layer-2 ID: the 5G ProSe UE-to-UE Relay self-selects a Source Layer-2 ID for 5G ProSe UE-to-UE Relay Discovery Announcement message.
- Destination Layer-2 ID: the Destination Layer-2 ID for 5G ProSe UE-to-UE Relay Discovery Announcement message is selected based on the configuration as described in clause 5.1.5.1.
- User Info ID of 5G ProSe UE-to-UE Relay: provides information about the 5G ProSe UE-to-UE Relay.
- list of User Info ID of 5G ProSe End UE: provides information about the 5G ProSe End UE.
- Relay Service Code: information to indicate the connectivity service the 5G ProSe UE-to-UE Relay provides to 5G ProSe End UEs.

The following parameters are used for the 5G ProSe UE-to-UE Relay Discovery Solicitation message (Model B) between discoverer 5G ProSe End UE and 5G ProSe UE-to-UE Relay, where Source Layer-2 ID and Destination Layer-2 ID are used for sending and receiving the message, and User Info ID and Relay Service Code are contained in the message:

- Source Layer-2 ID: the discoverer 5G ProSe End UE self-selects a Source Layer-2 ID for 5G ProSe UE-to-UE Relay Discovery Solicitation message.
- Destination Layer-2 ID: the Destination Layer-2 ID for 5G ProSe UE-to-UE Relay Discovery Solicitation message is selected based on the configuration as described in clause 5.1.5.1.
- User Info ID of discoverer 5G ProSe End UE: provides information about the discoverer 5G ProSe End UE.
- User Info ID of discoveree 5G ProSe End UE: provides information about the discoveree 5G ProSe End UE.
- Relay Service Code: information about connectivity service that the discoverer 5G ProSe End UE is interested in.

The following parameters are used in the 5G ProSe UE-to-UE Relay Discovery Response message (Model B) between discoverer 5G ProSe End UE and 5G ProSe UE-to-UE Relay, where Source Layer-2 ID and Destination Layer-2 ID are used for sending and receiving the message, and User Info ID and Relay Service Code are contained in the message:

- Source Layer-2 ID: the 5G ProSe UE-to-UE Relay self-selects a Source Layer-2 ID for 5G ProSe UE-to-UE Relay Discovery Response message.
- Destination Layer-2 ID: set to the Source Layer-2 ID of the received 5G ProSe UE-to-UE Relay Discovery Solicitation message.
- User Info ID of discoveree 5G ProSe End UE: provides information about the discoveree 5G ProSe End UE.
- User Info ID of 5G ProSe UE-to-UE Relay: provides information about the 5G ProSe UE-to-UE Relay.
- Relay Service Code: identifies the connectivity service the 5G ProSe UE-to-UE Relay provides to 5G ProSe End UEs that matches the Relay Service Code from the corresponding Discovery Solicitation message.

The following parameters are used for the 5G ProSe UE-to-UE Relay Discovery Solicitation message (Model B) between 5G ProSe UE-to-UE Relay and discoveree 5G ProSe End UE, where Source Layer-2 ID and Destination Layer-2 ID are used for sending and receiving the message, and User Info ID and Relay Service Code are contained in the message:

- Source Layer-2 ID: the 5G ProSe UE-to-UE Relay self-selects a Source Layer-2 ID for 5G ProSe UE-to-UE Relay Discovery Solicitation message.

Destination Layer-2 ID: the Destination Layer-2 ID for 5G ProSe UE-to-UE Relay Discovery Solicitation message is selected based on the configuration as described in clause 5.1.5.1.

User Info ID of discoverer 5G ProSe End UE: provides information about the discoverer 5G ProSe End UE.

User Info ID of discoveree 5G ProSe End UE: provides information about the discoveree 5G ProSe End UE.

User Info ID of 5G ProSe UE-to-UE Relay: provides information about the 5G ProSe UE-to-UE Relay.

Relay Service Code: identifies the connectivity service the 5G ProSe UE-to-UE Relay provides to 5G ProSe End UEs.

The following parameters are used in the 5G ProSe UE-to-UE Relay Discovery Response message (Model B) between 5G ProSe UE-to-UE Relay and discoveree 5G ProSe End UE, where Source Layer-2 ID and Destination Layer-2 ID are used for sending and receiving the message, and User Info ID and Relay Service Code are contained in the message:

Source Layer-2 ID: the discoveree 5G ProSe End UE self-selects a Source Layer-2 ID for 5G ProSe UE-to-UE Relay Discovery Response message.

Destination Layer-2 ID: set to the Source Layer-2 ID of the received 5G ProSe UE-to-UE Relay Discovery Solicitation message.

User Info ID of discoveree 5G ProSe End UE: provides information about the discoveree 5G ProSe End UE.

User Info ID of discoverer 5G ProSe End UE: provides information about the discoverer 5G ProSe End UE.

Relay Service Code: identifies the connectivity service the 5G ProSe UE-to-UE Relay provides to 5G ProSe End UEs that matches the Relay Service Code from the corresponding Discovery Solicitation message.

NOTE: The UE implementation needs to ensure that when the UE self-selects Source Layer-2 IDs, the self-selected Source Layer-2 IDs are different between 5G ProSe Direct Discovery (including 5G ProSe UE-to-Network Relay Discovery and 5G ProSe UE-to-UE Relay Discovery) in clause 6.3.2 and 5G ProSe Direct Communication (including 5G ProSe UE-to-Network Relay Communication and 5G ProSe UE-to-UE Relay Communication) in clause 6.4, 6.5 and 6.7, and are different from any other provisioned Destination Layer-2 IDs as described in clause 5.1 and any other self-selected Source Layer-2 IDs used in a simultaneous 5G ProSe Direct Discovery (including 5G ProSe UE-to-Network Relay Discovery and 5G ProSe UE-to-UE Relay Discovery) with a different discovery model.

5.8.5 Identifiers for 5G ProSe UE-to-UE Relay Communication with Integrated Discovery For the broadcast Direct Communication Request message over the first hop PC5 reference point, the Source Layer-2 ID is self-selected by the source 5G ProSe End UE and the Destination Layer-2 ID is selected based on the configuration as described in clause 5.1.

For the broadcast Direct Communication Request message over the second hop PC5 reference point, the Source Layer-2 ID is self-selected by the 5G ProSe UE-to-UE Relay and the Destination Layer-2 ID is selected based on the configuration as described in clause 5.1.

5G ProSe UE-to-UE Relay may send a unicast Direct Communication Request message to the target 5G ProSe End UE by setting the Destination Layer-2 ID with a received unicast Destination Layer-2 ID of the target 5G ProSe End UE as specified in clause 6.4.3.7. The Source Layer-2 ID is self-selected by the 5G ProSe UE-to-UE Relay.

For unicast Direct Communication Accept message, the Source Layer-2 ID is self-selected by the target 5G ProSe End UE or 5G ProSe UE-to-UE Relay.

[ . . . ]

6.3.2.4 5G ProSe UE-to-UE Relay Discovery 6.3.2.4.1 General

5G ProSe UE-to-UE Relay Discovery is applicable to both 5G ProSe Layer-3 and Layer-2 UE-to-UE Relay Discovery for public safety use and commercial services. To perform 5G ProSe UE-to-UE Relay Discovery, the 5G ProSe End UE and the 5G ProSe UE-to-UE Relay are pre-configured or provisioned with the related information as described in clause 5.1.

A Relay Service Code (RSC) is used in the 5G ProSe UE-to-UE Relay Discovery, to indicate the connectivity service the 5G ProSe UE-to-UE Relay provides to 5G ProSe End UEs. The RSCs are pre-configured or provisioned on the 5G ProSe UE-to-UE Relay and the 5G ProSe End UE as defined in clause 5.1. The 5G ProSe UE-to-UE Relay and the 5G ProSe End UE are aware of whether a RSC is offering 5G ProSe Layer-2 or Layer-3 UE-to-UE Relay service based the policy as specified in clause 5.1. A 5G ProSe UE-to-UE Relay supporting multiple RSCs advertises the RSCs using multiple discovery messages, with one RSC per discovery message.

6.3.2.4.2 Procedure for 5G ProSe UE-to-UE Relay Discovery with Model A

Figure 6:
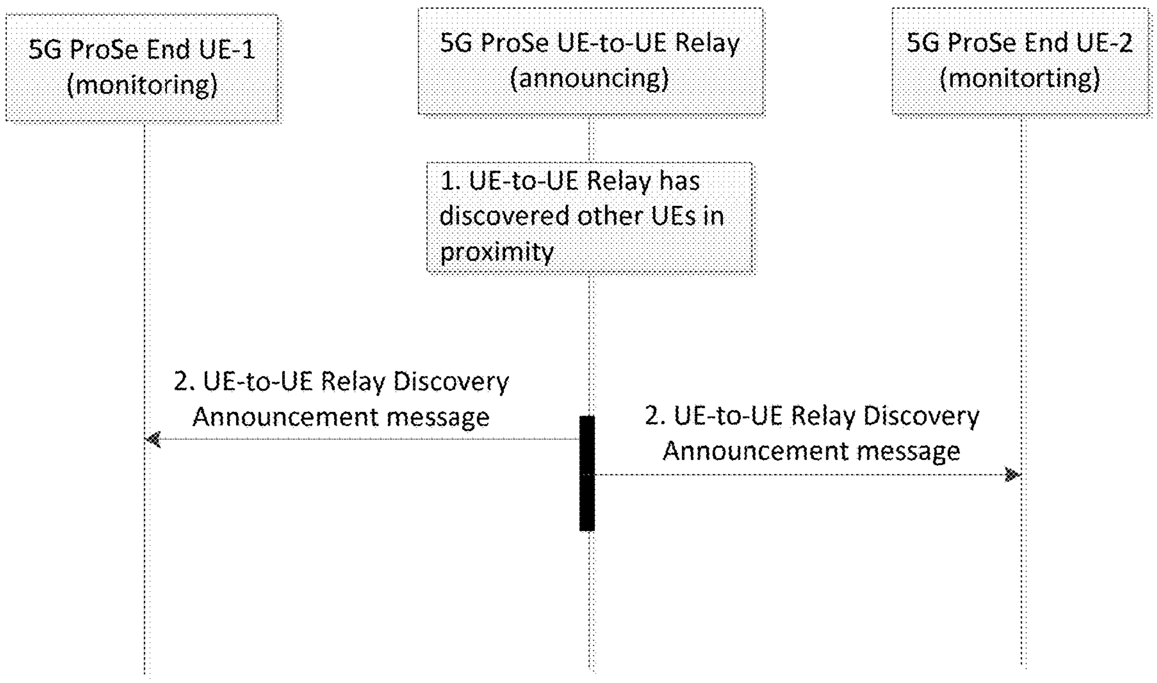
FIG. 6 (PRIOR ART)
FIG. 6 is a reproduction of FIG. 6.3.2.4.2-1 of 3GPP TS 23.304 V18.2.0.

Depicted in FIG. 6.3.2.4.2-1 is the procedure for 5G ProSe UE-to-UE Discovery with Model A.

[FIG. 6.3.2.4.2-1 of 3GPP TS 23.304 V18.2.0, entitled "5G ProSe UE-to-UE Relay Discovery with Model A", is reproduced as FIG. 6]

1. The 5G ProSe UE-to-UE Relay has discovered other UEs in proximity (e.g. via a previous 5G ProSe UE-to-UE Relay Discovery or 5G ProSe UE-to-UE Relay Communication procedures). The 5G ProSe UE-to-UE Relay obtains the User Info ID of other UEs in proximity per RSC.
2. The 5G ProSe UE-to-UE Relay sends a UE-to-UE Relay Discovery Announcement message.

The UE-to-UE Relay Discovery Announcement message contains the Type of Discovery Message, User Info ID of the 5G ProSe UE-to-UE Relay, RSC and list of User Info ID of the 5G ProSe End UEs and is sent using the Source Layer-2 ID and Destination Layer-2 ID as described in clause 5.8.4.

The 5G ProSe UE-to-UE Relay shall only announce User Info IDs of other UEs in proximity which provided relay_indication when they were previously discovered.

A 5G ProSe End UE monitors announcement messages from a 5G ProSe UE-to-UE Relay. The 5G ProSe End UEs determine the Destination Layer-2 ID for signalling reception as specified in clause 5.1.

6.3.2.4.3 Procedure for 5G ProSe UE-to-UE Relay Discovery with Model B

Depicted in FIG. 6.3.2.4.3-1 is the procedure for 5G ProSe UE-to-UE Relay Discovery with Model B.

Figure 7:
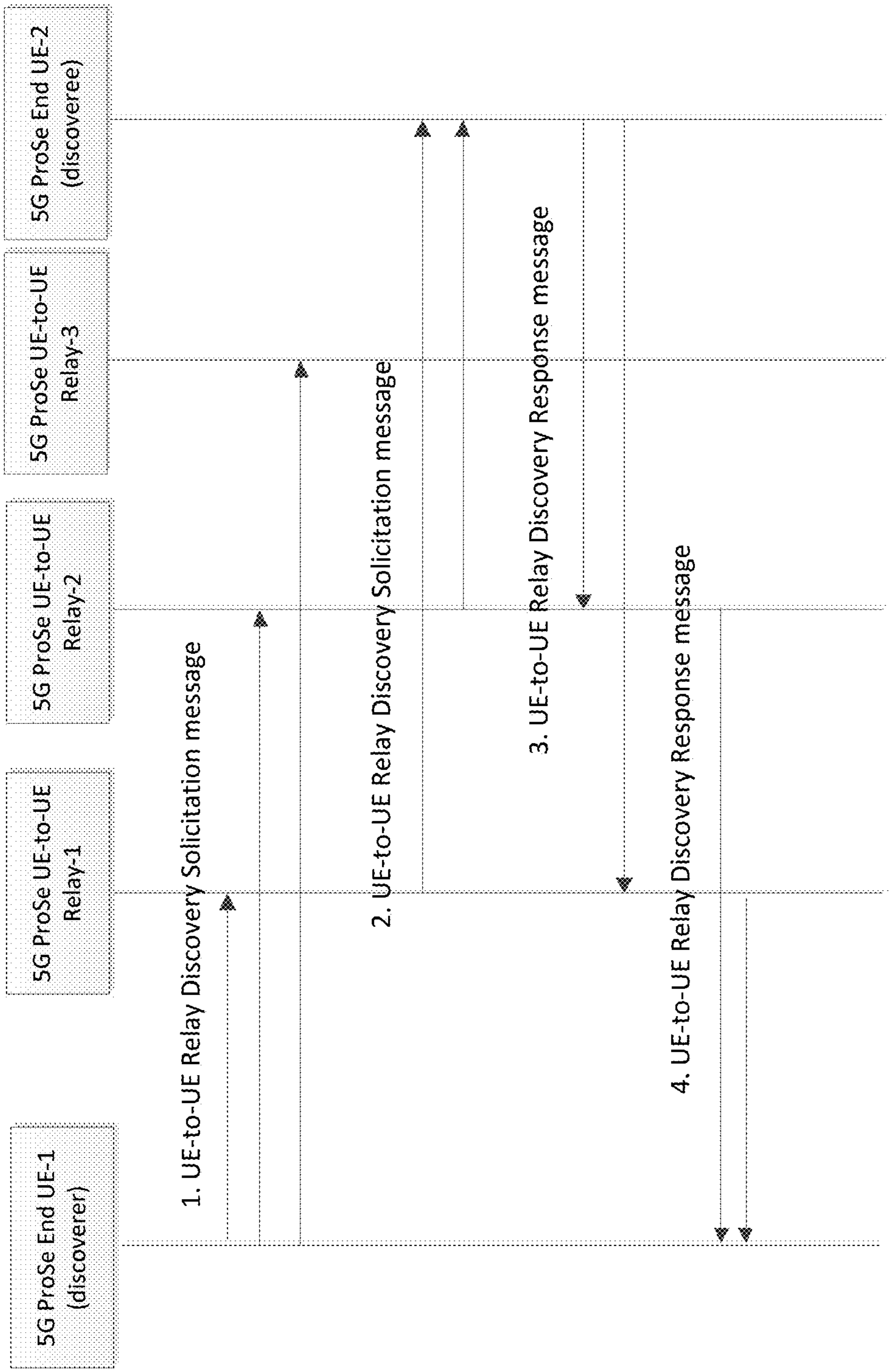
FIG. 7 (PRIOR ART)
FIG. 7 is a reproduction of FIG. 6.3.2.4.3-1 of 3GPP TS 23.304 V18.2.0.

[FIG. 6.3.2.4.3-1 of 3GPP TS 23.304 V18.2.0, entitled "5G ProSe UE-to-UE Relay Discovery with Model B", is reproduced as FIG. 7]

1. The discoverer 5G ProSe End UE (UE-1) sends a 5G ProSe UE-to-UE Relay Discovery Solicitation message. The 5G ProSe UE-to-UE Relay Discovery Solicitation message contains the Type of Discovery Message, User Info ID of itself, RSC, and User Info ID of the discoveree 5G ProSe End UE (UE-2), and is sent using the Source Layer-2 ID and Destination Layer-2 ID as described in clause 5.8.4.

A 5G ProSe UE-to-UE Relays determine the Destination Layer-2 ID for signalling reception as specified in clause 5.1.

2. A 5G ProSe UE-to-UE Relay that matches the RSC sends a 5G ProSe UE-to-UE Relay Discovery Solicitation message. The 5G ProSe UE-to-UE Relay Discovery Solicitation message contains the Type of Discovery Message, User Info ID of the discoverer 5G ProSe End UE (UE-1), User Info ID of UE-to-UE Relay, RSC, and User Info ID of the discoveree 5G ProSe End UE (UE-2) and is sent using the Source Layer-2 ID and Destination Layer-2 ID as described in clause 5.8.4.

A 5G ProSe End UE determines the Destination Layer-2 ID for signalling reception as specified in clause 5.1.

3. The discoveree 5G ProSe End UE (UE-2) that matches the value of RSC and the User Info ID of the discoveree 5G ProSe End UE (UE-2) responds to the 5G ProSe UE-to-UE Relay with a 5G ProSe UE-to-UE Relay Discovery Response message. The 5G ProSe UE-to-UE Relay Discovery Response message contains the Type of Discovery Message, RSC, User Info ID of the discoverer 5G ProSe End UE (UE-1), and User Info ID of itself, and is sent using the Source Layer-2 ID and Destination Layer-2 ID as described in clause 5.8.4. If the discoveree 5G ProSe End UE (UE-2) receives multiple UE-to-UE Relay Discovery Solicitation messages from different 5G ProSe UE-to-UE Relays, it may choose to respond or not to a 5G ProSe UE-to-UE Relay (e.g. based on the PC5 signal strength of each message received).

4. The 5G ProSe UE-to-UE Relay sends a 5G ProSe UE-to-UE Relay Discovery Response message. The 5G ProSe UE-to-UE Relay Discovery Response message contains the Type of Discovery Message, User Info ID of UE-to-UE Relay, RSC, and User Info ID of the discoveree 5G ProSe End UE (UE-2), and is sent using the Source Layer-2 ID and Destination Layer-2 ID as described in clause 5.8.4.

6.3.2.4.4 Candidate 5G ProSe UE-to-UE Relay Discovery

This procedure for candidate 5G ProSe UE-to-UE Relay Discovery to support the negotiated Relay reselection as described in clause 6.7.4 when the discoverer End UE discovers a candidate 5G ProSe UE-to-UE Relay.

The procedure for 5G ProSe UE-to-UE Relay Discovery with Model B (see clause 6.3.2.4.3) is used with the following differences:

Step 1: In the 5G ProSe UE-to-UE Relay Discovery Solicitation message the RSC is not included and the User Info ID of the discoveree 5G ProSe End UE is replaced with the User Info ID of a candidate 5G ProSe UE-to-UE Relay. If the 5G ProSe End UE receives the Layer-2 ID of the candidate 5G ProSe UE-to-UE Relay in a Link Modification Request message, it may set the Layer-2 ID of the candidate 5G ProSe UE-to-UE Relay as the Destination Layer-2 ID.

Step 2 and step 3 are skipped because RSC is absent in the received 5G ProSe UE-to-UE Relay Discovery Solicitation message.

Step 4: If a 5G ProSe UE-to-UE Relay matches the User Info ID of a candidate 5G ProSe UE-to-UE Relay received in the 5G ProSe UE-to-UE Relay Discovery Solicitation then it sends the 5G ProSe UE-to-UE Relay Discovery Response and does not include the User Info ID of the discoveree 5G ProSe End UE.

[ . . . ]

6.4.3 Unicast Mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

Figure 8:
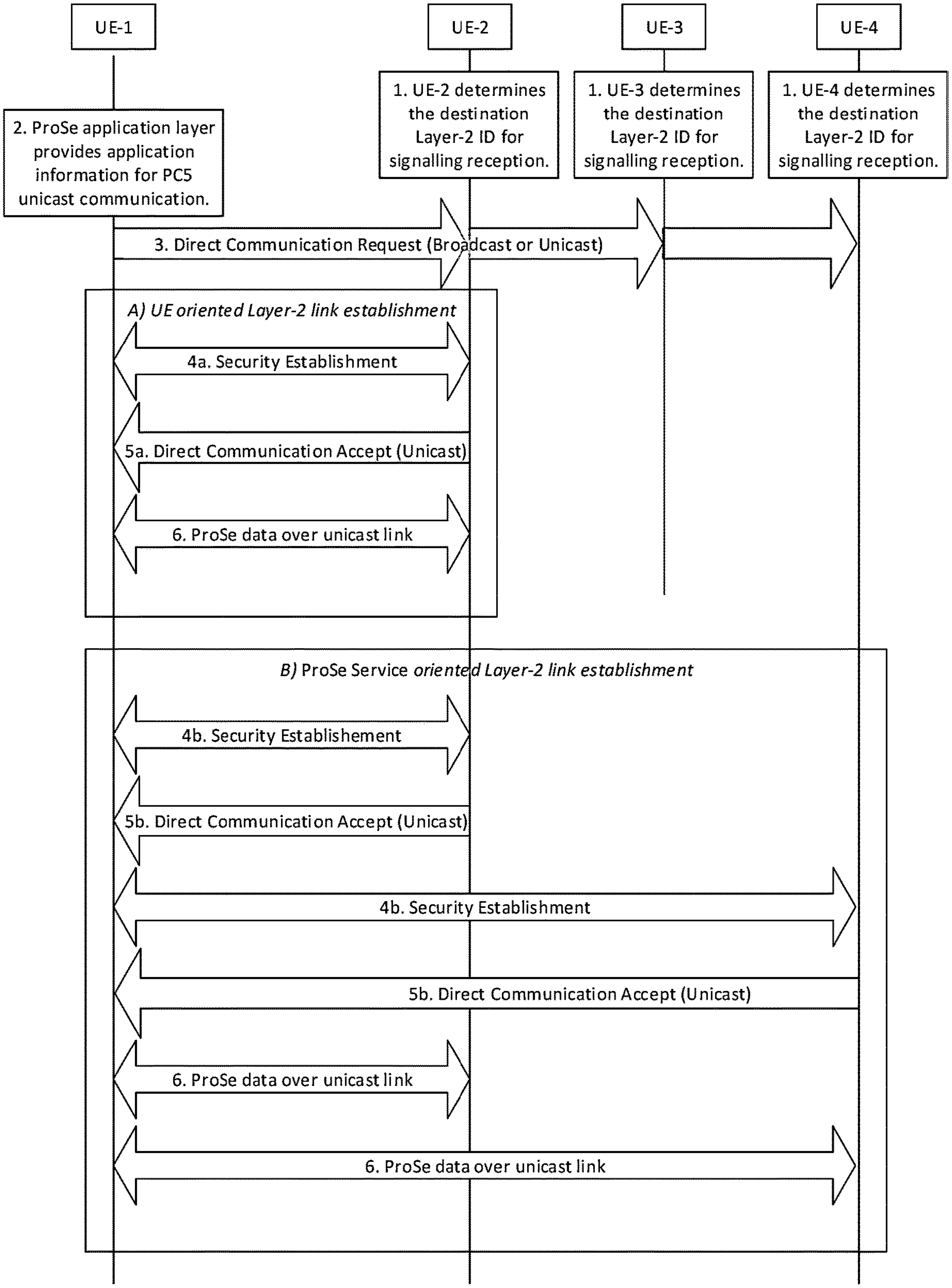
FIG. 8 (PRIOR ART)
FIG. 8 is a reproduction of FIG. 6.4.3.1-1 of 3GPP TS 23.304 V18.2.0.

[FIG. 6.4.3.1-1 of 3GPP TS 23.304 V18.2.0, entitled "Layer-2 link establishment procedure", is reproduced as FIG. 8]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined in TS 33.503 [29].

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

A default PC5 DRX configuration may be used for transmitting and receiving of this message (see TS 38.300 [12]).

4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined in TS 33.503 [29].

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPV6 address allocation mechanism is supported by the initiating UE, i.e., acting as an IPV6 Router; or "DHCPv4 server & IPv6 Router" if both IPv4 and IPV6 address allocation mechanism are supported by the initiating UE; or "address allocation not supported" if neither IPv4 nor IPV6 address allocation mechanism is supported by the initiating UE.

Link-Local IPv6 Address: a link-local IPv6 address formed locally based on RFC 4862 if UE-1 does not support the IPV6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:
   5a. (UE oriented Layer-2 link establishment) If the Target User Info is included in the Direct Communication Request message, the target UE, i.e. UE-2 responds with a Direct Communication Accept message if the Application Layer ID for UE-2 matches.
   5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPV6 Router; or "DHCPv4 server & IPV6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 if the target UE does not support the IPV6 IP address allocation mechanism, i.e. the IP Address Configuration indicates "address allocation not supported", and UE-1 included a link-local IPV6 address in the Direct Communication Request message. The target UE shall include a non-conflicting link-local IPv6 address.

If both UEs (i.e. the initiating UE and the target UE) are selected to use link-local IPV6 address, they shall disable the duplicate address detection defined in RFC 4862 [17].

NOTE 3: When either the initiating UE or the target UE indicates the support of IPV6 routing, the corresponding address configuration procedure would be carried out after the establishment of the layer 2 link, and the link-local IPV6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer, and the PC5 DRX parameter values can be configured per pair of source and destination Layer-2 IDs in the AS layer.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[ . . . ]

6.4.3.4 Layer-2 Link Modification for a Unicast Link

FIG. 6.4.3.4-1 shows the layer-2 link modification procedure for a unicast link. This procedure is used to:

add new PC5 QoS Flow(s) in the existing PC5 unicast link.

This covers the case for adding new PC5 QoS Flow(s) to the existing ProSe service(s) as well as the case for adding new PC5 QoS Flow(s) to new ProSe service(s).

modify existing PC5 QoS Flow(s) in the existing PC5 unicast link.

This covers the case for modifying the PC5 QoS parameters for existing PC5 QoS Flow(s).

This also covers the case for removing the associated ProSe service(s) from existing PC5 QoS Flow(s) as well as the case for associating new ProSe service(s) with existing PC5 QoS Flow(s).

remove existing PC5 QoS Flow(s) in the existing PC5 unicast link.

Figure 9:
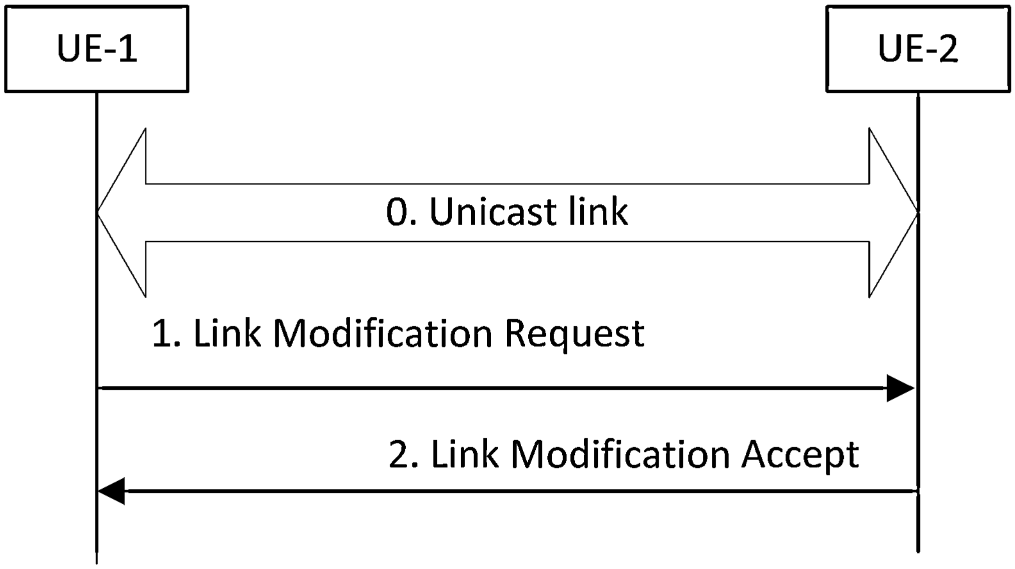
FIG. 9 (PRIOR ART)
FIG. 9 is a reproduction of FIG. 6.4.3.4-1 of 3GPP TS 23.304 V18.2.0.

[FIG. 6.4.3.4-1 of 3GPP TS 23.304 V18.2.0, entitled "Layer-2 link modification procedure", is reproduced as FIG. 9]

0. UE-1 and UE-2 have a unicast link established as described in clause 6.4.3.1.

1. The ProSe application layer in UE-1 provides application information for PC5 unicast communication. The application information includes the ProSe Service Info and the initiating UE's Application Layer ID. The target UE's Application Layer ID may be included in the application information. If UE-1 decides to reuse the existing PC5 unicast link as specified in clause 5.3.4, so decides to modify the unicast link established with UE-2, UE-1 sends a Link Modification Request to UE-2.

The Link Modification Request message includes:

a) To add new PC5 QoS Flow(s) in the existing PC5 unicast link:

QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and optionally the associated ProSe identifier(s).

Optional PC5 QoS Rule(s).

b) To modify PC5 QoS Flow(s) in the existing PC5 unicast link:

QoS Info: the information about PC5 QoS Flow(s) to be modified. For each PC5 QoS Flow, the PFI, the corresponding PC5 QoS parameters (i.e. PQI and conditionally other parameters such as MFBR/GFBR, etc.) and optionally the associated ProSe identifier(s).

Optional PC5 QoS Rule(s).

c) To remove PC5 QoS Flow(s) in the existing PC5 unicast link:

PFIs.

2. UE-2 responds with a Link Modification Accept message.

The Link Modification Accept message includes:

For case a) and case b) described in step 1:

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and optionally the associated ProSe identifier(s).

Optional PC5 QoS Rule(s).

The ProSe layer of each UE provides information about the unicast link modification to the AS layer. This enables the AS layer to update the context related to the modified unicast link.

[ . . . ]

6.4.3.7 Layer-2 Link Management Over PC5 Reference Point for 5G ProSe UE-to-UE Relay 6.4.3.7.1 Common Part for Layer-2 Link Management Over PC5 Reference Point for 5G ProSe UE-to-UE Relay For the 5G ProSe Communication via 5G ProSe UE-to-UE Relay as described in clause 6.7.1 and clause 6.7.2:

The Direct Communication Request message over the first hop PC5 reference point includes:

User Info ID of source 5G ProSe End UE: the identity of the source 5G ProSe End UE requesting relay operation (i.e. User Info ID).

User Info ID of 5G ProSe UE-to-UE Relay: the identity of the UE-to-UE Relay provided to the source 5G ProSe End UE during 5G ProSe UE-to-UE Relay Discovery procedure (i.e. User Info ID).

User Info ID of target 5G ProSe End UE: the identity of the target 5G ProSe End UE provided to the source 5G ProSe End UE during UE-to-UE Relay Discovery procedure (i.e. User Info ID).

(optional) Destination Layer-2 ID of target 5G ProSe End UE: the unicast destination Layer-2 ID of the target 5G ProSe End UE determined by the source 5G ProSe End UE as specified in clause 5.8.2.4.

ProSe Service Info: the information about the ProSe identifier(s) requesting Layer-2 link establishment.

RSC: the connectivity service provided by the 5G ProSe UE-to-UE Relay as requested by the source 5G ProSe End UE.

Security Information: the information for the establishment of security for the first hop PC5 link establishment.

NOTE 1: The Security Information is defined by SA WG3.

The Direct Communication Request message over the second hop PC5 reference point includes:

User Info ID of source 5G ProSe End UE.

User Info ID of target 5G ProSe End UE.

User Info ID of 5G ProSe UE-to-UE Relay.

ProSe Service Info: the information about the ProSe identifier(s).

RSC: the connectivity service provided by the 5G ProSe UE-to-UE Relay as requested by the source 5G ProSe End UE.

Security Information: the information for the establishment of security for the second hop PC5 link establishment.

NOTE 2: The Security Information is defined by SA WG3.

The Direct Communication Accept message over the second hop PC5 reference point includes:

User Info ID of target 5G ProSe End UE.

The Direct Communication Accept message over the first hop PC5 reference point includes:

User Info ID of target 5G ProSe End UE.

User Info ID of 5G ProSe UE-to-UE Relay.

The Link Modification Request message over the first hop PC5 reference point includes:

User Info ID of target 5G ProSe End UE: the identity of the target 5G ProSe End UE provided to the source 5G ProSe End UE during UE-to-UE Relay Discovery procedure.

(optional) Destination Layer-2 ID of target 5G ProSe End UE: the unicast destination Layer-2 ID of the target 5G ProSe End UE determined by the source 5G ProSe End UE as specified in clause 5.8.2.4.

The Link Modification Request message over the second hop PC5 reference point includes:

User Info ID of source 5G ProSe End UE.

User Info ID of target 5G ProSe End UE.

The Link Modification Accept message over the second hop PC5 reference point includes:

User Info ID of target 5G ProSe End UE.

The Link Modification Accept message over the first hop PC5 reference point includes:

User Info ID of target 5G ProSe End UE.

6.4.3.7.2 Layer-2 Link Management Over PC5 Reference Point for 5G ProSe Layer-2 UE-to-UE Relay For the 5G ProSe Communication via 5G ProSe Layer-2 UE-to-UE Relay as described in clause 6.7.2, the description in clause 6.4.3.7.1 applies.

The message contents over PC5 reference point for unicast mode 5G ProSe Direct Communication as depicted from clause 6.4.3.1 to clause 6.4.3.5 are same for the end-to-end connection between peer 5G ProSe End UEs.

Editor's note: Whether the LIU between peer Layer-2 End UEs has same message contents as direct PC5 LIU messages is FFS.

6.4.3.7.3 Layer-2 Link Management Over PC5 Reference Point for 5G ProSe Layer-3 UE-to-UE Relay For the 5G ProSe Communication via 5G ProSe Layer-3 UE-to-UE Relay as described in clause 6.7.1, the description in clause 6.4.3.7.1 applies with following differences and clarifications:

In the Security Procedure of the first hop PC5 reference point, the source 5G ProSe Layer-3 End UE provides the IP Address Configuration or Link-Local IPV6 Address and QoS Info of the end-to-end QoS to the 5G ProSe Layer-3 UE-to-UE Relay. If the PC5 link is used for transferring Ethernet traffic, the source 5G ProSe Layer-3 End UE provides its Ethernet MAC address instead of IP related information.

In the Security Procedure of the second hop PC5 reference point, the 5G ProSe Layer-3 UE-to-UE Relay provides the IP Address Configuration or Link-Local IPV6 Address and QoS Info of the second hop QoS to the target 5G ProSe End UE. If the PC5 link is used for transferring Ethernet traffic, the 5G ProSe Layer-3 UE-to-UE Relay provides the Ethernet MAC address of the source 5G ProSe Layer-3 End UE instead of IP related information.

The Direct Communication Accept message over the second hop PC5 reference point additionally includes IP Address Configuration or Link-Local IPV6 Address and QoS Info of the second hop QoS. If the PC5 link is used for transferring Ethernet traffic, the target 5G ProSe Layer-3 End UE provides its Ethernet MAC address instead of IP related information.

The 5G ProSe Layer-3 UE-to-UE Relay decides the QoS Info of the first hop QoS with considering the received second hop QoS, the Direct Communication Accept message over the first hop PC5 reference point additionally includes IP Address Configuration or Link-Local IPV6 Address, QoS Info of the first hop QoS and may include IP address of the target 5G ProSe End UE. If the PC5 link is used for transferring Ethernet traffic, 5G ProSe Layer-3 UE-to-UE Relay provides the Ethernet MAC address of the target 5G ProSe Layer-3 End UE instead of IP related information.

In the Link Modification Request message over the first hop PC5 reference point, the source 5G ProSe End UE additionally includes QoS Info of the end-to-end QoS. If the PC5 link is used for transferring Ethernet traffic, the source 5G ProSe Layer-3 End UE may provide its Ethernet MAC address.

In the Link Modification Request message over the second hop PC5 reference point, the 5G ProSe Layer-3 UE-to-UE Relay additionally includes QoS Info of the second hop QoS to the target 5G ProSe End UE. If the PC5 link is used for transferring Ethernet traffic, the 5G ProSe Layer-3 UE-to-UE Relay provides the Ethernet MAC address of the source 5G ProSe Layer-3 End UE.

The Link Modification Accept message over the second hop PC5 reference point additionally includes QoS Info of the second hop QoS. If the PC5 link is used for transferring Ethernet traffic, the target 5G ProSe Layer-3 End UE may provide its Ethernet MAC address.

The 5G ProSe Layer-3 UE-to-UE Relay decides the QoS Info of the first hop QoS with considering the received second hop QoS, the Link Modification Accept message over the first hop PC5 reference point additionally includes QoS Info of the first hop QoS and may include IP address of the target 5G ProSe End UE. If the PC5 link is used for transferring Ethernet traffic, 5G ProSe Layer-3 UE-to-UE Relay provides the Ethernet MAC address of the target 5G ProSe Layer-3 End UE instead of IP related information.

When the PC5 link between a 5G ProSe Layer-3 End UE and the 5G ProSe Layer-3 UE-to-UE Relay is released, the 5G ProSe Layer-3 UE-to-UE Relay may initiate the PC5 link release to the peer 5G ProSe Layer-3 End UE(s) or notify the peer 5G ProSe Layer-3 End UE(s) the peer PC5 link is released.

6.4.3.7.4 Layer-2 Link Management Over PC5 Reference Point for 5G ProSe UE-to-UE Relay Communication with Integrated Discovery This clause is for the 5G ProSe UE-to-UE Relay Communication with integrated Discovery procedure as described in clause 6.7.3.

The Direct Communication Request message over the first hop PC5 reference point includes:

User Info ID of source 5G ProSe End UE.

(optional) User Info ID of target 5G ProSe End UE: the identity of the target 5G ProSe End UE if provided from the ProSe application layer.

(optional) Destination Layer-2 ID of target 5G ProSe End UE: the unicast destination Layer-2 ID of the target 5G ProSe End UE determined by the source 5G ProSe End UE as specified in clause 5.8.2.4.

ProSe Service Info: the information about the ProSe identifier(s) requesting Layer-2 link establishment.

RSC: the connectivity service provided by the 5G ProSe UE-to-UE Relay as requested by the source 5G ProSe End UE.

Relay_indication: indicates whether the Direct Communication Request message can be forwarded by a 5G ProSe UE-to-UE Relay.

Security Information: the information for the establishment of security for the first hop PC5 link establishment.

NOTE 1: The Security Information is defined by SA WG3.

The Direct Communication Request message over the second hop PC5 reference point includes:

User Info ID of source 5G ProSe End UE.

User Info ID of 5G ProSe UE-to-UE Relay.

(optional) User Info ID of target 5G ProSe End UE.

ProSe Service Info: the information about the ProSe identifier(s).

RSC: the connectivity service provided by the 5G ProSe UE-to-UE Relay as requested by the source 5G ProSe End UE.

Security Information: the information for the establishment of security for the second hop PC5 link establishment.

NOTE 2: The Security Information is defined by SA WG3.

The Direct Communication Accept message over the second hop PC5 reference point includes:

User Info ID of target 5G ProSe End UE.

The Direct Communication Accept message over the first hop PC5 reference point includes:

User Info ID of target 5G ProSe End UE.

User Info ID of 5G ProSe UE-to-UE Relay.

For the 5G ProSe Communication via 5G ProSe Layer-3 UE-to-UE Relay, additional clarifications are as following:

In the Security Procedure of the second hop PC5 reference point, the 5G ProSe Layer-3 UE-to-UE Relay provides the IP Address Configuration or Link-Local IPV6 Address to the target 5G ProSe End UE.

The Direct Communication Accept message over the second hop PC5 reference point additionally includes IP Address Configuration or Link-Local IPV6 Address (if IP communication is used), Ethernet MAC address of target 5G ProSe End UE (if Ethernet communication is used). QoS Info is not included in the Security Procedure or Direct Communication Accept message of the second hop PC5 reference point.

In the Security Procedure of the first hop PC5 reference point, the source 5G ProSe End UE provides the IP Address Configuration, Link-Local IPV6 Address and QoS Info of the end-to-end QoS to the 5G ProSe Layer-3 UE-to-UE Relay.

The 5G ProSe Layer-3 UE-to-UE Relay provides the QoS info of the second hop QoS to the target 5G ProSe End UE using the Layer-2 link modification as described in the clause 6.4.3.4.

The 5G ProSe Layer-3 UE-to-UE Relay decides the QoS Info of the first hop QoS with considering the received second hop QoS from the target 5G ProSe End UE, the Direct Communication Accept message over the first hop PC5 reference point additionally includes IP Address Configuration or Link-Local IPV6 Address, QoS Info of the first hop QoS and may include IP address of the target 5G ProSe End UE (if IP communication is used) or Ethernet MAC address of target 5G ProSe End UE (if Ethernet communication is used).

For the 5G ProSe Communication via 5G ProSe Layer-2 UE-to-UE Relay, the message contents over PC5 reference point for unicast mode 5G ProSe Direct Communication as depicted from clause 6.4.3.1 to clause 6.4.3.5 are same for the end-to-end connection between peer 5G ProSe End UEs.

[ . . . ]

6.7 5G ProSe UE-to-UE Relay Communication 6.7.1 5G ProSe Communication via 5G ProSe Layer-3 UE-to-UE Relay 6.7.1.1 Layer-2 Link Establishment for PC5 Communication Via 5G ProSe Layer-3 UE-to-UE Relay FIG. 6.7.1.1-1 shows the procedure for Layer-2 link establishment via 5G ProSe Layer-3 UE-to-UE Relay.

Figure 10:
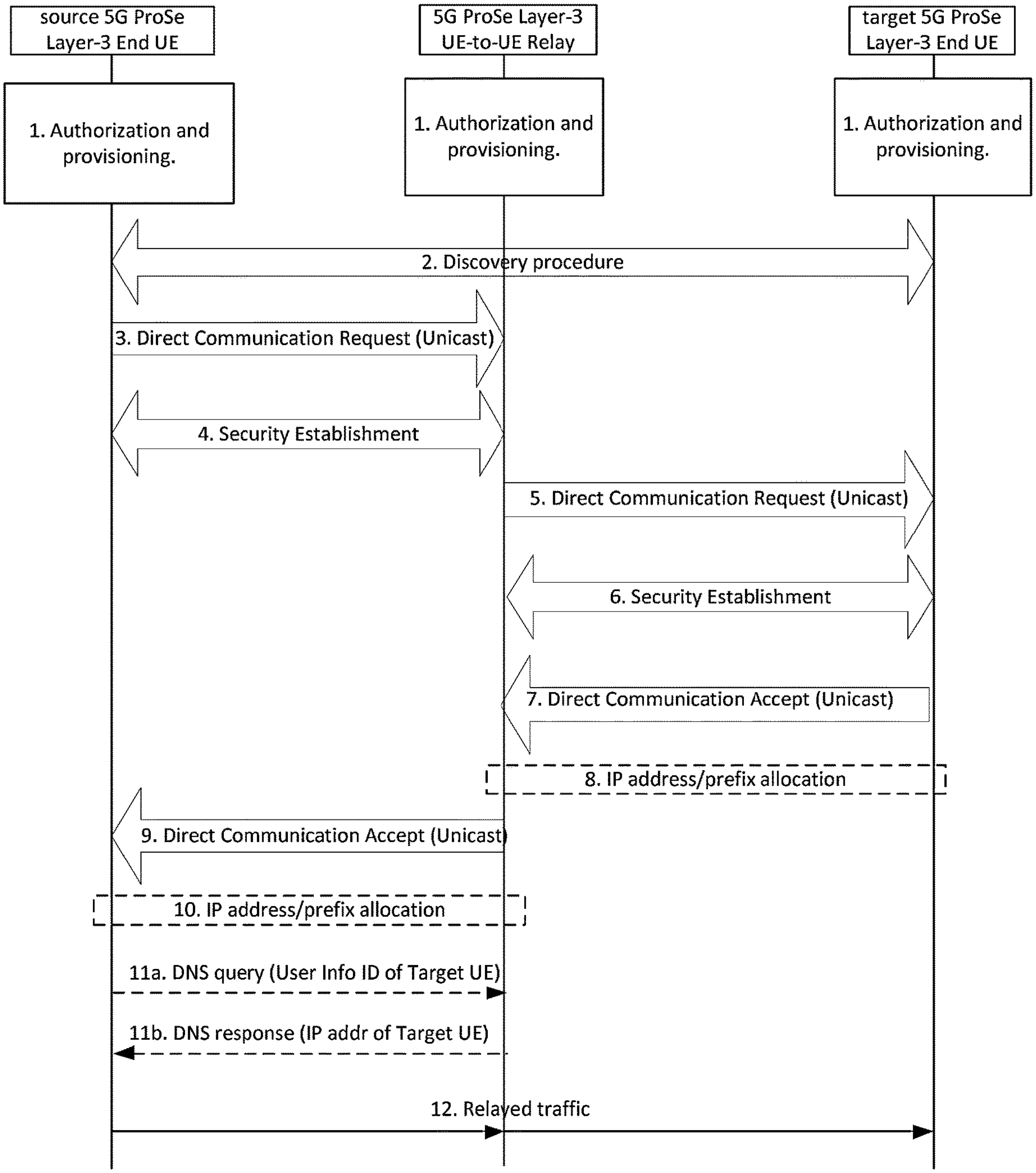
FIG. 10 (PRIOR ART)
FIG. 10 is a reproduction of FIG. 6.7.1.1-1 of 3GPP TS 23.304 V18.2.0.

[FIG. 6.7.1.1-1 of 3GPP TS 23.304 V18.2.0, entitled "Layer-2 link establishment via 5G ProSe Layer-3 UE-to-UE Relay", is reproduced as FIG. 10]

1. Service authorization and provisioning are performed for source 5G ProSe Layer-3 End UE, target 5G ProSe Layer-3 End UE and 5G ProSe Layer-3 UE-to-UE Relay as described in clause 6.2.
2. The source 5G ProSe Layer-3 End UE performs discovery of a 5G ProSe Layer-3 UE-to-UE Relay as described in clause 6.3.2.4.
3. The source 5G ProSe Layer-3 End UE sends a Direct Communication Request message to initiate the unicast Layer-2 link establishment procedure with the 5G ProSe Layer-3 UE-to-UE Relay. The parameters included in the Direct Communication Request message are described in clause 6.4.3.7.

The Source Layer-2 ID of the Direct Communication Request message is self-assigned by the source 5G ProSe Layer-3 End UE, and the Destination Layer-2 ID is set to the Source Layer-2 ID of the discovery message of the 5G ProSe Layer-3 UE-to-UE Relay.
4. If the User Info ID of 5G ProSe Layer-3 UE-to-UE Relay in the Direct Communication Request message matches the 5G ProSe UE-to-UE Relay's User Info ID and the RSC in the Direct Communication Request matches one RSC that the relay supports, the 5G ProSe Layer-3 UE-to-UE Relay responds by establishing the security with the source 5G ProSe Layer-3 End UE. When the security protection is enabled, the source 5G ProSe Layer-3 End UE sends the parameters as described in clause 6.4.3.7 to the 5G ProSe Layer-3 UE-to-UE Relay.

If the Ethernet MAC address of source 5G ProSe Layer-3 End UE is already used by another 5G ProSe Layer-3 End UE, then the 5G ProSe Layer-3 UE-to-UE Relay may send a message to the source 5G ProSe Layer-3 End UE indicating there is Ethernet MAC address conflict.

The Source Layer-2 ID used for the security establishment procedure is self-assigned by the 5G ProSe Layer-3 UE-to-UE Relay, and the Destination Layer-2 ID is set to the Source Layer-2 ID of the received Direct Communication Request message.

The 5G ProSe Layer-3 UE-to-UE Relay shall choose different Source Layer-2 IDs for PC5 links of different types of traffic, i.e., IP traffic, Ethernet traffic, and Unstructured traffic. If the PC5 link is used for transferring Unstructured traffic, the 5G ProSe Layer-3 UE-to-UE Relay shall choose different Source Layer-2 IDs for different pair of source and target 5G ProSe Layer-3 End UEs.

Upon receiving the security establishment procedure messages, the source 5G ProSe Layer-3 End UE obtains the 5G ProSe Layer-3 UE-to-UE Relay's Layer-2 ID for future communication, for signalling and data traffic for this unicast link.

5. After the Security Establishment procedure in step 4 is completed, the 5G ProSe Layer-3 UE-to-UE Relay sends a Direct Communication Request message to initiate the unicast Layer-2 link establishment procedure with the target 5G ProSe Layer-3 End UE. The parameters included in the Direct Communication Request message are described in clause 6.4.3.7.
   The Source Layer-2 ID of the Direct Communication Request message is self-assigned by the 5G ProSe Layer-3 UE-to-UE Relay, and the Destination Layer-2 ID is the unicast Layer-2 ID of target 5G ProSe Layer-3 End UE associated with the User Info ID of target 5G ProSe Layer-3 End UE.
   The 5G ProSe Layer-3 UE-to-UE Relay shall choose different Source Layer-2 IDs for PC5 links of different types of traffic, i.e., IP traffic, Ethernet traffic, and Unstructured traffic. If the PC5 link is used for transferring Unstructured traffic, the 5G ProSe Layer-3 UE-to-UE Relay shall choose different Source Layer-2 IDs for different pair of source and target 5G ProSe Layer-3 End UEs.
6. If the User Info ID of target 5G ProSe Layer-3 End UE and RSC included in the Direct Communication Request match the target UE's User Info ID and the RSC that the target UE supports, the target 5G ProSe Layer-3 End UE responds by establishing the security with the 5G ProSe Layer-3 UE-to-UE Relay. When the security protection is enabled, the 5G ProSe Layer-3 UE-to-UE Relay sends the parameters as described in clause 6.4.3.7 to the target 5G ProSe Layer-3 End UE.
   The Source Layer-2 ID used for the security establishment procedure is self-assigned by the target 5G ProSe Layer-3 End UE, and the Destination Layer-2 ID is set to the Source Layer-2 ID of the received Direct Communication Request message.
   Upon receiving the security establishment procedure messages, the 5G ProSe Layer-3 UE-to-UE Relay obtains the target 5G ProSe Layer-3 End UE's Layer-2 ID for future communication, for signalling and data traffic for this unicast link.
7. The target 5G ProSe Layer-3 End UE sends a Direct Communication Accept message to the 5G ProSe Layer-3 UE-to-UE Relay that has successfully established security with. The parameters included in the Direct Communication Accept message are described in clause 6.4.3.7.
8. For IP traffic, IPv6 prefix or IPv4 address is allocated for the target 5G ProSe Layer-3 End UE as defined in clause 5.5.1.4.
9. After receiving the Direct Communication Accept message from the target 5G ProSe Layer-3 End UE, the 5G ProSe Layer-3 UE-to-UE Relay sends a Direct Communication Accept message to the source 5G ProSe Layer-3 End UE that has successfully established security with. The parameters included in the Direct Communication Accept message are described in clause 6.4.3.7.
10. For IP traffic, IPv6 prefix or IPv4 address is allocated for the source 5G ProSe Layer-3 End UE as defined in clause 5.5.1.4.
11. For IP communication, the 5G ProSe Layer-3 UE-to-UE Relay may store an association of User Info ID and the IP address of target 5G ProSe Layer-3 End UE into its DNS entries, and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 10 if the IP address of target 5G ProSe Layer-3 End UE is not received in step 9, and the 5G ProSe Layer-3 UE-to-UE Relay returns the IP address of the target 5G ProSe Layer-3 End UE to the source 5G ProSe Layer-3 End UE.
   For Ethernet communication, the 5G ProSe Layer-3 UE-to-UE Relay maintains the association between PC5 links and Ethernet MAC addresses received from the 5G ProSe Layer-3 End UE.
   For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.
12. The source 5G ProSe Layer-3 End UE communicates with the target 5G ProSe Layer-3 End UE via the 5G ProSe Layer-3 UE-to-UE Relay.

In the case of one source 5G ProSe Layer-3 End UE communicates with multiple target 5G ProSe Layer-3 End UEs, the PC5 link between the source 5G ProSe Layer-3 End UE and the 5G ProSe Layer-3 UE-to-UE Relay can be shared for multiple target 5G ProSe Layer-3 End UEs per RSC while the PC5 links may be established individually between the 5G ProSe Layer-3 UE-to-UE Relay and target 5G ProSe Layer-3 End UEs per RSC. For the shared PC5 link, the Layer-2 link modification procedure shall be used.

In the case of multiple source 5G ProSe Layer-3 End UEs communicate with one target 5G ProSe Layer-3 End UE, the PC5 link between the 5G ProSe Layer-3 UE-to-UE Relay and the target 5G ProSe Layer-3 End UE can be shared per RSC while the PC5 links may be established individually between the source 5G ProSe Layer-3 End UEs and the 5G ProSe Layer-3 UE-to-UE Relay per RSC. For the shared PC5 link, the Layer-2 link modification procedure shall be used.

[ . . . ]

6.7.1.4 Layer-2 Link Modification for PC5 Communication Via 5G ProSe Layer-3 UE-to-UE Relay FIG. 6.7.1.4-1 shows the Layer-2 link modification procedure via Layer-3 UE-to-UE Relay. This procedure is used to add/modify/remove PC5 QoS Flow(s) in the existing PC5 unicast link as described in clause 6.4.3.7.3.

Figure 11:
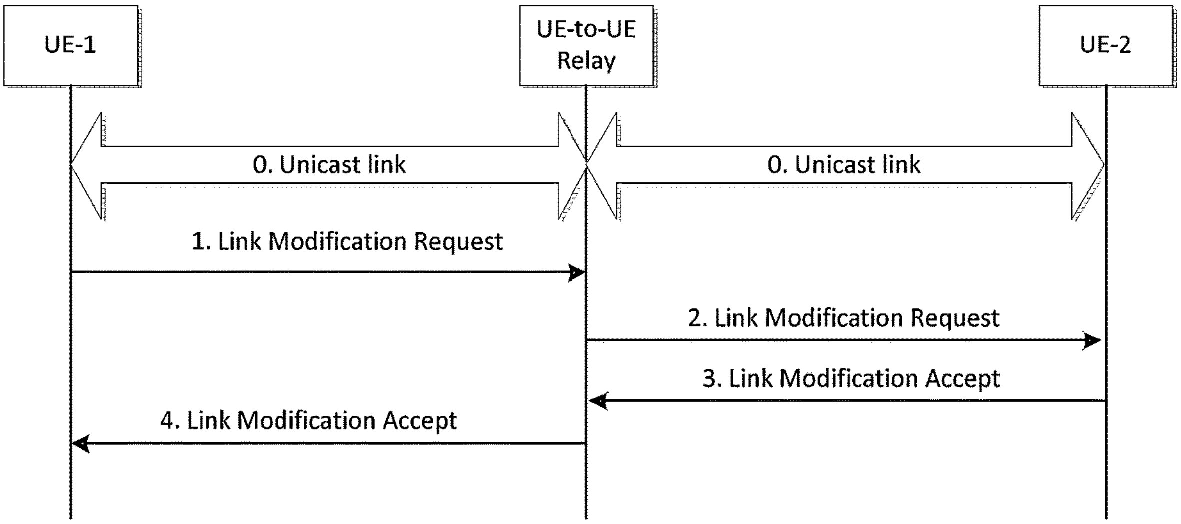
FIG. 11 (PRIOR ART)
FIG. 11 is a reproduction of FIG. 6.7.1.4-1 of 3GPP TS 23.304 V18.2.0.

[FIG. 6.7.1.4-1 of 3GPP TS 23.304 V18.2.0, entitled "Layer-2 link modification procedure via Layer-3 UE-to-UE Relay", is reproduced as FIG. 11]

0. UE-1 and UE-to-UE Relay, and UE-to-UE Relay and UE-2 have a unicast link established as described in clause 6.7.1.1.
1. UE-1 sends a Link Modification Request to UE-to-UE Relay as described in clause 6.4.3.7.3.
2. Upon reception of the Link Modification Request message from UE-1, the UE-to-UE Relay sends a Link Modification Request to UE-2 as described in clause 6.4.3.7.3.
3. UE-2 responds with a Link Modification Accept message to the UE-to-UE Relay as described in clause 6.4.3.7.3.
4. Upon reception of the Link Modification Accept message from UE-2, the UE-to-UE Relay responds with a Link Modification Accept message to the UE-1 as described in clause 6.4.3.7.3.

[ . . . ]

6.7.3 5G ProSe UE-to-UE Relay Communication with Integrated Discovery 6.7.3.1 General 5G ProSe Communication via 5G ProSe UE-to-UE Relay with integrated Discovery is supported.

For 5G ProSe UE-to-UE Relay Communication with integrated Discovery, when a UE allows a UE-to-UE relay to be involved in the Direct Communication Request to the other UE, the UE indicates it by including a relay_indication in the broadcasted Direct Communication Request message.

When a UE-to-UE relay receives a Direct Communication Request including a relay_indication, it decides whether to forward the message according to e.g. Relay Service Code if there is any, Application ID, operator policy per Relay Service Code, signal strength, and local policy.

6.7.3.2 Procedure for Communication Via Layer-3 UE-to-UE Relay

Figure 12:
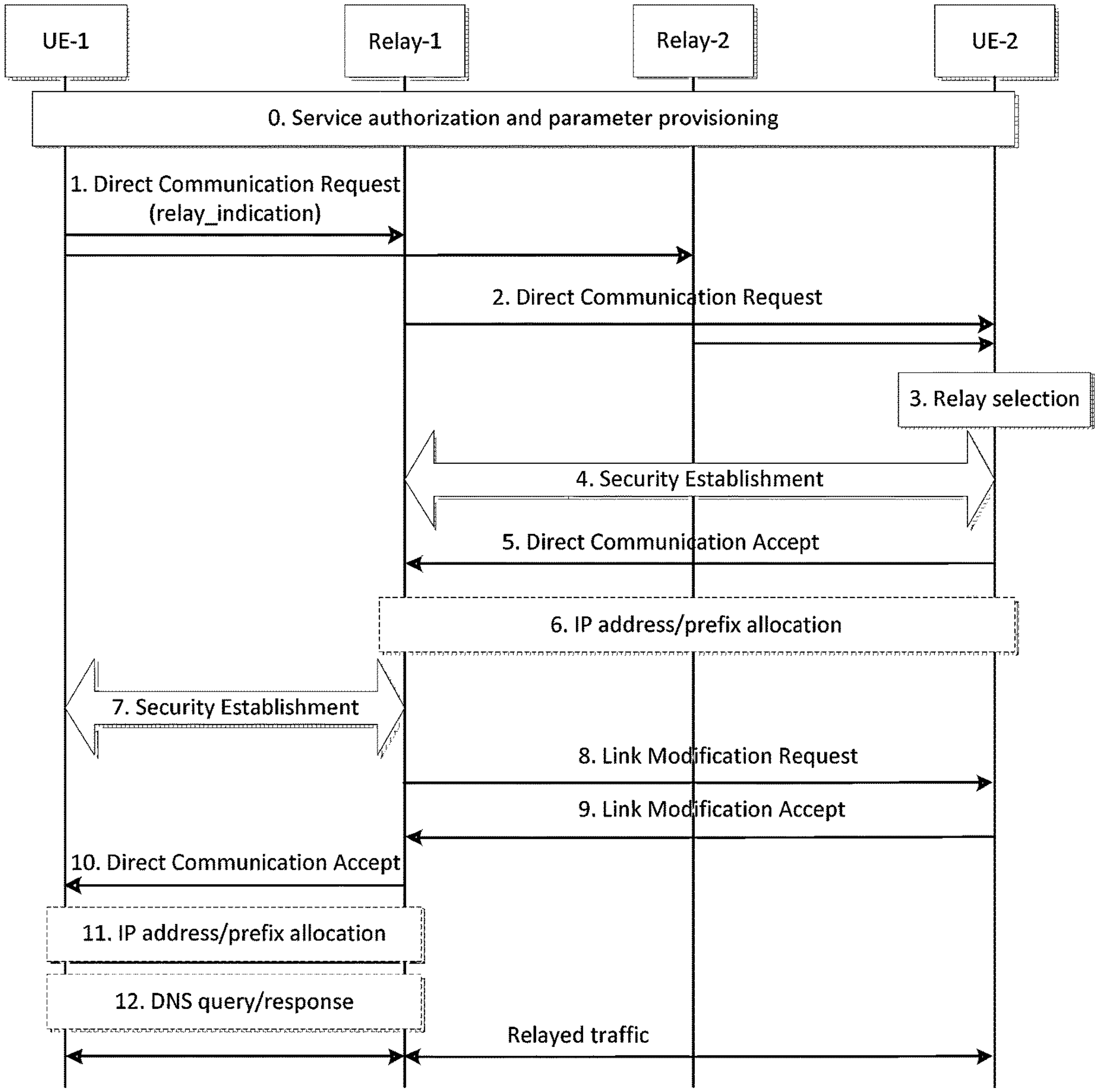
FIG. 12 (PRIOR ART)
FIG. 12 is a reproduction of FIG. 6.7.3.2-1 of 3GPP TS 23.304 V18.2.0.

[FIG. 6.7.3.2-1 of 3GPP TS 23.304 V18.2.0, entitled "5G ProSe UE-to-UE Relay Communication with integrated Discovery via Layer-3 UE-to-UE Relay", is reproduced as FIG. 12]

0. 5G ProSe End UEs are authorized and provisioned with parameters to use the service provided by the 5G ProSe UE-to-UE Relays. 5G ProSe UE-to-UE Relays are authorized and provisioned with parameters to provide service of relaying traffic among 5G ProSe End UEs.
1. The source 5G ProSe End UE (i.e. UE-1) wants to establish a unicast communication with the target 5G ProSe End UE (i.e. UE-2) and broadcasts a Direct Communication Request. The parameters included in the Direct Communication Request message are described in clause 6.4.3.7.

The relay_indication in the Direct Communication Request is used to indicate whether 5G ProSe UE-to-UE Relay can forward the Direct Communication Request message or not. It is also used to limit the number of hops of 5G ProSe UE-to-UE Relay by removing relay_indication in the Direct Communication Request message from the 5G ProSe UE-to-UE Relay.

The Source Layer-2 ID and Destination Layer-2 ID used for the Direct Communication Request message are defined in clause 5.8.5.

NOTE 1: The data type of relay_indication can be determined in Stage 3.

2. When receiving Direct Communication Request with relay_indication from UE-1, the 5G ProSe UE-to-UE Relay (i.e. Relay-1 and Relay-2) may decide to participate in the procedure and broadcast a Direct Communication Request message in its proximity without relay_indication. The parameters included in the Direct Communication Request message are described in clause 6.4.3.7.

The Source Layer-2 ID and Destination Layer-2 ID used for the Direct Communication Request message are defined in clause 5.8.5.
3. When UE-2 receives a Direct Communication Request from one or multiple 5G ProSe UE-to-UE Relays, UE-2 select a 5G ProSe UE-to-UE Relay which UE-2 will respond. UE-2 may select the 5G ProSe UE-to-UE Relay according to e.g. the signal strength, local policy, operator policy per Relay Service Code if any.
4. The security establishment happens between UE-2 and the selected 5G ProSe UE-to-UE Relay (here Relay-1), if needed.

If the existing PC5 link can be reused, Link Modification Request and Link Modification Accept messages are used.

NOTE 2: The conflict between Link Modification Request and Direct Communication Request can be determined in Stage 3.

5. UE-2 replies Direct Communication Accept message to Relay-1. The parameters included in the Direct Communication Accept message are described in clause 6.4.3.7.
6. For IP traffic, IPV6 prefix or IPv4 address is allocated for the target 5G ProSe Layer-3 End UE as defined in clause 5.5.1.4.
7. Security establishment happens between UE-1 and Relay-1, if needed.
8. For 5G ProSe UE-to-UE Relay Communication with integrated Discovery, after receiving QoS Info of the end-to-end QoS from UE-1, Relay-1 provides the QoS info of the second hop QoS to UE-2 with Link Modification Request message.
9. For 5G ProSe UE-to-UE Relay Communication with integrated Discovery, UE-2 responds with a Link Modification Accept message.
10. Relay-1 responds with Direct Communication Accept to the UE-1. The parameters included in the Direct Communication Accept message are described in clause 6.4.3.7.
11. For IP traffic, IPv6 prefix or IPv4 address is allocated for the source 5G ProSe Layer-3 End UE as defined in clause 5.5.1.4.
12. For IP communication, the 5G ProSe Layer-3 UE-to-UE Relay may store an association of User Info ID and the IP address of target 5G ProSe Layer-3 End UE into its DNS entries, and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 11 if the IP address of target 5G ProSe Layer-3 End UE is not received in step 10, and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay is acting as an Ethernet switch by maintaining the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

The source 5G ProSe Layer-3 End UE communicates with the target 5G ProSe Layer-3 End UE via the 5G ProSe Layer-3 UE-to-UE Relay.

3GPP TS 24.554 introduced the following:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links between the UE and multiple target UEs.

The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE 1: The recommended maximum number of established 5G ProSe direct links is 8. When the 5G ProSe direct link establishment procedure for a 5G ProSe layer-3 remote UE completes successfully and if there is a PDU session established for relaying the traffic of the 5G ProSe remote UE, the 5G ProSe layer-3 UE-to-network relay UE shall perform the remote UE report procedure as specified in 3GPP TS 24.501 [11].

NOTE 2: A single PC5 unicast link is established between a 5G ProSe layer-2 UE-to-network relay UE and a 5G ProSe layer-2 remote UE for supporting PDU sessions of the 5G ProSe layer-2 remote UE, as specified in 3GPP TS 38.300 [21].

7.2.2.2 5G ProSe Direct Link Establishment Procedure Initiation by Initiating UE The initiating UE shall meet the following pre-conditions before initiating this procedure:

a) a request from upper layers to transmit the packet for ProSe application over PC5 or a request from lower layers to trigger ProSe direct link establishment;
b) the communication mode is unicast mode (e.g., pre-configured as specified in clause 5.2.4 or indicated by upper layers);
c) the link layer identifier for the initiating UE (i.e., layer-2 ID used for unicast communication) is available (e.g., pre-configured or self-assigned) and is not being used by other existing 5G ProSe direct links within the initiating UE;
d) the link layer identifier for the destination UE (i.e., the unicast layer-2 ID of the target UE or the broadcast layer-2 ID) is available to the initiating UE (e.g., pre-configured, obtained as specified in clause 5.2, known via prior ProSe direct communication or indicated by lower layers);

NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.

e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, is authorized to use a 5G ProSe UE-to-network relay UE, is authorized to use a 5G ProSe UE-to-UE relay UE or is authorized to act as a 5G ProSe UE-to-UE relay UE. The UE considers that it is not served by NG-RAN if the following conditions are met:
   1) not served by NG-RAN for ProSe direct communication over PC5;
   2) in limited service state as specified in 3GPP TS 23.122 [14], if the reason for the UE being in limited service state is one of the following;
      i) the UE is unable to find a suitable cell in the selected PLMN as specified in 3GPP TS 38.304 [15];
      ii) the UE received a REGISTRATION REJECT message or a SERVICE REJECT message with the 5GMM cause #11 "PLMN not allowed" as specified in 3GPP TS 24.501 [11]; or
      iii) the UE received a REGISTRATION REJECT message or a SERVICE REJECT message with the 5GMM cause #7 "5GS services not allowed" as specified in 3GPP TS 24.501 [11]; or
   3) in limited service state as specified in 3GPP TS 23.122 for reasons other than i), ii) or iii) above and located in a geographical area for which the UE is provisioned with "non-operator managed" radio parameters as specified in clause 5.2;

Editor's note: The UE behavior in limited service state if the 5G ProSe direct link establishment procedure is for direct communication between the 5G ProSe end UE and the 5G ProSe UE-to-UE relay UE needs to be revisited, which will be determined by SA2.

f) there is no existing 5G ProSe direct link for the pair of peer application layer IDs, or there is an existing 5G ProSe direct link for the pair of peer application layer IDs and:
   1) the network layer protocol of the existing 5G ProSe direct link is not identical to the network layer protocol required by the upper layer in the initiating UE for this ProSe application;
   2) the security policy (either signalling security policy or user plane security policy) corresponding to the ProSe identifier is not compatible with the security policy of the existing 5G ProSe direct link; or
   3) in case of the 5G ProSe direct link establishment procedure is for direct communication between the 5G ProSe layer-3 remote UE and the 5G ProSe layer-3 UE-to-network relay UE, the existing 5G ProSe direct link for the peer UE is established with a different RSC or established not for direct communication between the 5G ProSe layer-3 remote UE and the 5G ProSe layer-3 UE-to-network relay UE;
   4) in case of the 5G ProSe direct link establishment procedure is for direct communication between the 5G ProSe layer-2 remote UE and the 5G ProSe layer-2 UE-to-network relay UE, the existing 5G ProSe direct link for the peer UE is established not for direct communication between the 5G ProSe layer-2 remote UE and the 5G ProSe layer-2 UE-to-network relay UE; or
   5) in case of the 5G ProSe direct link establishment procedure is for direct communication between the 5G ProSe layer-3 end UE and the 5G ProSe layer-3 UE-to-UE relay UE, the existing 5G ProSe direct link for the peer UE is established with a different RSC or established not for direct communication between the 5G ProSe layer-3 end UE and the 5G ProSe layer-3 UE-to-UE relay UE;
g) the number of established 5G ProSe direct links is less than the implementation-specific maximum number of established 5G ProSe direct links allowed in the UE at a time;
h) timer T5088 is not associated with the link layer identifier for the destination UE or timer T5088 associated with the link layer identifier for the destination UE has already expired or stopped.
i) a PROSE DIRECT LINK MODIFICATION REQUEST message is received from the 5G ProSe layer-3 end UE to establish 5G ProSe UE-to-UE relay communication with additional 5G ProSe layer-3 end UE(s) as specified in clause 7.2.3.2, in case that the UE acts as a 5G ProSe layer-3 UE-to-UE relay UE, the 5G ProSe direct link modification procedure is initiated over an existing 5G ProSe direct link for direct communication between the 5G ProSe layer-3 end UE and the 5G ProSe layer-3 UE-to-UE relay UE, and there is no existing 5G ProSe direct link between the 5G ProSe layer-3 UE-to-UE relay UE and the additional target 5G ProSe layer-3 end UE; and j) the initiating UE has received a PROSE DIRECT LINK ESTABLISHMENT REQUEST message including the relay indication, and the initiating UE is acting as the 5G ProSe UE-to-UE relay UE and the 5G ProSe direct link establishment procedure is for direct communication between the 5G ProSe UE-to-UE relay UE and the 5G ProSe end UE After receiving the service data or request from the upper layers, the initiating UE shall derive the PC5 QoS parameters and assign the PQFI(s) for the PC5 QoS flows(s) to be established as specified in clause 7.2.7.

If the 5G ProSe direct link establishment procedure is for direct communication between the 5G ProSe remote UE and the 5G ProSe UE-to-network relay UE, then the UE shall apply the DUCK or DUSK with the associated encrypted bitmask used for UE-to-network relay discovery along with the UTC-based counter for encrypting:

a) the relay service code; and b) the UP-PRUK ID or CP-PRUK ID, if available, as specified in clause 6.3.5.2 of 3GPP TS 33.503 [34], and the UE shall use the security protected relay service code and the security protected UP-PRUK ID or security protected CP-PRUK ID for creating a PROSE DIRECT LINK ESTABLISHMENT REQUEST message.

NOTE 2: If the UE is neither configured with DUCK nor DUSK, the relay service code and the UP-PRUK ID or CP-PRUK ID are not encrypted.

If the 5G ProSe direct link establishment procedure is for direct communication between the 5G ProSe UE-to-UE relay UE and the target 5G ProSe end UE, if the initiating UE upon receiving a PROSE DIRECT LINK ESTABLISHMENT REQUEST message using integrated discovery (i.e. with destination L2 ID set to broadcast value as specified in clause 5.2.4 and relay indication is included) cannot identify an existing 5G ProSe direct link established between the initiating UE and the target UE, the initiating UE acting as the 5G ProSe UE-to-UE relay UE initiates the 5G ProSe direct link establishment procedure to the target 5G ProSe end UE.

If the 5G ProSe direct link establishment procedure is for direct communication between the 5G ProSe UE-to-UE relay UE and the target 5G ProSe end UE, without integrated discovery, upon successful completion of the 5G ProSe direct link security mode control procedure with the source 5G ProSe end UE, the initiating UE acting as the 5G ProSe UE-to-UE relay UE initiates the 5G ProSe direct link establishment procedure to the target 5G ProSe end UE.

Editor's note: When the direct link modification procedure can be used between the 5G ProSe UE-to-UE relay UE and the target 5G ProSe end UE is FFS.

In order to initiate the 5G ProSe direct link establishment procedure, the initiating UE shall create a PROSE DIRECT LINK ESTABLISHMENT REQUEST message. The initiating UE:

a) shall include the source user info set to the initiating UE's application layer ID received from upper layers, or set to the user info ID of the source 5G ProSe end UE if the 5G ProSe direct link establishment procedure is for 5G ProSe direct communication between the 5G ProSe end UE and the 5G ProSe UE-to-UE relay UE;

b) shall include the ProSe identifier(s) received from upper layer if the 5G ProSe direct link establishment procedure is not for 5G ProSe direct communication between the 5G ProSe remote UE and the 5G ProSe UE-to-network relay UE;

c) shall include the target user info set to the target UE's application layer ID if received from upper layers or if known based on the unicast layer-2 ID of target UE (i.e. destination layer-2 ID) as described in clause 5.8.2.4 of 3GPP TS 23.304 [3], to the user info ID of the 5G ProSe UE-to-network relay UE obtained during the 5G ProSe UE-to-network relay discovery procedure, or to the user info ID of the target 5G ProSe end UE:

1) if the initiating UE is acting as the source 5G ProSe end UE and the user info ID of the target 5G ProSe end UE is obtained during the 5G ProSe UE-to-UE relay discovery procedure; or 2) if the initiating UE is acting as the 5G ProSe UE-to-UE relay UE and the user info ID of the target 5G ProSe end UE is obtained in the PROSE DIRECT LINK ESTABLISHMENT REQUEST message or PROSE DIRECT LINK MODIFICATION REQUEST message from the source 5G ProSe end UE;

ca) shall include the UE-to-UE relay UE user info set to the user info ID of the 5G ProSe UE-to-UE relay UE:

1) if obtained during the 5G ProSe UE-to-UE relay discovery procedure and the 5G ProSe direct link establishment procedure is for 5G ProSe direct communication between the source 5G ProSe end UE and the 5G ProSe UE-to-UE relay UE; or 2) if the initiating UE is acting as the 5G ProSe UE-to-UE relay UE and user info ID is configured at configuration parameters for 5G ProSe UE-to-UE relay as specified in clause 5.2.7;

cb) shall include the target end UE layer-2 ID set to the layer-2 ID of the target 5G ProSe end UE, if the initiating UE is acting as the source 5G ProSe end UE and the layer-2 ID of the target 5G ProSe end UE is available in the source 5G ProSe end UE via the previous direct communication;

d) if the 5G ProSe direct link is not for direct communication between the 5G ProSe remote UE and the 5G ProSe UE-to-network relay UE:

1) shall include the key establishment information container if the UE PC5 unicast signalling integrity protection policy is set to "Signalling integrity protection required" or "Signalling integrity protection preferred" and may include the key establishment information container if the UE PC5 unicast signalling integrity protection policy is set to "Signalling integrity protection not needed";

NOTE 3: The key establishment information container is provided by upper layers.

e) shall include:

1) a Nonce_1, if the direct communication is not between the 5G ProSe remote UE and the 5G ProSe UE-to-network relay UE, or if the direct communication is between the 5G ProSe remote UE and the 5G ProSe UE-to-network relay UE and the security procedure over control plane is used as specified in 3GPP TS 33.503 [34]; or 2) a $K_{NRP}$ freshness parameter 1, if the direct communication is between the 5G ProSe remote UE and the 5G ProSe UE-to-network relay UE and the security procedure over user plane is used as specified in 3GPP TS 33.503 [34];

set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";

NOTE 4: The Nonce_1 IE in the PROSE DIRECT LINK ESTABLISHMENT REQUEST message is used to hold the value of Nonce_1 or $K_{NRP}$ freshness parameter 1.

f) shall include its UE security capabilities indicating the list of algorithms that the initiating UE supports for the security establishment of this 5G ProSe direct link;

g) shall include the MSB of $K_{NRP-sess}$ ID chosen by the initiating UE as specified in 3GPP TS 33.503 if the UE PC5 unicast signalling integrity protection policy is set to "Signalling integrity protection required" or "Signalling integrity protection preferred";

NOTE 5: If the direct communication is not between the 5G ProSe remote UE and the 5G ProSe UE-to-network relay UE, the $K_{NRP-sess}$ ID holds the ID that corresponds to $K_{NRP-sess}$. If the direct communication is between the 5G ProSe remote UE and the 5G ProSe UE-to-network relay UE, the $K_{NRP-sess}$ ID holds the ID that corresponds to $K_{NRP-sess}$ (if security procedure over user plane is used) or $K_{relay-sess}$ (if security procedure over control plane is used).

h) may include a $K_{NRP}$ ID if the initiating UE has an existing $K_{NRP}$ for the target UE and the direct communication is not between the 5G ProSe remote UE and the 5G ProSe UE-to-network relay UE;

i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe remote UE and 5G ProSe UE-to-network relay UE, the Signalling integrity protection policy shall be set to "Signalling integrity protection required";

j) shall include the Relay service code IE set to the relay service code of the target relay UE if the 5G ProSe direct link establishment procedure is for direct communication between the 5G ProSe remote UE and the 5G ProSe UE-to-network relay UE, or to the relay service code indicating the connectivity service requested by the source 5G ProSe end UE if the 5G ProSe direct link establishment procedure is for direct communication between the (source or target) 5G ProSe end UE and the 5G ProSe UE-to-UE relay UE;

k) shall include the UTC-based counter LSB set to the four least significant bits of the UTC-based counter if the 5G ProSe direct link establishment procedure is for direct communication between the 5G ProSe remote UE and the 5G ProSe UE-to-network relay UE;

l) shall include the UE identity IE set to the SUCI of the initiating UE if:

1) the 5G ProSe direct link establishment procedure is for direct communication between the 5G ProSe remote UE and the 5G ProSe UE-to-network relay UE; and 2) the security for 5G ProSe UE-to-network relay uses the security procedure over control plane and the initiating UE does not have a valid CP-PRUK as specified in 3GPP TS 33.503 [34], or, the security for 5G ProSe UE-to-network relay uses the security procedure over user plane and the initiating UE does not have a valid UP-PRUK as specified in 3GPP TS 33.503 [34];

m) shall include the User security key ID IE set to:

1) UP-PRUK ID of the initiating UE if:

i) the 5G ProSe direct link establishment procedure is for direct communication between the 5G ProSe remote UE and the 5G ProSe UE-to-network relay UE;

ii) the initiating UE has a valid UP-PRUK; and iii) the security for 5G ProSe UE-to-network relay uses the security procedure over user plane as specified in 3GPP TS 33.503 [34]; or 2) CP-PRUK ID of the initiating UE that is associated with the relay service code of the target UE if:

i) the 5G ProSe direct link establishment procedure is for direct communication between the 5G ProSe remote UE and the 5G ProSe UE-to-network relay UE;

ii) the initiating UE has a valid CP-PRUK is associated with the relay service code of the target UE; and iii) the security for 5G ProSe UE-to-network relay uses the security procedure over control plane as specified in 3GPP TS 33.503 [34];

n) shall include the HPLMN ID of the initiating UE, if the UP-PRUK ID of the initiating UE is included and is not in NAI format (see 3GPP TS 33.503 [34]);

o) shall include the MIC IE set to the calculated MIC value as specified in clause 6.3.5.3 of 3GPP TS 33.503 if the 5G ProSe direct link establishment procedure is for direct communication between the 5G ProSe remote UE and the 5G ProSe UE-to-network relay UE and the UE has the DUIK; and p) shall include the relay indication which indicates that the PROSE DIRECT LINK ESTABLISHMENT REQUEST message can be forwarded by a 5G ProSe UE-to-UE relay UE, if the 5G ProSe direct link establishment procedure is for direct communication between the source 5G ProSe end UE and 5G ProSe UE-to-UE relay UE;

Editor's note: The security parameters for 5G ProSe UE-to-UE relay and the parameters for 5G ProSe layer-2 UE-to-UE relay are FFS.

After the PROSE DIRECT LINK ESTABLISHMENT REQUEST message is generated, the initiating UE shall pass this message to the lower layers for transmission along with the source layer-2 ID and destination layer-2 ID as follows:

a) if the 5G ProSe direct communication is in a consequence of 5G ProSe direct discovery as defined in clause 6.2.14, clause 6.2.15, clause 8.2.1, and clause 8a.2.1: self-assign a source layer-2 ID, and 1) the destination layer-2 ID set to the received target end UE layer-2 ID in the PROSE DIRECT LINK ESTABLISHMENT REQUEST message or PROSE DIRECT LINK MODIFICATION REQUEST message from the source 5G ProSe end UE if the initiating UE is acting as the 5G ProSe UE-to-UE relay UE;

2) otherwise, the destination layer-2 ID set to the source layer-2 ID in the received PROSE PC5 DISCOVERY message for discovery procedure;

b) if the initiating UE is acting as the source 5G ProSe end UE and the 5G ProSe direct link establishment procedure is for direct communication between the source 5G ProSe end UE and 5G ProSe UE-to-UE relay UE with integrated discovery:

self-assign a source layer-2 ID, and set the destination layer-2 ID to the broadcast destination layer-2 ID configured as specified in clause 5.2.4; or c) if the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery:

self-assign a source layer-2 ID, and set the destination layer-2 ID to:

1) the target end UE layer-2 ID, if received in the PROSE DIRECT LINK ESTABLISHMENT REQUEST message from the source 5G ProSe end UE; otherwise 2) the broadcast destination layer-2 ID configured as specified in clause 5.2.4; or d) otherwise:

self-assign a source layer-2 ID, and the destination layer-2 ID set to the destination layer-2 ID used for unicast initial signalling as specified in clause 5.2.4, NOTE 6: The UE implementation ensures that any value of the self-assigned source layer-2 ID in a) and b) is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 6A: The UE implementation ensures that any value of the self-assigned source layer-2 ID in a) and b) is different from any self-assigned source layer-2 ID(s) in use for 5G ProSe direct communication of a data unit type different from the data unit type of the 5G ProSe direct link being established, if the 5G ProSe direct link establishment procedure is for 5G ProSe direct communication between the 5G ProSe layer-3 UE-to-UE relay UE and the target 5G ProSe layer-3 end UE.

NOTE 6B: The UE implementation ensures that any value of the self-assigned source layer-2 ID in a) and b) is different from any other self-assigned source layer-2 ID(s) in use for 5G ProSe direct communication for Unstructured traffic and a different pair of the user info ID of the source 5G ProSe end UE and the user info ID of the target 5G ProSe end UE, if the 5G ProSe direct link establishment procedure is for 5G ProSe direct communication between the 5G ProSe layer-3 UE-to-UE relay UE and the target 5G ProSe layer-3 end UE and for Unstructured traffic.

NOTE 7: It is possible for the initiating UE to reuse the initiating UE's layer-2 ID used in previous 5G ProSe direct link with the same peer UE, except when the 5G ProSe direct link establishment procedure is for 5G ProSe direct communication between the 5G ProSe layer-3 UE-to-UE relay UE and the target 5G ProSe layer-3 end UE for Unstructured traffic and a different pair of the user info ID of the source 5G ProSe end UE and the user info ID of the target 5G ProSe end UE, and except when the 5G ProSe direct link establishment procedure is for 5G ProSe direct communication between the 5G ProSe layer-3 UE-to-UE relay UE and the target 5G ProSe layer-3 end UE for a data unit type different than the data unit type of the previous 5G ProSe direct link.

and start timer T5080.

NOTE 8: A default PC5 DRX configuration is used for transmitting the PROSE DIRECT LINK ESTABLISHMENT REQUEST message as specified in 3GPP TS 38.300 [21].

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.

NOTE 9: In order to ensure successful 5G ProSe direct link establishment, T5080 should be set to a value larger than the sum of T5089 and T5092.

Figure 13:
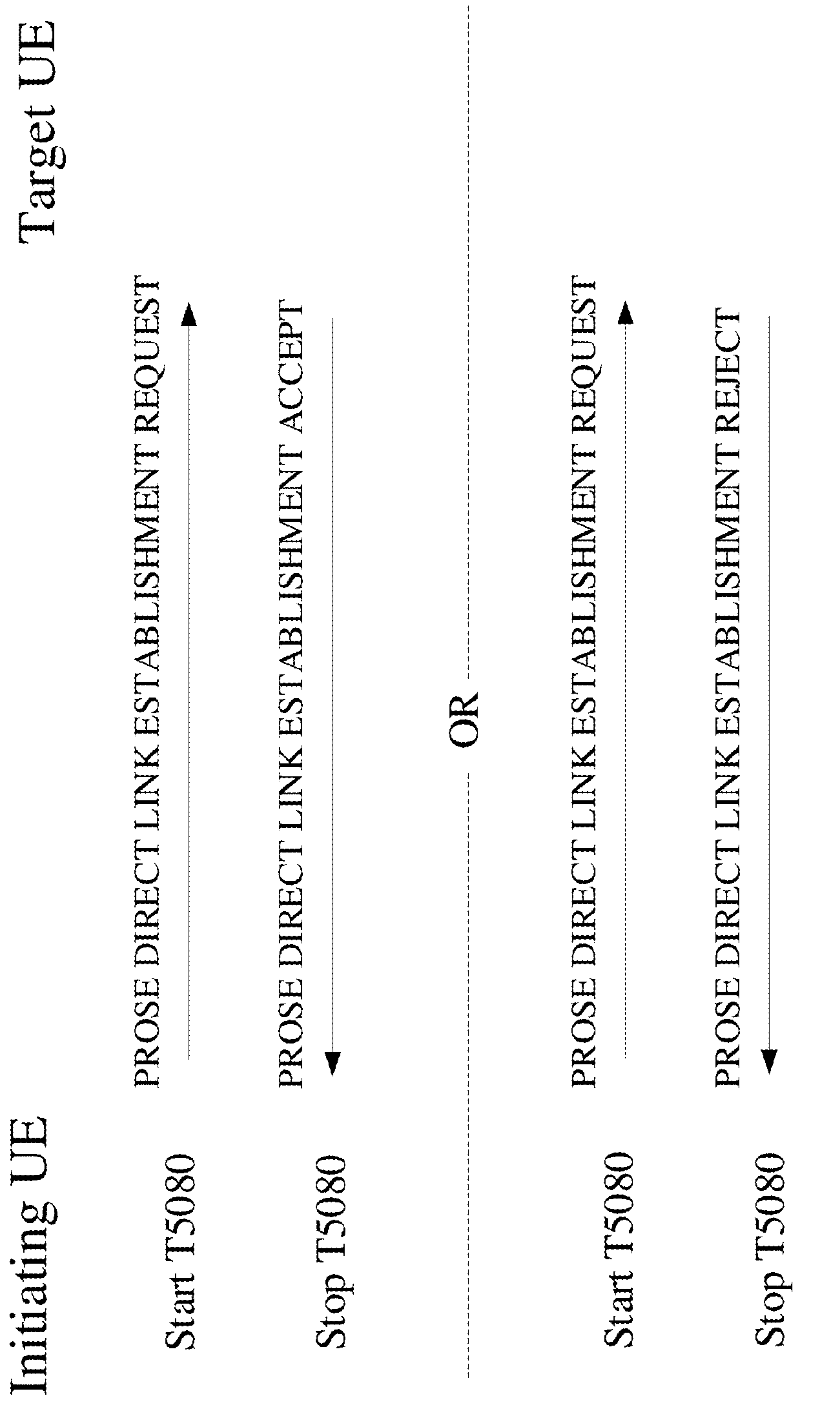
FIG. 13 (PRIOR ART)
FIG. 13 is a reproduction of FIG. 6.7.3.3-1 of 3GPP TS 23.304 V18.2.0.

[FIG. 7.2.2.2.1 of 3GPP TS 24.554 V18.1.0, entitled "UE oriented 5G ProSe direct link establishment procedure", is reproduced as FIG. 13]

Figure 14:
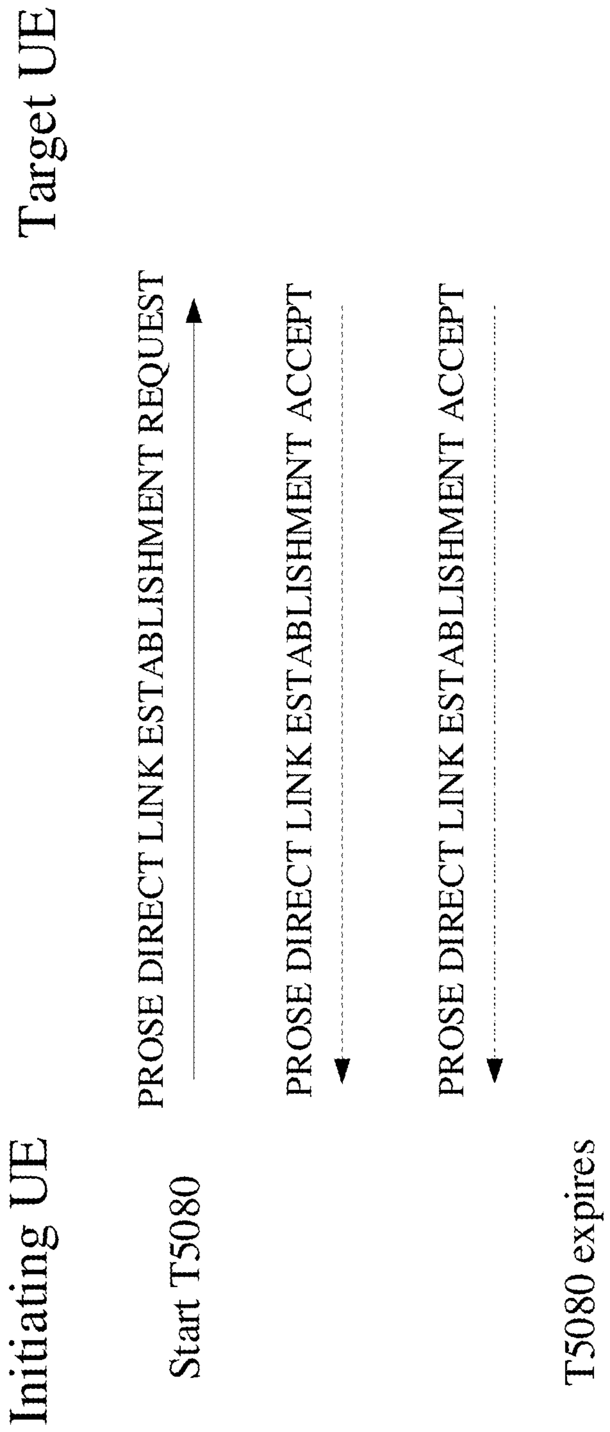
FIG. 14 (PRIOR ART)
FIG. 14 is a reproduction of FIG. 7.2.2.2.2 of 3GPP TS 24.554 V18.1.0.

[FIG. 7.2.2.2.2 of 3GPP TS 24.554 V18.1.0, entitled "ProSe service oriented 5G ProSe direct link establishment procedure", is reproduced as FIG. 14]

7.2.2.3 5G ProSe Direct Link Establishment Procedure Accepted by the Target UE

Upon receipt of a PROSE DIRECT LINK ESTABLISHMENT REQUEST message, if the target UE accepts this request, the target UE shall uniquely assign a PC5 link identifier, create a 5G ProSe direct link context.

NOTE 1: A default PC5 DRX configuration is used for receiving the PROSE DIRECT LINK ESTABLISHMENT REQUEST message as specified in 3GPP TS 38.300 [21].

If the PROSE DIRECT LINK ESTABLISHMENT REQUEST message is for 5G ProSe direct communication between the 5G ProSe remote UE and the 5G ProSe UE-to-network relay UE, the target UE shall verify the MIC field in the received PROSE DIRECT LINK ESTABLISHMENT REQUEST with the DUIK, if any, and decrypts the encrypted:

a) relay service code; and b) UP-PRUK ID or CP-PRUK ID, if received, using the DUCK, or DUSK with the associated encrypted bitmask used for 5G ProSe UE-to-network relay discovery (see clause 6.3.5.2 of 3GPP TS 33.503 [34]) and verifies if the relay service code matches with the one that the target UE has sent during 5G ProSe UE-to-network relay discovery procedure.

NOTE 2: If the UE is neither configured with DUCK nor DUSK, the relay service code and the UP-PRUK ID or CP-PRUK ID are not encrypted.

If the target UE is acting as the target 5G ProSe end UE and the 5G ProSe direct link establishment procedure is for direct communication between the 5G ProSe UE-to-UE relay UE and target 5G ProSe end UE with integrated discovery, the target UE upon receiption of the PROSE DIRECT LINK ESTABLISHMENT REQUEST messages which contain the same source user info, ProSe identifier(s)

and relay service code as received from multiple 5G ProSe UE-to-UE relay UEs, selects one of the 5G ProSe UE-to-UE relay UEs via which to communicate with the source 5G ProSe end UE as specified in TS 23.304, clause 6.7.3.2.

If the 5G ProSe direct link establishment procedure is not for direct communication between the 5G ProSe remote UE and the 5G ProSe UE-to-network relay UE, the target UE may initiate 5G ProSe direct link authentication procedure as specified in clause 7.2.12 and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, the target UE shall proceed with either:

a) the authentication and key agreement procedure as specified in clause 5.5.4 of 3GPP TS 24.501 if the security procedure over control plane as specified in 3GPP TS 33.503 is used; or b) the key request procedure as specified in clause 8.2.10.2.4 if the security procedure over user plane as specified in 3GPP TS 33.503 is used;

and shall initiate 5G ProSe direct link security mode control procedure as specified in clause 7.2.10.

The target UE shall set the source layer-2 ID and the destination layer-2 ID as specified in clause 7.2.12 and clause 7.2.10, and store the corresponding source layer-2 ID for unicast communication and the destination layer-2 ID for unicast communication in the 5G ProSe direct link context.

If:

a) the target user info IE is included in the PROSE DIRECT LINK ESTABLISHMENT REQUEST message and this IE includes the target UE's application layer ID; or b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;

then the target UE shall:

a) if the direct communication is not between the 5G ProSe remote UE and the 5G ProSe UE-to-network relay UE:

1) identify an existing $K_{NRP}$ based on the $K_{NRP}$ ID included in the PROSE DIRECT LINK ESTABLISHMENT REQUEST message; or 2) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12;

b) if the direct communication is between the 5G ProSe remote UE and the 5G ProSe UE-to-network relay UE and the security procedure over control plane as specified in 3GPP TS 33.503 [34] is used, request a new $K_{NR\_ProSe}$ according to the security procedure over user plane as specified in 3GPP TS 33.503 [34]; or c) if the direct communication is between the 5G ProSe remote UE and the 5G ProSe UE-to-network relay UE and the security procedure over user plane as specified in 3GPP TS 33.503 [34] is used, request a new $K_{NRP}$ according to the security procedure over user plane.

NOTE 3: How many times the 5G ProSe direct link authentication procedure needs to be performed to derive a new $K_{NRP}$ depends on the authentication method used.

After an existing $K_{NRP}$ was identified or a new $K_{NRP}$ was derived, or after a new $K_{NRP}$ or $K_{NR\_ProSe}$ is received, the target UE shall initiate a 5G ProSe direct link security mode control procedure as specified in clause 7.2.10.

Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

Before sending the PROSE DIRECT LINK ESTABLISHMENT ACCEPT message to the 5G ProSe remote UE, the target UE acting as a 5G ProSe layer-3 UE-to-network relay UE initiates the UE requested PDU session establishment procedure as specified in 3GPP TS 24.501 if:

1) the PDU session for relaying the service associated with the RSC has not been established yet; or 2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:

a) shall include the source user info set to the target UE's application layer ID received from upper layers, or set to the user info ID of the target 5G ProSe end UE if the 5G ProSe direct link establishment procedure is for 5G ProSe direct communication between the 5G ProSe end UE and the 5G ProSe UE-to-UE relay UE;

aa) shall include the UE-to-UE relay UE user info set to the user info ID of the 5G ProSe UE-to-UE relay UE if the 5G ProSe direct link establishment procedure is for 5G ProSe direct communication between the source 5G ProSe end UE and the 5G ProSe UE-to-UE relay UE;

b) shall include PQFI(s), the corresponding PC5 QoS parameters and optionally the ProSe identifier(s) that the target UE accepts, if the target UE is not acting as a 5G ProSe layer-2 UE-to-network relay UE and the 5G ProSe direct link establishment procedure is not with integrated discovery and not for 5G ProSe direct communication between the target 5G ProSe end UE and the 5G ProSe UE-to-UE relay UE;

c) may include the PC5 QoS rule(s) if the target UE is not acting as a 5G ProSe layer-2 UE-to-network relay UE and the 5G ProSe direct link establishment procedure is not with integrated discovery and not for 5G ProSe direct communication between the target 5G ProSe end UE and the 5G ProSe UE-to-UE relay UE;

Editor's note: It is FFS how to forward the PC5 QoS parameters and the PQFI(s) for the PC5 QoS flow(s) between the 5G ProSe layer-3 UE-to-UE relay UE and the 5G ProSe layer-3 end UE.

d) shall include an IP address configuration IE set to one of the following values if IP communication is used and the target UE is not acting as a 5G ProSe layer-2 UE-to-network relay UE:

1) "DHCPv4 server" if only IPV4 address allocation mechanism is supported by the target UE, i.e., acting as a DHCPv4 server;

2) "IPV6 router" if only IPV6 address allocation mechanism is supported by the target UE, i.e., acting as an IPv6 router;

3) "DHCPv4 server & IPV6 Router" if both IPv4 and IPV6 address allocation mechanism are supported by the target UE; or 4) "address allocation not supported" if neither IPv4 nor IPV6 address allocation mechanism is supported by the target UE and the target UE is not acting as a 5G ProSe layer-3 UE-to-network relay UE;

NOTE 4: The UE doesn't include an IP address configuration IE nor a link local IPV6 address IE if Ethernet or Unstructured data unit type is used for communication.

e) shall include a link local IPv6 address IE formed locally based on IETF RFC 4862 if IP address configuration IE is set to "address allocation not supported", the received PROSE DIRECT LINK SECURITY MODE COMPLETE message included a link local IPV6 address IE and the target UE is neither acting as a 5G ProSe layer-2 UE-to-network relay UE nor acting as a 5G ProSe layer-3 relay UE;

f) shall include the configuration of UE PC5 unicast user plane security protection based on the agreed user plane security policy, as specified in 3GPP TS 33.503 [34];

Editor's note: The security parameters for 5G ProSe UE-to-UE relay and the parameters for 5G ProSe layer-2 UE-to-UE relay are FFS.

g) if the 5G ProSe direct link establishment procedure is for 5G ProSe direct communication between the source or target 5G ProSe layer-3 end UE and the 5G ProSe layer-3 UE-to-UE relay UE, and for Ethernet traffic, shall include the MAC address of the target 5G ProSe layer-3 end UE; and h) may include a target 5G ProSe layer-3 end UE IP address IE set to the IP address of the target 5G ProSe layer-3 end UE, if the 5G ProSe direct link establishment procedure is for 5G ProSe direct communication between the source 5G ProSe layer-3 end UE and the 5G ProSe layer-3 UE-to-UE relay UE, and the data unit type for the communication is IP.

Editor's note: The security parameters for 5G ProSe UE-to-UE relay and the parameters for 5G ProSe layer-2 UE-to-UE relay are FFS.

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication and shall start timer T5090 if:

a) at least one of ProSe identifiers for the 5G ProSe direct links satisfies the privacy requirements as specified in clause 5.2.4; or b) T5090 is configured as specified in clause 5.2.5.

NOTE 5: Two UEs negotiate the PC5 DRX configuration in the AS layer, and the PC5 DRX parameter values are configured per pair of source and destination Layer-2 IDs in the AS layer, as specified in 3GPP TS 38.300 [21].

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:

a) the PC5 link identifier self-assigned for this 5G ProSe direct link;

b) PQFI(s) and its corresponding PC5 QoS parameters, if available; and c) an indication of activation of the PC5 unicast user plane security protection for the 5G ProSe direct link, if applicable.

If the target UE accepts the 5G ProSe direct link establishment request and the 5G ProSe direct link is established not for 5G ProSe direct communication between the 5G ProSe remote UE and the 5G ProSe UE-to-network relay UE and not for 5G ProSe direct communication between the 5G ProSe end UE and the 5G ProSe UE-to-UE relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6. If the 5G ProSe direct link is established for 5G ProSe direct communication between the 5G ProSe layer-3 end UE and the 5G ProSe layer-3 UE-to-UE relay UE, then the target UE may perform the PC5 QoS flow establishment over 5G ProSe direct link as specified in clause 8a.2.7.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

If the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery, the initiating UE upon receipt of the PROSE DIRECT LINK ESTABLISHMENT ACCEPT message from the target 5G ProSe end UE, shall initiate the 5G ProSe direct link security mode control procedure with the source 5G ProSe end UE, and the initiating UE upon successful completion of the 5G ProSe direct link security mode control procedure with the source 5G ProSe end UE, shall create a PROSE DIRECT LINK ESTABLISHMENT ACCEPT message as specified in clause 7.2.2.3 to send to the source 5G ProSe end UE.

After receiving the PROSE DIRECT LINK ESTABLISHMENT ACCEPT message, the initiating UE shall provide the following information along with the layer-2 IDs to the lower layer, which enables the lower layer to handle the coming PC5 signalling or traffic data:

a) the PC5 link identifier self-assigned for this 5G ProSe direct link;

b) PQFI(s) and its corresponding PC5 QoS parameters, if available; and c) an indication of activation of the PC5 unicast user plane security protection for the 5G ProSe direct link, if applicable.

The initiating UE shall start timer T5090 if:

a) at least one of ProSe identifiers for the 5G ProSe direct links satisfies the privacy requirements as specified in clause 5.2.4; or b) T5090 is configured as specified in clause 5.2.5.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE and the initiating UE received at least one PROSE DIRECT LINK ESTABLISHMENT ACCEPT message, it is up to the UE implementation to consider the 5G ProSe direct link establishment procedure as complete or to restart the timer T5080.

If the 5G ProSe direct link establishment procedure is triggered by a PROSE DIRECT LINK MODIFICATION REQUEST message from the source 5G ProSe layer-3 end UE as specified in clause 7.2.3.2, upon receipt of the PROSE DIRECT LINK ESTABLISHMENT ACCEPT message, the initiating UE shall send a PROSE DIRECT LINK MODIFICATION ACCEPT message to the source 5G ProSe layer-3 end UE as specified in clause 7.2.3.3, if the initiating UE acts as the 5G ProSe layer-3 UE-to-UE relay UE.

7.2.2.5 5G ProSe Direct Link Establishment Procedure not Accepted by the Target UE If the PROSE DIRECT LINK ESTABLISHMENT REQUEST message cannot be accepted, the target UE shall send a PROSE DIRECT LINK ESTABLISHMENT REJECT message. The PROSE DIRECT LINK ESTABLISHMENT REJECT message contains a PC5 signalling protocol cause IE set to one of the following cause values:

#1 direct communication to the target UE not allowed; #3 conflict of layer-2 ID for unicast communication is detected;

#5 lack of resources for 5G ProSe direct link;

#13 congestion situation;

#15 security procedure failure of 5G ProSe UE-to-network relay;

#20 Failure from 5G ProSe end UE; or #111 protocol error, unspecified.

If the target UE is not allowed to accept the PROSE DIRECT LINK ESTABLISHMENT REQUEST message, e.g., based on operator policy or configuration parameters for ProSe direct communication over PC5 as specified in clause 5.2, or the target UE is acting as a 5G ProSe layer-3 UE-to-network relay UE, is in non-allowed area of its serving PLMN and the corresponding relay service code is not associated with high priority access as defined in clause 5.3.5 of 3GPP TS 24.501 [11], the target UE shall send a PROSE DIRECT LINK ESTABLISHMENT REJECT message containing PC5 signalling protocol cause value #1 "direct communication to the target UE not allowed".

NOTE 1: When the target UE acting as a 5G ProSe layer-3 UE-to-network relay UE is involved into its own emergency services as specified in 3GPP TS 24.501 [11] or is handling an emergency services of another 5G ProSe layer-3 remote UE, and receives PROSE DIRECT LINK ESTABLISHMENT REQUEST message with an RSC that is specific for emergency services, the target UE is allowed to ignore the PROSE DIRECT LINK ESTABLISHMENT REQUEST message if the target UE decides to prioritize its own ongoing emergency services or prioritize the handling of the emergency services of the other 5G ProSe layer-3 remote UE, due to local regulations or implementation specific requirements.

For a received PROSE DIRECT LINK ESTABLISHMENT REQUEST message from a layer-2 ID (for unicast communication), if the target UE already has an existing link established to a UE using this layer-2 ID or is currently processing a PROSE DIRECT LINK ESTABLISHMENT REQUEST message from the same layer-2 ID and with one of following parameters different from the existing link or the link for which the link establishment is in progress:

a) the source user info;

b) type of data (e.g., IP, Ethernet or Unstructured); or c) security policy, the target UE shall send a PROSE DIRECT LINK ESTABLISHMENT REJECT message containing PC5 signalling protocol cause value #3 "conflict of layer-2 ID for unicast communication is detected".

NOTE 2: If the UE is processing a PROSE DIRECT DISCOVERY message from the same source layer-2 ID of the received PROSE DIRECT LINK ESTABLISHMENT REQUEST message, it depends on UE implementation to avoid the conflict of destination layer-2 ID (e.g. send a PROSE DIRECT LINK ESTABLISHMENT REJECT message containing PC5 signalling protocol cause value #3 "conflict of layer-2 ID for unicast communication is detected", or ignore the PROSE DIRECT DISCOVERY message).

NOTE 3: The type of data (e.g., IP. Ethernet or Unstructured) is indicated by the optional IP address configuration IE included in the corresponding DIRECT LINK SECURITY MODE COMPLETE message, i.e., the type of data for the requested link is IP type if this IE is included and the type of data for the requested link is Ethernet or Unstructured if this IE is not included.

If the 5G ProSe direct link establishment fails due to the implementation-specific maximum number of established 5G ProSe direct links has been reached, or other temporary lower layer problems causing resource constraints, the target UE shall send a PROSE DIRECT LINK ESTABLISHMENT REJECT message containing PC5 signalling protocol cause value #5 "lack of resources for 5G ProSe direct link".

If the 5G ProSe direct link establishment request is for 5G ProSe UE-to-network relaying and:

a) the NAS level mobility management congestion control as specified in clause 5.3.9 of TS 24.501 is activated at the target UE acting as the 5G ProSe UE-to-network relay UE; or b) the target UE acting as the 5G ProSe UE-to-network relay UE is under congestion;

the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message. The target UE shall not accept any 5G ProSe direct link establishment request for relaying if the back-off timer for NAS level mobility management congestion control is running.

If the 5G ProSe direct link establishment request is for 5G ProSe UE-to-network relaying, the NAS level session management congestion as specified in clause 6.2.7 and in clause 6.2.8 of TS 24.501 is activated at the target UE which is acting as a 5G ProSe layer-3 UE-to-network relay UE, and the relay service code used in the 5G ProSe direct link establishment corresponds to a DNN and/or S-NSSAI for which the NAS level session management congestion is activated, and the target UE needs to perform the PDU session establishment procedure for the DNN and/or S-NSSAI or the PDU session modification procedure for the DNN and/or S-NSSAI, then the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message.

NOTE 4: How the target UE determines that it is under congestion is implementation specific (e.g., any relaying related operational overhead, etc).

NOTE 5: In case the target UE is under the NAS level mobility management congestion control, it is an implementation option that the provided back-off timer value to the initiating UE is set to the remaining time of the mobility management back-off timer T3346 or with an additional offset value.

If the 5G ProSe direct link establishment request is for 5G ProSe layer-3 UE-to-network relaying, the request required the establishment of a PDU session by the 5G ProSe layer-3 UE-to-network relay UE which is a target UE, and the PDU session establishment was unsuccessful due to the reception of 5GSM cause #8 "maximum number of PDU sessions reached", #27 "Missing or unknown DNN", #28 "Unknown PDU session type", #29 "user authentication or authorization failed", #31 "request rejected, unspecified", #32 "service option not supported", #33 "requested service option not subscribed", or #65 "maximum number of PDU sessions reached" as specified in 3GPP TS 24.501 [11], the target UE shall send a PROSE DIRECT LINK ESTABLISHMENT REJECT message containing PC5 signalling protocol cause value #111 "protocol error, unspecified".

If the 5G ProSe direct link establishment request is for 5G ProSe UE-to-UE relay and:

a) the target UE acting as a target 5G ProSe end UE is under congestion;

the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message. The initiating UE, acting as a 5G ProSe UE-to-UE relay UE, upon reception of PROSE DIRECT LINK ESTABLISHMENT REJECT message from the target 5G ProSe end UE, and the 5G ProSe direct link establishment procedure is for direct communication between the source 5G ProSe end UE and the 5G ProSe UE-to-UE relay UE, the target 5G ProSe end UE has rejected the 5G ProSe direct link establishment procedure or the 5G ProSe direct link modification procedure, the reject message contains a backoff value, and the initiating UE has not reached the maximum number of allowed retransmissions, the initiating UE shall inform (message TBD) the source 5G ProSe end UE that target 5G ProSe end UE has rejected the link establishment or link modification request and shall provide the cause value from the target 5G ProSe end UE.

Editor's note: How the target 5G ProSe end UE informs the 5G ProSe UE-to-UE relay UE that has rejected the link establishment or link modification request is for FFS.

The initiating UE, acting as a 5G ProSe UE-to-UE relay UE, upon reception of PROSE DIRECT LINK ESTABLISHMENT REJECT message from the target 5G ProSe end UE, the 5G ProSe direct link establishment procedure is for direct communication between the source 5G ProSe end UE and the 5G ProSe UE-to-UE relay UE, the target 5G ProSe end UE has rejected the 5G ProSe direct link establishment procedure or the 5G ProSe direct link modification procedure, the reject message contains a backoff value, and the initiating UE has reached the maximum number of allowed retransmissions, the initiating UE may send a PROSE DIRECT LINK ESTABLISHMENT REJECT message with the appropriate PC5 signalling protocol cause value to the source 5G ProSe end UE. The initiaing UE shall include in the PROSE DIRECT LINK ESTABLISHMENT REJECT message PC5 protocol cause value #xx "Failure from 5G ProSe end UE" and include the PC5 end UE failure cause IE set to #13 "congestion situation" received from the target 5G ProSe end UE that has rejected the 5G ProSe direct link establishment or 5G ProSe direct link modification procedure. The initiating UE may include the target end UE info IE set to the user info ID of the target 5G ProSe end UE in the PROSE DIRECT LINK ESTABLISHMENT REJECT message.

If the 5G ProSe direct link establishment request is for 5G ProSe UE-to-UE relay and:

a) the target UE acting as a 5G ProSe UE-to-UE relay UE is under congestion;

the target UE shall send a PROSE DIRECT LINK ESTABLISHMENT REJECT message containing PC5 signalling protocol cause value #13 "congestion situation". The target UE may provide a back-off timer value to the initiating UE in the PROSE DIRECT LINK ESTABLISHMENT REJECT message. If the 5G ProSe direct link establishment procedure is for direct communication between the 5G ProSe remote UE and the 5G ProSe UE-to-network relay UE and it fails due to a failure in the security procedure over control plane or security procedure over user plane as specified in 3GPP TS 33.503 [34], the target UE shall send a PROSE DIRECT LINK ESTABLISHMENT REJECT message containing PC5 signalling protocol cause value #15 "security procedure failure of 5G ProSe UE-to-network relay". The target UE shall provide the EAP message if received from the network according to the security procedure over control plane as specified in 3GPP TS 33.503 [34].

If the target UE is acting as a target 5G ProSe end UE and the 5G ProSe direct link establishment procedure is between the 5G ProSe UE-to-UE relay UE and the target 5G ProSe end UE, the target 5G ProSe end UE may include in the PROSE DIRECT LINK ESTABLISHMENT REJECT message:

a) the source end UE info IE set to the user info ID of the source 5G ProSe end UE;

b) the target end UE info IE set to the user info ID of the target 5G ProSe end UE; and c) the UE-to-UE relay UE info IE set to the user info ID of the 5G ProSe UE-to-UE relay UE.

If the target UE is acting as a 5G ProSe UE-to-UE relay UE, the 5G ProSe direct link establishment procedure is between the source 5G ProSe end UE and the 5G ProSe UE-to-UE relay UE, and the target 5G ProSe end UE has rejected the 5G ProSe direct link establishment procedure or the 5G ProSe direct link modification procedure, then the 5G ProSe UE-to-UE relay UE shall send a PROSE DIRECT LINK ESTABLISHMENT REJECT message with PC5 signalling protocol cause value #20 "Failure from 5G ProSe end UE" to the source 5G ProSe end UE. The 5G ProSe UE-to-UE relay UE may include in the PROSE DIRECT LINK ESTABLISHMENT REJECT message the PC5 end UE failure cause IE set to the PC5 signalling protocol cause received from the target 5G ProSe end UE that has rejected the 5G ProSe direct link establishment procedure. The 5G ProSe UE-to-UE relay UE may include in the PROSE DIRECT LINK ESTABLISHMENT REJECT message:

a) the source end UE info IE set to the user info ID of the source 5G ProSe end UE;
b) the target end UE info IE set to the user info ID of the target 5G ProSe end UE; and
c) the UE-to-UE relay UE info IE set to the user info ID of the 5G ProSe UE-to-UE relay UE.

NOTE 6: The cause value #15 "security procedure failure of 5G ProSe UE-to-network relay" is also used when the CP-PRUK or the UP-PRUK is not found in the network.

If the 5G ProSe direct link establishment fails due to other reasons, the target UE shall send a PROSE DIRECT LINK ESTABLISHMENT REJECT message containing PC5 signalling protocol cause value #111 "protocol error, unspecified".

After sending the PROSE DIRECT LINK ESTABLISHMENT REJECT message, the target UE shall provide the following information along with the initiating UE's layer-2 ID for unicast communication and the target UE's layer-2 ID for unicast communication to the lower layer:

a) an indication of deactivation of the PC5 unicast security protection and deletion of security context for the 5G ProSe direct link, if applicable.

Upon receipt of the PROSE DIRECT LINK ESTABLISHMENT REJECT message, the initiating UE shall stop timer T5080 and abort the 5G ProSe direct link establishment procedure. If the PC5 signalling protocol cause value in the PROSE DIRECT LINK ESTABLISHMENT REJECT message is #1 "direct communication to the target UE not allowed" or #5 "lack of resources for 5G ProSe direct link", then the initiating UE shall not attempt to start the 5G ProSe direct link establishment procedure with the same target UE at least for a time period T. If the PC5 signalling protocol cause value in the PROSE DIRECT LINK ESTABLISHMENT REJECT message is #13 "congestion situation" and a back-off timer value is provided in the PROSE DIRECT LINK ESTABLISHMENT REJECT message, the initiating UE shall start timer T5088 associated with the layer-2 ID of the target UE and set its value to the provided timer value. If the PC5 signalling protocol cause value in the PROSE DIRECT LINK ESTABLISHMENT REJECT message is #15 "security procedure failure of 5G ProSe UE-to-network relay", and initiating UE has included the UE identity IE set to SUCI in the PROSE DIRECT LINK ESTABLISHMENT REQUEST message, then the initiating UE shall initiate the UE-to-network relay reselection procedure as specified in clause 8.2.3. If the PC5 signalling protocol cause value in the PROSE DIRECT LINK ESTABLISHMENT REJECT message is #15 "security procedure failure of 5G ProSe UE-to-network relay" and the initiating UE has included the User security key ID IE set to UP-PRUK ID or CP-PRUK ID in the PROSE DIRECT LINK ESTABLISHMENT REQUEST message, then the initiating UE may initiate the UE-to-network relay reselection procedure as specified in clause 8.2.3 and the UE shall further:

a) if the same 5G ProSe UE-to-network relay UE is selected, discard the previously used CP-PRUK and associated CP-PRUK ID, or the UP-PRUK and associated UP-PRUK ID, if any, and include the UE identity IE set to SUCI in the PROSE DIRECT LINK ESTABLISHMENT REQUEST when initiating the subsequent 5G ProSe direct link establishment procedure as specified in clause 7.2.2.2; or
b) if a different 5G ProSe UE-to-network relay UE is selected, include the User security key ID IE set to the previously used UP-PRUK ID or CP-PRUK ID in the PROSE DIRECT LINK ESTABLISHMENT REQUEST message.

NOTE 7: The length of time period T is UE implementation specific and can be different for the case when the UE receives PC5 signalling protocol cause value #1 "direct communication to the target UE not allowed" or when the UE receives PC5 signalling protocol cause value #5 "lack of resources for 5G ProSe direct link".

Editor's note: The security related contents are FFS and depend on SA3 requirements.

After receiving the PROSE DIRECT LINK ESTABLISHMENT REJECT message, the initiating UE shall provide the following information along with the initiating UE's layer-2 ID for unicast communication and the target UE's layer-2 ID for unicast communication to the lower layer:

a) an indication of deactivation of the PC5 unicast security protection and deletion of security context for the 5G ProSe direct link, if applicable.

7.2.2.6 Abnormal Cases 7.2.2.6.1 Abnormal Cases at the Initiating UE

If timer T5080 expires and the Target user info IE is included in the PROSE DIRECT LINK ESTABLISHMENT REQUEST message, the initiating UE shall retransmit the PROSE DIRECT LINK ESTABLISHMENT REQUEST message and restart timer T5080. After reaching the maximum number of allowed retransmissions, the initiating UE shall abort the 5G ProSe direct link establishment procedure and may notify the upper layer that the target UE is unreachable. Upon expiry of the timer T5080, if the PROSE DIRECT LINK ESTABLISHMENT REQUEST message did not include the Target user info IE and the initiating UE did not receive any PROSE DIRECT LINK ESTABLISHMENT ACCEPT message, the initiating UE may retransmit the PROSE DIRECT LINK ESTABLISHMENT REQUEST message and restart timer T5080. If the PROSE DIRECT LINK ESTABLISHMENT REQUEST message did not include the Target user info IE and the initiating UE did not receive any PROSE DIRECT LINK ESTABLISHMENT ACCEPT message, then after reaching the maximum number of allowed retransmissions, the initiating UE shall abort the 5G ProSe direct link establishment procedure and may notify the upper layer that no target UE is available.

NOTE: The maximum number of allowed retransmissions is UE implementation specific.

If the need to establish a link no longer exists before the procedure is completed, the initiating UE shall abort the procedure.

When the initiating UE aborts the 5G ProSe direct link establishment procedure, the initiating UE shall provide the following information along with the initiating UE's layer-2 ID for unicast communication and the target UE's layer-2 ID for unicast communication to the lower layer:

a) an indication of deactivation of the PC5 unicast security protection and deletion of security context for the 5G ProSe direct link, if applicable.

7.2.2.6.2 Abnormal Cases at the Target UE

For a received PROSE DIRECT LINK ESTABLISHMENT REQUEST message from a source layer-2 ID (for unicast communication), if the target UE already has an existing link established to the UE known to use the same source layer-2 ID, the same source user info, the same type of data (IP, Ethernet or Unstructured) and the same security policy, the UE shall process the new request. However, the target UE shall only delete the existing 5G ProSe direct link context after the new link establishment procedure succeeds.

NOTE: The type of data (e.g., IP, Ethernet or Unstructured) is indicated by the optional IP address configuration IE included in the corresponding PROSE DIRECT LINK SECURITY MODE COMPLETE message, i.e., the type of data for the requested link is IP type if this IE is included and the type of data for the requested link is Ethernet or Unstructured if this IE is not included.

If the PROSE DIRECT LINK ESTABLISHMENT REQUEST message is for 5G ProSe direct communication between the 5G ProSe remote UE and the 5G ProSe UE-to-network relay UE, after the target UE decrypts the encrypted relay service code using the DUIK, DUSK, or DUCK with the associated encrypted bitmask used for 5G ProSe UE-to-network relay discovery, if the relay service code does not match with the one that the target UE has sent during 5G ProSe UE-to-network relay discovery procedure, then the target UE shall abort the 5G ProSe direct link establishment procedure.

If the PROSE DIRECT LINK ESTABLISHMENT REQUEST message is for 5G ProSe direct communication between the 5G ProSe remote UE and the 5G ProSe UE-to-network relay UE, the message is integrity protected and the integrity verification of the message fails at the target UE, then the target UE shall abort the 5G ProSe direct link establishment procedure.

7.2.3 5G ProSe Direct Link Modification Procedure 7.2.3.1 General

The purpose of the 5G ProSe direct link modification procedure is to modify the existing ProSe direct link to:

a) add new PC5 QoS flow(s) to the existing 5G ProSe direct link;
b) modify existing PC5 QoS flow(s) for updating PC5 QoS parameters of the existing PC5 QoS flow(s);
c) modify existing PC5 QoS flow(s) for associating new ProSe application(s) with the existing PC5 QoS flow(s);
d) modify existing PC5 QoS flow(s) for removing the associated ProSe application(s) from the existing PC5 QoS flow(s);
e) remove existing PC5 QoS flow(s) from the existing 5G ProSe direct link;
f) negotiate a new 5G ProSe UE-to-UE relay UE over the existing 5G ProSe direct link;
g) establish 5G ProSe UE-to-UE relay communication with additional 5G ProSe layer-3 end UE(s) using the existing 5G ProSe direct link between the 5G ProSe layer-3 end UE and 5G ProSe layer-3 UE-to-UE relay UE; or
h) release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE.

In this procedure, the UE sending the PROSE DIRECT LINK MODIFICATION REQUEST message is called the "initiating UE" and the other UE is called the "target UE".

NOTE: The 5G ProSe direct link modification procedure is not applicable for 5G ProSe layer-2 UE-to-network relay case.

7.2.3.2 5G ProSe Direct Link Modification Procedure Initiated by Initiating UE

The initiating UE shall meet the following pre-conditions before initiating this procedure for adding a new ProSe application to the existing 5G ProSe direct link:

a) there is a 5G ProSe direct link between the initiating UE and the target UE;
b) the pair of application layer IDs and the network layer protocol of this 5G ProSe direct link are identical to those required by the application layer in the initiating UE for this ProSe application; c) the security policy corresponding to the ProSe identifier is aligned with the security policy of the existing 5G ProSe direct link;
d) the timer T5091 is not running; and
e) the initiating UE is not performing the 5G ProSe direct link re-keying procedure initiated by the target UE.

The initiating UE shall meet the following pre-conditions before initiating this procedure for negotiating a new 5G ProSe UE-to-UE relay UE over the existing 5G ProSe direct link:

a) the initiating UE is a source 5G ProSe end UE communicating with the target 5G ProSe end UE via a 5G ProSe UE-to-UE relay UE;
b) the initiating UE determines, e.g., based on PC5 signal strength, to perform UE-to-UE relay reselection; and
c) the initiating UE obtains a list of candidate UE-to-UE relays via UE-to-UE discovery procedure.

After receiving the service data or request from the upper layers, the initiating UE shall perform the PC5 QoS flow match as specified in clause 7.2.8. If there is no matched PC5 QoS flow, the initiating UE shall derive the PC5 QoS parameters and assign the PQFI(s) for the PC5 QoS flows(s) to be established as specified in clause 7.2.7.

If the 5G ProSe direct link modification procedure is to add new PC5 QoS flow(s) to the existing 5G ProSe direct link, the initiating UE shall create a PROSE DIRECT LINK MODIFICATION REQUEST message. In this message, initiating UE:

a) shall include the PQFI(s), the corresponding PC5 QoS parameters and optionally the ProSe identifier(s);
b) shall include the link modification operation code set to "Add new PC5 QoS flow(s) to the existing 5G ProSe direct link";
c) may include the PC5 QoS rule(s) to indicate the packet filters of the PC5 QoS flow(s);
d) shall include the source end UE info set to the user info ID of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;
e) may include the source end UE info set to the user info ID of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;
f) shall include the target end UE info set to the user info ID of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;

g) may include the target end UE info set to the user info ID of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the 5G ProSe direct link modification procedure is to modify the PC5 QoS parameters for existing PC5 QoS flow(s) in the existing 5G ProSe direct link, the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Modify PC5 QoS parameters of the existing PC5 QoS flow(s)";

c) may include the PC5 QoS rule(s) to indicate the packet filters of the PC5 QoS flow(s);

d) shall include the source end UE info set to the user info ID of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info ID of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info ID of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication multiple target 5G ProSe layer-3 end UEs via the 5G ProSe layer-3 UE-to-UE relay UE using the same 5G ProSe direct link;

g) may include the target end UE info set to the user info ID of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the destination layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the 5G ProSe direct link modification procedure is to associate new ProSe application(s) with existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Associate new ProSe application(s) with existing PC5 QoS flow(s)";

c) may include the PC5 QoS rule(s) to indicate the packet filters of the PC5 QoS flow(s);

d) shall include the source end UE info set to the user info ID of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info ID of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info ID of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;

g) may include the target end UE info set to the user info ID of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the PC5 5G ProSe direct link modification procedure is to remove the associated ProSe application(s) from existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters including the ProSe identifier(s); and
b) shall include the link modification operation code set to "Remove ProSe application(s) from existing PC5 QoS flow(s)".

If the direct link modification procedure is to remove any PC5 QoS flow(s) from the existing 5G ProSe direct link, the initiating UE shall create a PROSE DIRECT LINK MODIFICATION REQUEST message. In this message, the initiating UE:

a) shall include the PQFI(s); and
b) shall include the link modification operation code set to "Remove existing PC5 QoS flow(s) from the existing 5G ProSe direct link".

If the 5G ProSe direct link modification procedure is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the initiating UE shall create a PROSE DIRECT LINK MODIFICATION REQUEST message. In this message, initiating UE:

a) shall include the source end UE info set to the source user info ID of the 5G ProSe layer-3 end UE received in PROSE DIRECT LINK ESTABLISHMENT REQUEST message, if the UE acts as a 5G ProSe layer-3 UE-to-UE relay UE and the 5G ProSe direct link is between the 5G ProSe layer-3 UE-to-UE relay UE and the target 5G ProSe layer-3 end UE;
b) for Ethernet traffic, shall include the MAC address of the source 5G ProSe layer-3 end UE, if the UE acts as a 5G ProSe layer-3 UE-to-UE relay UE and the 5G ProSe direct link is between the 5G ProSe layer-3 UE-to-UE relay UE and the target 5G ProSe layer-3 end UE;
c) shall include the target end UE info set to the user info ID of the additional target 5G ProSe layer-3 end UE to which the 5G ProSe UE-to-UE relay communication is requested, if the UE acts as a source 5G ProSe layer-3 end UE and the 5G ProSe direct link is between the source 5G ProSe layer-3 end UE and the 5G ProSe layer-3 UE-to-UE relay UE;
d) shall include the ProSe identifier(s) received from upper layer if the UE acts as a source 5G ProSe layer-3 end UE, or set to the ProSe identifier(s) received in PROSE DIRECT LINK ESTABLISHMENT REQUEST message if the UE acts as a 5G ProSe layer-3 UE-to-UE relay UE;

Editor's note: It is FFS whether the PQFI(s) and the corresponding PC5 QoS parameters, including the ProSe identifier(s), are included instead of the ProSe identifier(s) only.

Editor's note: It is FFS whether to include and how to set the ProSe identifier(s) for the 5G ProSe direct link between the source 5G ProSe layer-3 end UE and 5G ProSe layer-3 UE-to-UE relay UE, and the 5G ProSe direct link between the 5G ProSe layer-3 UE-to-UE relay UE and the target 5G ProSe layer-3 end UE.

e) shall include the link modification operation code set to "Add new 5G ProSe layer-3 end UE to the existing 5G ProSe direct link"; and
f) may include the target end UE layer-2 ID set to the layer-2 ID of the target 5G ProSe layer-3 end UE, if the UE acts as a source 5G ProSe layer-3 end UE and the 5G ProSe direct link is between the source 5G ProSe layer-3 end UE and the 5G ProSe layer-3 UE-to-UE relay UE.

If the 5G ProSe direct link modification procedure is to release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE, the initiating UE shall create a PROSE DIRECT LINK MODIFICATION REQUEST message. In this message, initiating UE:

a) shall include the source end UE info set to the source user info ID of the 5G ProSe layer-3 end UE received in the PROSE DIRECT LINK RELEASE REQUEST message, if the UE acts as a 5G ProSe layer-3 UE-to-UE relay UE and the 5G ProSe direct link is between the 5G ProSe layer-3 UE-to-UE relay UE and the 5G ProSe layer-3 end UE;
b) shall include the target end UE info set to the user info ID of the peer 5G ProSe layer-3 end UE with which the 5G ProSe UE-to-UE relay communication is to be released, if the UE acts as a 5G ProSe layer-3 end UE and the 5G ProSe direct link is between the 5G ProSe layer-3 end UE and the 5G ProSe layer-3 UE-to-UE relay UE; and
c) shall include the link modification operation code set to "Remove 5G ProSe layer-3 end UE from the existing 5G ProSe direct link".

If the 5G ProSe direct link modification procedure is to trigger UE-to-UE relay reselection, the initiating UE shall create a PROSE DIRECT LINK MODIFICATION REQUEST message. In this message:

1) If the intitiating UE acts as a source 5G ProSe end UE and the 5G ProSe direct link is between the source 5G ProSe end UE and the 5G ProSe UE-to-UE relay UE, the initiating UE:
    a) shall include the relay reselection indication;
    b) shall include the list of candidates 5G ProSe UE-to-UE relay UE user info ID;
    c) shall include the list of target 5G ProSe end UEs IP address/prefix, if IP communication is used; and
    d) may include the list of candidates 5G ProSe UE-to-UE relay UE layer-2 ID.
2) If the initiating UE acts as a 5G ProSe UE-to-UE relay UE and the 5G ProSe direct link is between the 5G ProSe UE-to-UE relay UE and the target 5G ProSe end UE, the initiating UE:
    a) shall include the relay reselection indication;
    b) shall include the list of candidates 5G ProSe UE-to-UE relay UE user info ID;
    c) shall include the initiating source 5G ProSe UE IP address/prefix, if IP communication is used; and
    d) may include list of candidates 5G ProSe UE-to-UE relay UE layer-2 ID.

Editor's note: The PROSE DIRECT LINK MODIFICATION REQUEST message needs to be updated.

If the 5G ProSe direct link modification procedure is to trigger relay reselection and the initiating UE acts as a 5G ProSe UE-to-UE relay UE, the initiating UE shall create a PROSE DIRECT LINK MODIFICATION REQUEST message for every IP address/prefix of the target 5G ProSe UEs received on the associated PROSE DIRECT LINK MODIFICATION REQUEST message from the 5G ProSe source end UE.

After the PROSE DIRECT LINK MODIFICATION REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5081. The UE shall not send a new PROSE DIRECT LINK MODIFICATION REQUEST message to the same target UE while timer T5081 is running.

Figure 15:
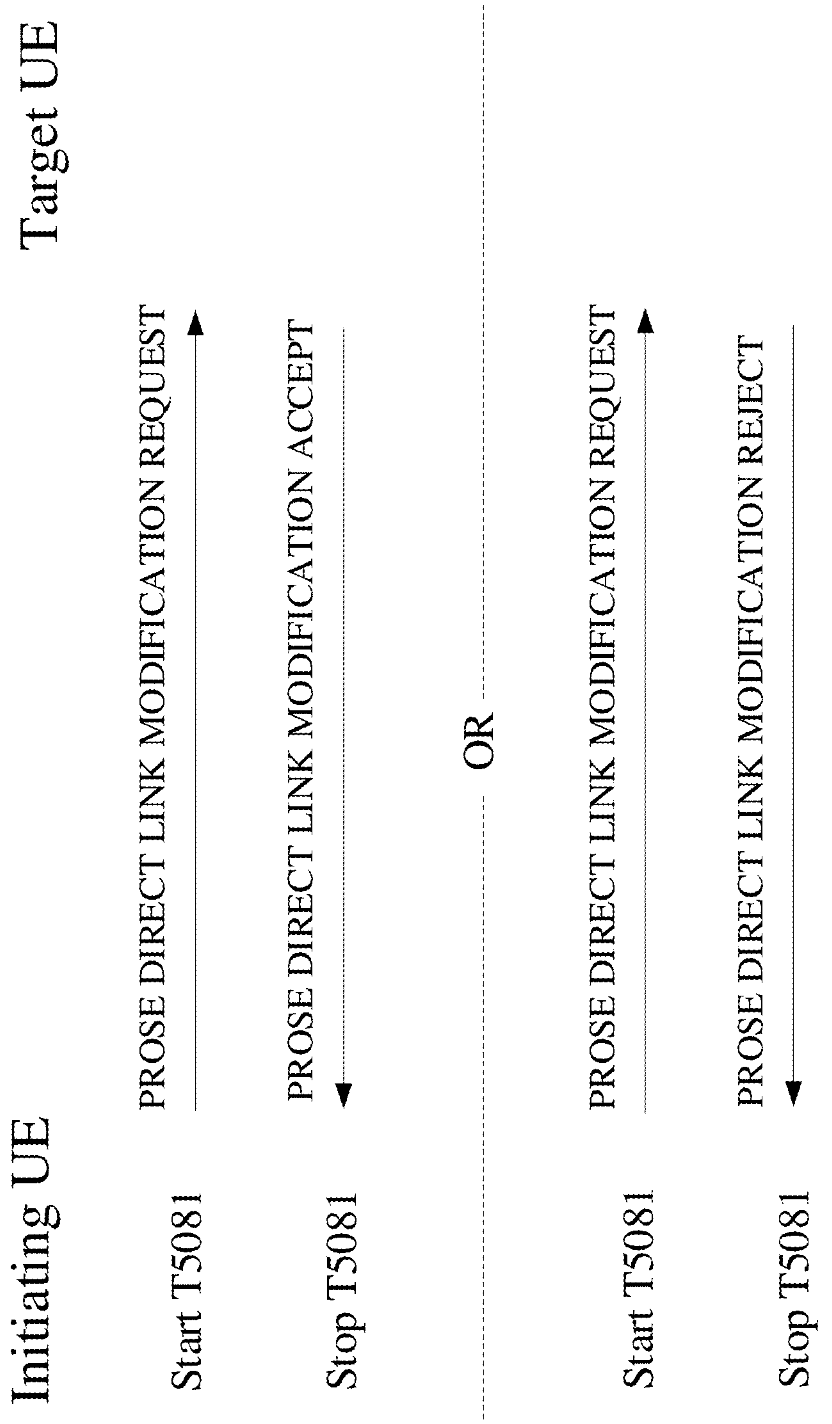
FIG. 15 (PRIOR ART)
FIG. 15 is a reproduction of FIG. 7.2.3.2.1 of 3GPP TS 24.554 V18.1.0.

[FIG. 7.2.3.2.1 of 3GPP TS 24.554 V18.1.0, entitled "5G ProSe direct link modification procedure", is reproduced as FIG. 15]

Figure 16:
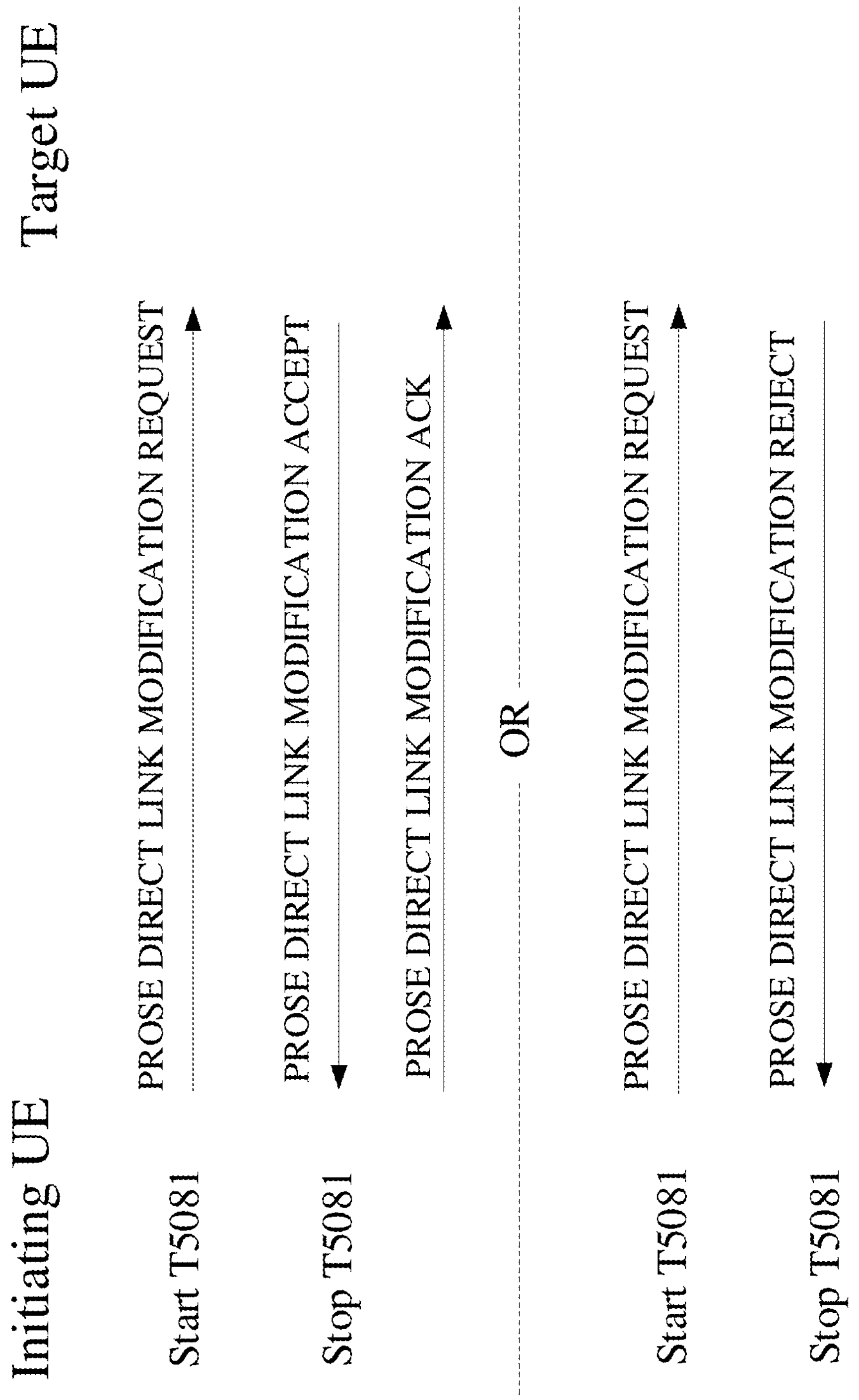
FIG. 16 (PRIOR ART)
FIG. 16 is a reproduction of FIG. 7.2.3.2.2 of 3GPP TS 24.554 V18.1.0.

[FIG. 7.2.3.2.2 of 3GPP TS 24.554 V18.1.0, entitled "5G ProSe direct link modification procedure for Layer-3 UE-to-UE Relay reselection", is reproduced as FIG. 16]

7.2.3.3 5G ProSe Direct Link Modification Procedure Accepted by the Target UE

If the PROSE DIRECT LINK MODIFICATION REQUEST message is accepted, the target UE shall respond with the PROSE DIRECT LINK MODIFICATION ACCEPT message.

If the PROSE DIRECT LINK MODIFICATION REQUEST message is to add a new ProSe application, add new PC5 QoS flow(s) or modify any existing PC5 QoS flow(s) in the 5G ProSe direct link, the target UE:

a) shall include the PQFI(s), the corresponding PC5 QoS parameters and optionally the ProSe identifier(s) that the target UE accepts;
b) may include the PC5 QoS rule(s) to indicate the packet filters of the PC5 QoS flow(s);
c) shall include the source end UE info set to the user info ID of the source 5G ProSe layer-3 end UE, if the UE acts as a target 5G ProSe layer-3 end UE, the 5G ProSe direct link is between the 5G ProSe layer-3 UE-to-UE relay UE and the target 5G ProSe layer-3 end UE, and the target 5G ProSe layer-3 end UE has established direct communication with multiple source 5G ProSe layer-3 end UEs via the 5G ProSe layer-3 UE-to-UE relay UE using the same 5G ProSe direct link; and
d) may include the source end UE info set to the user info ID of the source 5G ProSe end UE, if the UE acts as a target 5G ProSe end UE, the 5G ProSe direct link is between the 5G ProSe UE-to-UE relay UE and the target 5G ProSe end UE, and the target 5G ProSe end UE has established direct communication with only one source 5G ProSe end UEs via the 5G ProSe UE-to-UE relay UE using the 5G ProSe direct link; and
e) shall include the target end UE info set to the user info ID of the target 5G ProSe end UE, if the UE acts as a 5G ProSe UE-to-UE relay UE and, the 5G ProSe direct link is between the source 5G ProSe end UE and the 5G ProSe UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;
f) may include the target end UE info set to the user info ID of the target 5G ProSe end UE, if the UE acts as a 5G ProSe UE-to-UE relay UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link;

in the PROSE DIRECT LINK MODIFICATION ACCEPT message.

If the PROSE DIRECT LINK MODIFICATION REQUEST message is to remove an existing ProSe application from the 5G ProSe direct link, the target UE shall delete the ProSe identifier received in the PROSE DIRECT LINK MODIFICATION REQUEST message and the corresponding PQFI(s) and PC5 QoS parameters from the profile associated with the 5G ProSe direct link. If the PROSE DIRECT LINK MODIFICATION REQUEST message is to remove existing PC5 QoS flow(s) from the PC5 5G ProSe direct link, the target UE shall delete the PQFI(s) and the corresponding PC5 QoS parameters from the profile associated with the 5G ProSe direct link. If the PROSE DIRECT LINK MODIFICATION REQUEST message is to add a new ProSe application, add new PC5 QoS flow(s) or modify any existing PC5 QoS flow(s) in the 5G ProSe direct link, after sending the PROSE DIRECT LINK MODIFICATION ACCEPT message, the target UE shall provide the added or modified PQFI(s) and corresponding PC5 QoS parameters along with PC5 link identifier to the lower layer.

If the PROSE DIRECT LINK MODIFICATION REQUEST message is to remove an existing ProSe application or to remove the existing PC5 QoS flow(s) from the 5G ProSe direct link, after sending the PROSE DIRECT LINK MODIFICATION ACCEPT message, the target UE shall provide the removed PQFI(s) along with the PC5 link identifier to the lower layer.

If the PROSE DIRECT LINK MODIFICATION REQUEST message is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the target UE:

a) if acting as the 5G ProSe layer-3 UE-to-UE relay UE, shall perform the 5G ProSe direct link establishment procedure towards the target 5G ProSe layer-3 end UE as specified in clause 7.2.2.2; and after receiving the PROSE DIRECT LINK ESTABLISHMENT ACCEPT message from the target 5G ProSe layer-3 end UE, shall create a PROSE DIRECT LINK MODIFICATION ACCEPT message;
b) if acting as the target 5G ProSe layer-3 end UE, shall create a PROSE DIRECT LINK MODIFICATION ACCEPT message; and
c) in the PROSE DIRECT LINK MODIFICATION ACCEPT message, the target UE:
    1) if the UE acts as the target 5G ProSe layer-3 end UE, shall include the source end UE info set to the user info ID of the source 5G ProSe layer-3 end UE; or
    2) if the UE acts as the 5G ProSe layer-3 UE-to-UE relay UE:
        i) shall include the target end UE info set to the user info ID of the target 5G ProSe layer-3 end UE;
        ii) for IP traffic, may include the target 5G ProSe layer-3 end UE IP address IE set to the IP address of the additional target 5G ProSe layer-3 end UE; and
        iii) for Ethernet traffic, shall include the MAC address of the target 5G ProSe layer-3 end UE.

If the PROSE DIRECT LINK MODIFICATION REQUEST message is to release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE, the target UE:

a) if acting as the 5G ProSe layer-3 UE-to-UE relay UE, may initiate one of the following procedures towards the target 5G ProSe layer-3 end UE:
    1) 5G ProSe direct link release procedure as specified in clause 7.2.6.2 to release the 5G ProSe direct link with the peer 5G ProSe layer-3 end UE; or 2) 5G ProSe direct link modification procedure as specified in clause 7.2.3.2 to remove the corresponding PC5 QoS flow(s), if the UE determines to keep the 5G ProSe direct link with the peer 5G ProSe layer-3 end UE; and b) shall create a PROSE DIRECT LINK MODIFICATION ACCEPT message, and in this message, the target UE:

1) shall include the source end UE info set to the user info ID of the source 5G ProSe layer-3 end UE, if the UE acts as the target 5G ProSe layer-3 end UE; or 2) shall include the target end UE info set to the user info ID of the target 5G ProSe layer-3 end UE, if the UE acts as the 5G ProSe layer-3 UE-to-UE relay UE.

If the 5G ProSe direct link is for 5G ProSe direct communication between the 5G ProSe remote UE and the 5G ProSe layer-3 UE-to-network relay UE, and if the initiating UE is the 5G ProSe remote UE, then the target UE (as the 5G ProSe layer-3 UE-to-network relay UE) performs the QoS flows handling procedure as specified in clause 8.2.6.3.3 and clause 8.2.6.4.2.

If the PROSE DIRECT LINK MODIFICATION REQUEST message is for UE-to-UE relay UE reselection, the target UE may perform the 5G ProSe UE-to-UE relay discovery procedure with the User Info ID of a candidate 5G ProSe UE-to-UE Relay in discovery message, and may set the Layer-2 ID of the candidate 5G ProSe UE-to-UE relay, if received in the PROSE DIRECT LINK MODIFICATION REQUEST message, as the Destination Layer-2 ID to carry the discovery message.

If the PROSE DIRECT LINK MODIFICATION REQUEST message is accepted to trigger UE-to-UE relay reselection, the target UE shall set up a PC5 unicast link with the selected 5G ProSe UE-to-UE relay UE, if no such PC5 unicast link already exists, and the 5G ProSe direct link is between the target 5G ProSe end UE and the 5G ProSe UE-to-UE relay UE.

If the PROSE DIRECT LINK MODIFICATION REQUEST message is accepted to trigger relay reselection, the target UE shall respond with PROSE DIRECT LINK MODIFICATION ACCEPT message. In this message:

1) If the target UE acts as a target 5G ProSe end UE and the 5G ProSe direct link is between the target 5G ProSe end UE and the 5G ProSe UE-to-UE relay UE, the target UE:

a) shall include the relay reselection indication;

b) shall include the new 5G ProSe UE-to-UE relay UE user info ID;

c) shall include the initiating 5G ProSe end UE IP address; and d) shall include the target 5G ProSe end UE IP address to be used with the newly selected 5G ProSe UE-to-UE relay UE, if IP communication is used.

2) If the target UE acts as a 5G ProSe UE-to-UE relay UE and the 5G ProSe direct link is between the 5G ProSe UE-to-UE relay UE and the source 5G ProSe end UE, the target UE.

a) shall include the relay reselection indication;

b) shall include the new 5G ProSe UE-to-UE relay UE user info ID;

c) shall include the target 5G ProSe end UE IP address; and d) shall include the target 5G ProSe end UE IP address to be used with the newly selected 5G ProSe UE-to-UE relay UE, if IP communication is used.

Editor's note: The PROSE DIRECT LINK MODIFICATION ACCEPT message needs to be updated.

If the target UE accepts the 5G ProSe direct link modification request, then the target UE may perform the PC5 QoS flow establishment over 5G ProSe direct link as specified in clause 7.2.7 and perform the PC5 QoS flow match over 5G ProSe direct link as specified in clause 7.2.8.

7.2.3.4 5G ProSe Direct Link Modification Procedure Completion by the Initiating UE Upon receipt of the PROSE DIRECT LINK MODIFICATION ACCEPT message, the initiating UE shall stop timer T5081.

Upon receipt of the PROSE DIRECT LINK MODIFICATION ACCEPT message, if the PROSE DIRECT LINK MODIFICATION REQUEST message is to add a new ProSe application, add new PC5 QoS flow(s) or modify any existing PC5 QoS flow(s) in the 5G ProSe direct link, the initiating UE shall provide the added or modified PQFI(s) and corresponding PC5 QoS parameters along with PC5 link identifier to the lower layer.

Upon receipt of the PROSE DIRECT LINK MODIFICATION ACCEPT message, if the PROSE DIRECT LINK MODIFICATION REQUEST message is to remove an existing ProSe application or to remove the existing PC5 QoS flow(s) from the 5G ProSe direct link, the initiating UE shall provide the removed PQFI(s) along with the PC5 link identifier to the lower layer.

Upon receipt of the PROSE DIRECT LINK MODIFICATION ACCEPT message, if the PROSE DIRECT LINK MODIFICATION REQUEST message is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the initiating UE shall send a PROSE DIRECT LINK ESTABLISHMENT ACCEPT message to the source 5G ProSe layer-3 end UE as specified in clause 7.2.2.3, if the initiating UE acts as the 5G ProSe layer-3 UE-to-UE relay UE.

Editor's note: It is FFS whether to include and how to set the ProSe identifier(s) for the 5G ProSe direct link between the source 5G ProSe layer-3 end UE and 5G ProSe layer-3 UE-to-UE relay UE, and the 5G ProSe direct link between the 5G ProSe layer-3 UE-to-UE relay UE and the target 5G ProSe layer-3 end UE.

Upon receiving PROSE DIRECT LINK MODIFICATION ACCEPT message, that includes relay reselection indication, if the PROSE DIRECT LINK MODIFICATION REQUEST message is for Layer-3 UE-to-UE relay reselection, the initiating UE shall set up a PC5 unicast link with the selected 5G ProSe UE-to-UE relay UE, if no such PC5 unicast link already exists, and shall create a PROSE DIRECT LINK MODIFICATION ACK message. In this message, the initiating UE:

a) shall include the relay reselection indication, IP address of the initiating 5G ProSe UE to be used with the newly selected 5G ProSe UE-to-UE relay UE and IP address of the target 5G ProSe end UE, if IP communication is used, and if:

1) the UE acts as a source 5G ProSe end UE and the 5G ProSe direct link is between the source 5G ProSe end UE and the 5G ProSe UE-to-UE relay UE; or b) shall include the relay reselection indication, IP address of the target 5G ProSe end UE to be used with the newly selected 5G ProSe UE-to-UE relay UE and IP address of the source 5G ProSe end UE, if IP communication is used, and if:

1) the UE acts as a 5G ProSe UE-to-UE relay UE and the 5G ProSe direct link is between the 5G ProSe UE-to-UE relay UE and the target 5G ProSe end UE.

After the PROSE DIRECT LINK MODIFICATION ACK message is generated, the initiating UE shall pass this message to the lower layers for transmission along with the initiating UE's layer-2 ID for 5G ProSe direct communication and the target UE's layer-2 ID for 5G ProSe direct communication.

If the source UE acknowledges the 5G ProSe direct link modification accept, then the source UE starts to receive and/or transmit traffic via the newly selected 5G ProSe UE-to-UE relay UE.

7.2.3.5 5G ProSe Direct Link Modification Procedure not Accepted by the Target UE If the 5G ProSe direct link modification request cannot be accepted, the target UE shall send a PROSE DIRECT LINK MODIFICATION REJECT message. The PROSE DIRECT LINK MODIFICATION REJECT message contains a PC5 signalling protocol cause IE set to one of the following cause values:

#5 lack of resources for 5G ProSe direct link;
#6 required service not allowed;
#12 security policy not aligned;
#16 lack of local capabilities;
#20 Failure from 5G ProSe end UE;
#yy relay UE is not selected for link setup with integrated discovery; or #111 protocol error, unspecified.

If the target UE is not allowed to accept this request, e.g., because the ProSe application to be added is not allowed per the operator policy or configuration parameters for ProSe communication over PC5 as specified in clause 5.2.4, the target UE shall send a PROSE DIRECT LINK MODIFICATION REJECT message with PC5 signalling protocol cause value #6 "required service not allowed".

If the 5G ProSe direct link modification fails due to the congestion problems or other temporary lower layer problems causing resource constraints, the target UE shall send a PROSE DIRECT LINK MODIFICATION REJECT message with PC5 signalling protocol cause value #5 "lack of resources for 5G ProSe direct link".

If the target UE acting as a target 5G ProSe end UE, receives one or more direct link modification request or direct link establishment request for end-to-end connection setup with the source 5G ProSe end UE and integrated discovery is used, then the target UE shall select a 5G ProSe UE-to-UE relay UE and send a PROSE DIRECT LINK MODIFICATION REJECT message to the 5G ProSe UE-to-UE Relay which is not selected and which has sent the PROSE DIRECT LINK MODIFICATION REQUEST message, with PC5 signalling protocol cause value #yy "relay UE is not selected for link setup with integrated discovery".

If the link modification operation code is set to "Associate new ProSe application(s) with existing PC5 QoS flow(s)" and the security policy corresponding to the ProSe identifier(s) is not aligned with the security policy applied to the existing 5G ProSe direct link, then the target UE shall send a PROSE DIRECT LINK MODIFICATION REJECT message with PC5 signalling protocol cause value #12 "security policy not aligned".

If the link modification operation requires the addition of new PC5 QoS flow(s) but the target UE cannot support additional packet filters which would be required on the existing PDU session of the target UE, then the target UE shall send a PROSE DIRECT LINK MODIFICATION REJECT message with PC5 signalling protocol cause value #16"lack of local capabilities".

If the target UE is acting as a target 5G ProSe end UE and the 5G ProSe direct link modification procedure is between the 5G ProSe UE-to-UE relay UE and the target 5G ProSe end UE, the target 5G ProSe end UE may include in the PROSE DIRECT LINK MODIFICATION REJECT message the source end UE info IE set to the user info ID of the source 5G ProSe end UE that has initiated the 5G ProSe direct link establishment procedure.

If the target UE is acting as a 5G ProSe UE-to-UE relay UE, the 5G ProSe direct link modification procedure is between the source 5G ProSe end UE and the 5G ProSe UE-to-UE relay UE, and the target 5G ProSe end UE has rejected the 5G ProSe direct link establishment procedure or the 5G ProSe direct link modification procedure, then the 5G ProSe UE-to-UE relay UE shall send a PROSE DIRECT LINK MODIFICATION REJECT message with PC5 signalling protocol cause value #20 "Failure from 5G ProSe end UE" to the source 5G ProSe end UE. The 5G ProSe UE-to-UE relay UE may include in the PROSE DIRECT LINK MODIFICATION REJECT message the PC5 end UE failure cause IE set to the PC5 signalling protocol cause received from the target 5G ProSe end UE that has rejected the 5G ProSe direct link establishment procedure as specified in clause 7.2.2.5. The 5G ProSe UE-to-UE relay UE may include in the PROSE DIRECT LINK MODIFICATION REJECT message the target end UE info IE set to the user info ID of the target 5G ProSe end UE that has rejected the 5G ProSe direct link establishment procedure. For other reasons causing the failure of link modification, the target UE shall send a PROSE DIRECT LINK MODIFICATION REJECT message with PC5 signalling protocol cause value #111 "protocol error, unspecified".

Upon receipt of the PROSE DIRECT LINK MODIFICATION REJECT message, the initiating UE shall stop timer T5081 and abort the 5G ProSe direct link modification procedure. If the PC5 signalling protocol cause value in the PROSE DIRECT LINK MODIFICATION REJECT message is #11 "required service not allowed" or #5 "lack of resources for 5G ProSe direct link" or #12 "security policy not aligned", then the initiating UE shall not attempt to start 5G ProSe direct link modification with the same target UE to add the same ProSe application, or to add or modify the same PC5 QoS flow(s) at least for a time period T.

NOTE: The length of time period T is UE implementation specific and can be different for the case when the UE receives PC5 signalling protocol cause value #11 "required service not allowed" or when the UE receives PC5 signalling protocol cause value #5 "lack of resources for 5G ProSe direct link" or when the UE receives PC5 signalling protocol cause value #12 "security policy not aligned". The length of time period T is not less than 30 minutes.

7.2.3.6 Abnormal Cases 7.2.3.6.1 Abnormal Cases at the Initiating UE

The following abnormal cases can be identified:

a) If timer T5081 expires, the initiating UE shall retransmit the PROSE DIRECT LINK MODIFICATION REQUEST message and restart timer T5081. After reaching the maximum number of allowed retransmissions, the initiating UE shall abort the 5G ProSe direct link modification procedure and may notify the upper layer that the target UE is unreachable.

NOTE 1: The maximum number of allowed retransmissions is UE implementation specific.

NOTE 2: After reaching the maximum number of allowed retransmissions, whether the initiating UE releases this 5G ProSe direct link depends on its implementation.

b) For the same 5G ProSe direct link, if the initiating UE receives a PROSE DIRECT LINK RELEASE REQUEST message after the initiation of UE-requested 5G ProSe direct link modification procedure, the initiating UE shall stop the timer T5081 and abort the 5G ProSe direct link modification procedure and proceed with the 5G ProSe direct link release procedure.

c) For the same 5G ProSe direct link, if the initiating UE receives a PROSE DIRECT LINK MODIFICATION REQUEST message during the 5G ProSe direct link modification procedure, the initiating UE shall stop the timer T5081 and abort the 5G ProSe direct link modification procedure. Following handling is implementation dependent, e.g., the initiating UE waits for an implementation dependent time for initiating a new 5G ProSe direct link modification procedure, if still needed.

NOTE 3: The implementation dependent timer value needs to be set to avoid further collisions (e.g., random timer value).

7.2.3.6.2 Abnormal Cases at the Target UE

The following abnormal cases can be identified:

a) For the same 5G ProSe direct link, if the target UE receives a PROSE DIRECT LINK RELEASE REQUEST message during the 5G ProSe direct link modification procedure, the target UE shall stop all running timers for this 5G ProSe direct link, abort the 5G ProSe direct link modification procedure and proceed with the 5G ProSe direct link release procedure.

7.2.3.7 5G ProSe Direct Link Modification Procedure Completion by Target UE

Upon receipt of the PROSE DIRECT LINK MODIFICATION ACK, the target 5G ProSe end UE starts to receive traffic, transmit traffic, or both, via the newly selected 5G ProSe UE-to-UE relay UE.

[ . . . ]

7.2.10 5G ProSe Direct Link Security Mode Control Procedure 7.2.10.1 General

The 5G ProSe direct link security mode control procedure is used to establish security between two UEs during a 5G ProSe direct link establishment procedure or a 5G ProSe direct link re-keying procedure. Security is not established if the UE PC5 signalling integrity protection is not activated. After successful completion of the 5G ProSe direct link security mode control procedure, the selected security algorithms and their non-null associate keys are used to integrity protect and cipher all PC5 signalling messages exchanged over this 5G ProSe direct link between the UEs and the security context can be used to protect all PC5 user plane data exchanged over this 5G ProSe direct link between the UEs. The UE sending the PROSE DIRECT LINK SECURITY MODE COMMAND message is called the "initiating UE" and the other UE is called the "target UE".

7.2.10.2 5G ProSe Direct Link Security Mode Control Procedure Initiation by the Initiating UE The initiating UE shall meet the following pre-conditions before initiating the 5G ProSe direct link security mode control procedure:

a) the target UE has initiated a 5G ProSe direct link establishment procedure toward the initiating UE by sending a PROSE DIRECT LINK ESTABLISHMENT REQUEST message and:
   1) the PROSE DIRECT LINK ESTABLISHMENT REQUEST message:
      i) includes a target user info IE which includes the application layer ID of the initiating UE; or
      ii) does not include a target user info IE and the initiating UE is interested in the ProSe service identified by the ProSe identifier in the PROSE DIRECT LINK ESTABLISHMENT REQUEST message; and
   2) the initiating UE:
      i) if the direct communication is not between the 5G ProSe remote UE and the 5G ProSe UE-to-network relay UE has either identified an existing $K_{NRP}$ based on the $K_{NRP}$ ID included in the PROSE DIRECT LINK ESTABLISHMENT REQUEST message or derived a new $K_{NRP}$;
      ii) if the direct communication is between the 5G ProSe remote UE and the 5G ProSe UE-to-network relay UE with the security procedure over user plane being used, has received a new $K_{NRP}$ according to the security procedure over user plane as specified in 3GPP TS 33.503 [34];
      iii) if the direct communication is between the 5G ProSe remote UE and the 5G ProSe UE-to-network relay UE with the security procedure over control plane being used, has received a new $K_{NR\_ProSe}$ according to the security procedure over control plane as specified in 3GPP TS 33.503 [34]; or
      iv) has decided not to activate security protection based on its UE 5G ProSe direct signalling security policy and the target UE's 5G ProSe direct signalling security policy; or b) the target UE has initiated a 5G ProSe direct link re-keying procedure toward the initiating UE by sending a PROSE DIRECT LINK REKEYING REQUEST message and:
   1) if the target UE has included a Re-authentication indication in the PROSE DIRECT LINK REKEYING REQUEST message, the initiating UE has derived a new $K_{NRP}$.

When:

a) the direct communication is not between the 5G ProSe remote UE and the 5G ProSe UE-to-network relay UE, if a new $K_{NRP}$ has been derived by the initiating UE; or b) the direct communication is between the 5G ProSe remote UE and the 5G ProSe UE-to-network relay UE, if a new $K_{NRP}$ Or $K_{NR\_ProSe}$ has been received by the initiating UE according to the security procedure over user plane or the security procedure over control plane, respectively, as specified in 3GPP TS 33.503 [34];

the initiating UE shall generate the 2 MSBs of $K_{NRP}$ ID to ensure that the resultant $K_{NRP}$ ID will be unique in the initiating UE.

NOTE 1: If the direct communication is not between the 5G ProSe remote UE and the 5G ProSe UE-to-network relay UE, the $K_{NRP}$ ID holds the ID that corresponds to $K_{NRP}$. If the direct communication is between the 5G ProSe remote UE and the 5G ProSe UE-to-network relay UE, the $K_{NRP}$ ID holds the ID that corresponds to $K_{NRP}$ (if security procedure over user plane is used) or $K_{NR\_ProSe}$ (if security procedure over control plane is used).

The initiating UE shall select security algorithms in accordance with its UE 5G ProSe direct signalling security policy and the target UE's 5G ProSe direct signalling security policy. If the 5G ProSe direct link security mode control procedure was triggered during a 5G ProSe direct link establishment procedure, the initiating UE shall not select the null integrity protection algorithm if the initiating UE or the target UE's 5G ProSe direct signalling integrity protection policy is set to "Signalling integrity protection required". If the 5G ProSe direct link security mode control procedure was triggered during a 5G ProSe direct link re-keying procedure, the initiating UE:

a) shall not select the null integrity protection algorithm if the integrity protection algorithm currently in use for the 5G ProSe direct link is different from the null integrity protection algorithm;

b) shall not select the null ciphering protection algorithm if the ciphering protection algorithm currently in use for the 5G ProSe direct link is different from the null ciphering protection algorithm;

c) shall select the null integrity protection algorithm if the integrity protection algorithm currently in use is the null integrity protection algorithm; and d) shall select the null ciphering protection algorithm if the ciphering protection algorithm currently in use is the null ciphering protection algorithm.

Then the initiating UE shall:

a) if the direct communication is not between the 5G ProSe remote UE and the 5G ProSe UE-to-network relay UE:

1) generate a 128-bit Nonce_2 value;

2) derive $K_{NRP}$-sess from Nonce_1 received in the PROSE DIRECT LINK ESTABLISHMENT REQUEST message, $K_{NRP}$ and Nonce_2, as specified in 3GPP TS 33.536 [37]; and 3) derive the NR PC5 encryption key NRPEK and the NR PC5 integrity key NRPIK from $K_{NRP-sess}$ and the selected security algorithms as specified in 3GPP TS 33.536 [37];

b) if the direct communication is between the 5G ProSe remote UE and the 5G ProSe UE-to-network relay UE and the security procedure over control plane as specified in 3GPP TS 33.503 is used:

1) derive $K_{relay-sess}$ from $K_{NR\_ProSe}$, Nonce_2 and Nonce_1 received in the PROSE DIRECT LINK ESTABLISHMENT REQUEST message as specified in 3GPP TS 33.503 [34]; and 2) derive the NR PC5 encryption key $K_{relay-enc}$ and the NR PC5 integrity key $K_{relay-int}$ from $K_{relay-sess}$ and the selected security algorithms as specified in 3GPP TS 33.503 [34]; or c) if the direct communication is between the 5G ProSe remote UE and the 5G ProSe UE-to-network relay UE and the security procedure over user plane as specified in 3GPP TS 33.503 is used:

1) derive $K_{NRP}$-sess from $K_{NRP}$, $K_{NRP}$ freshness parameter 2 and $K_{NRP}$ freshness parameter 1 received in the PROSE DIRECT LINK ESTABLISHMENT REQUEST message as specified in 3GPP TS 33.503 [34]; and 2) derive the NR PC5 encryption key NRPEK and the NR PC5 integrity key NRPIK from $K_{NRP-sess}$ and the selected security algorithms as specified in 3GPP TS 33.503 [34]; and d) create a PROSE DIRECT LINK SECURITY MODE COMMAND message. In this message, the initiating UE:

1) shall include the key establishment information container IE if the 5G ProSe direct link is not for direct communication between the 5G ProSe remote UE and the 5G ProSe UE-to-network relay UE and a new $K_{NRP}$ has been derived at the initiating UE and the authentication method used to generate $K_{NRP}$ requires sending information to complete the 5G ProSe direct link authentication procedure;

NOTE 2: The key establishment information container is provided by upper layers.

2) shall include the MSBs of $K_{NRP}$ ID IE if a new $K_{NRP}$ has been derived or a new $K_{NRP}$ or $K_{NR\_ProSe}$ has been received at the initiating UE;

3) shall include a Nonce_2 IE set to:

i) the 128-bit nonce value generated by the initiating UE when the direct communication is not between the 5G ProSe remote UE and the 5G ProSe UE-to-network relay UE;

ii) the $K_{NRP}$ freshness parameter 2 value received by the initiating UE when the direct communication is between the 5G ProSe remote UE and the 5G ProSe UE-to-network relay UE with the security procedure over user plane as specified in 3GPP TS 33.503 [34] being used; or iii) the Nonce_2 value received by the initiating UE when the direct communication is between the 5G ProSe remote UE and the 5G ProSe UE-to-network relay UE with the security procedure over control plane as specified in 3GPP TS 33.503 being used;

for the purpose of session key establishment over this 5G ProSe direct link if the selected integrity protection algorithm is not the null integrity protection algorithm;

4) shall include the selected security algorithms;

5) shall include the UE security capabilities received from the target UE in the PROSE DIRECT LINK ESTABLISHMENT REQUEST message or PROSE DIRECT LINK REKEYING REQUEST message;

6) shall include the UE 5G ProSe direct signalling security policy received from the target UE in the PROSE DIRECT LINK ESTABLISHMENT REQUEST message;

7) shall include the LSB of $K_{NRP-sess}$ ID chosen by the initiating UE as specified in 3GPP TS 33.536 if the selected integrity protection algorithm is not the null integrity protection algorithm;

NOTE 3: If the direct communication is not between the 5G ProSe remote UE and the 5G ProSe UE-to-network relay UE, the $K_{NRP-sess}$ ID holds the ID that corresponds to $K_{NRP-sess}$. If the direct communication is between the 5G ProSe remote UE and the 5G ProSe UE-to-network relay UE, the $K_{NRP-sess}$ ID holds the ID that corresponds to $K_{NRP-sess}$ (if security procedure over user plane is used) or $K_{relay-sess}$ (if security procedure over control plane is used).

8) shall include the GPI if received from the 5G PKMF according to the security procedure over user plane as specified in 3GPP TS 33.503 [34], when the direct communication is between the 5G ProSe remote UE and the 5G ProSe UE-to-network relay UE; and 9) shall include the EAP message if received from the network according to the security procedure over control plane as specified in 3GPP TS 33.503 [34], when the direct communication is between the 5G ProSe remote UE and the 5G ProSe UE-to-network relay UE.

If the security protection of this 5G ProSe direct link is activated by using non-null integrity protection algorithm or non-null ciphering protection algorithm, the initiating UE shall form the $K_{NRP-sess}$ ID from the MSB of $K_{NRP-sess}$ ID received in the PROSE DIRECT LINK ESTABLISHMENT REQUEST message or PROSE DIRECT LINK REKEYING REQUEST message and the LSB of $K_{NRP-sess}$ ID included in the PROSE DIRECT LINK SECURITY MODE COMMAND message. The initiating UE shall use the $K_{NRP-sess}$ ID to identify the new security context.

The initiating UE shall set the source layer-2 ID and destination layer-2 ID as follows:

1) if the initiating UE is acting as a 5G ProSe layer-3 UE-to-network relay UE, and the EAP-AKA' based authentication method is used as specified in clause 6.3.3.3 of 3GPP TS 33.503 [34],
   the source layer-2 ID set to the source layer-2 ID used in PROSE AA MESSAGE TRANSPORT REQUEST message, and the destination layer-2 ID set to the destination layer-2 ID used in PROSE AA MESSAGE TRANSPORT REQUEST message;
2) if the initiating UE is not acting as a 5G ProSe UE-to-network relay UE, and a 5G ProSe direct link authentication procedure has been initiated:
   the source layer-2 ID set to the source layer-2 ID used in PROSE DIRECT LINK AUTHENTICATION REQUEST message, and the destination layer-2 ID set to the the destination layer-2 ID used in PROSE DIRECT LINK AUTHENTICATION REQUEST message;
3) otherwise, self-assign a source layer-2 ID, and the destination layer-2 ID set to the source layer-2 ID in the PROSE DIRECT LINK ESTABLISHMENT REQUEST message.

NOTE 4: The UE implementation ensures that any value of the self-assigned source layer-2 ID is different from any other self-assigned source layer-2 ID(s) in use for 5G ProSe direct discovery as specified in clause 6.2.14, clause 6.2.15 and clause 8.2.1, and is different from any other provisioned destination layer-2 ID(s) as specified in clause 5.2.

NOTE 5: It is possible for the target UE to reuse the target UE's layer-2 ID used in previous 5G ProSe direct link with the same peer UE.

After the PROSE DIRECT LINK SECURITY MODE COMMAND message is generated, the initiating UE shall pass this message to the lower layers for transmission along with the source layer-2 ID and the destination layer-2 ID, NRPIK (or $K_{relay-int}$ when applicable), NRPEK (or $K_{relay-enc}$ when applicable) if applicable, $K_{NRP-sess}$ ID, the selected security algorithm as specified in TS 33.536 [37]; an indication of activation of the 5G ProSe direct signalling security protection for the 5G ProSe direct link with the new security context, if applicable and start timer T5089. The initiating UE shall not send a new PROSE DIRECT LINK SECURITY MODE COMMAND message to the same target UE while timer T5089 is running.

NOTE 6: The PROSE DIRECT LINK SECURITY MODE COMMAND message is integrity protected (and not ciphered) at the lower layer using the new security context.

If the 5G ProSe direct link security mode control procedure was triggered during a 5G ProSe direct link re-keying procedure, the initiating UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

Figure 17:
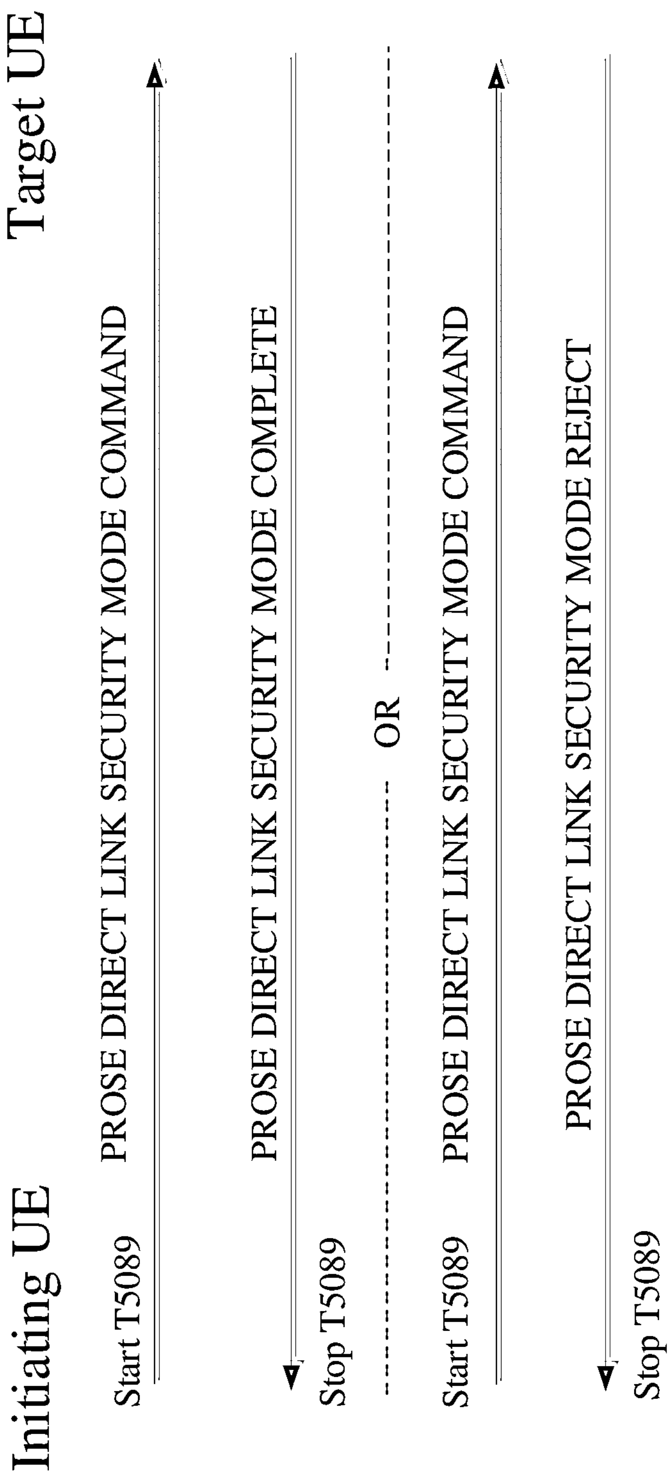
FIG. 17 (PRIOR ART)
FIG. 17 is a reproduction of FIG. 7.2.10.2.1 of 3GPP TS 24.554 V18.1.0.

[FIG. 7.2.10.2.1 of 3GPP TS 24.554 V18.1.0, entitled "5G ProSe direct link security mode control procedure", is reproduced as FIG. 17]

7.2.10.3 5G ProSe Direct Link Security Mode Control Procedure Accepted by the Target UE Upon receipt of a PROSE DIRECT LINK SECURITY MODE COMMAND message, if a new assigned initiating UE's layer-2 ID is included and if the 5G ProSe direct link authentication procedure has not been executed, the target UE shall replace the original initiating UE's layer-2 ID with the new assigned initiating UE's layer-2 ID for 5G ProSe direct communication. The target UE shall check the selected security algorithms IE included in the PROSE DIRECT LINK SECURITY MODE COMMAND message. If "null integrity algorithm" is included in the selected security algorithms IE, the integrity protection is not offered for this 5G ProSe direct link and the signalling messages are transmitted unprotected. If "null ciphering algorithm" and an integrity algorithm other than "null integrity algorithm" are included in the selected algorithms IE, the ciphering protection is not offered for this 5G ProSe direct link and the signalling messages are transmitted unprotected. If the target UE's 5G ProSe direct signalling integrity protection policy is set to "Signalling integrity protection required", the target UE shall check the selected security algorithms IE in the PROSE DIRECT LINK SECURITY MODE COMMAND message does not include the null integrity protection algorithm. If the selected integrity protection algorithm is not the null integrity protection algorithm, the target UE shall:

a) if the direct communication is not between the 5G ProSe remote UE and the 5G ProSe UE-to-network relay UE:
   1) derive $K_{NRP-sess}$ from $K_{NRP}$, Nonce_1 and Nonce_2 received in the PROSE DIRECT LINK SECURITY MODE COMMAND message as specified in 3GPP TS 33.536 [37];
   2) derive NRPIK from $K_{NRP-sess}$ and the selected integrity algorithm as specified in 3GPP TS 33.536 [37]; and
   3) if the $K_{NRP-sess}$ is derived and the selected ciphering protection algorithm is not the null ciphering protection algorithm, then the target UE shall derive NRPEK from $K_{NRP-sess}$ and the selected ciphering algorithm as specified in 3GPP TS 33.536 [37]; or
b) if the direct communication is between the 5G ProSe remote UE and the 5G ProSe UE-to-network relay UE:
   1) if the security procedure over control plane as specified in 3GPP TS 33.503 is used, derive $K_{relay-sess}$ according to the security procedure over control plane, and derive $K_{relay-int}$ from $K_{relay-sess}$ and the selected integrity algorithm as specified in 3GPP TS 33.503 [34]. If the $K_{relay-sess}$ is derived and the selected ciphering protection algorithm is not the null ciphering protection algorithm, then the target UE shall derive $K_{relay-enc}$ from $K_{relay-sess}$ and the selected ciphering algorithm as specified in 3GPP TS 33.503 [34]; or
   2) if security procedure over user plane as specified in 3GPP TS 33.503 is used, derive $K_{NRP-sess}$ according to the security procedure over user plane, and derive NRPIK from $K_{NRP-sess}$ and the selected integrity algorithm as specified in 3GPP TS 33.503 [34]. If the $K_{NRP-sess}$ is derived and the selected ciphering protection algorithm is not the null ciphering protection algorithm, then the target UE shall derive NRPEK from $K_{NRP-sess}$ and the selected ciphering algorithm as specified in 3GPP TS 33.503 [34].

The target UE shall determine whether or not the PROSE DIRECT LINK SECURITY MODE COMMAND message can be accepted by:

a) checking that the selected security algorithms IE in the PROSE DIRECT LINK SECURITY MODE COMMAND message does not include the null integrity protection algorithm if the target UE's 5G ProSe direct signalling integrity protection policy is set to "Signalling integrity protection required";

b) asking the lower layers to check the integrity of the PROSE DIRECT LINK SECURITY MODE COMMAND message using NRPIK (or $K_{relay-int}$ when applicable) and the selected integrity protection algorithm, if the selected integrity protection algorithm is not the null integrity protection algorithm;

c) checking that the received UE security capabilities have not been altered compared to the values that the target UE sent to the initiating UE in the PROSE DIRECT LINK ESTABLISHMENT REQUEST message or PROSE DIRECT LINK REKEYING REQUEST message;

d) if the 5G ProSe direct link security mode control procedure was triggered during a 5G ProSe direct link establishment procedure, 1) checking that the received UE 5G ProSe direct signalling security policy has not been altered compared to the values that the target UE sent to the initiating UE in the PROSE DIRECT LINK ESTABLISHMENT REQUEST message; and 2) checking that the LSB of $K_{NRP-sess}$ ID included in the PROSE DIRECT LINK SECURITY MODE COMMAND message are not set to the same value as those received from another UE in response to the target UE's PROSE DIRECT LINK ESTABLISHMENT REQUEST message; and e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms IE in the PROSE DIRECT LINK SECURITY MODE COMMAND message do not include the null integrity protection algorithm.

If the target UE did not include a $K_{NRP}$ ID in the PROSE DIRECT LINK ESTABLISHMENT REQUEST message, the target UE included a Re-authentication indication in the PROSE DIRECT LINK REKEYING REQUEST message or the initiating UE has chosen to derive:

a) a new $K_{NRP}$ if the direct communication is not between the 5G ProSe remote UE and the 5G ProSe UE-to-network relay UE; the target UE shall derive $K_{NRP}$ as specified in 3GPP TS 33.536 [37];

b) a new $K_{NRP}$, if the direct communication is between the 5G ProSe remote UE and the 5G ProSe UE-to-network relay UE and the security procedure over user plane as specified in 3GPP TS 33.503 is used, the target UE shall derive $K_{NRP}$ as specified in 3GPP TS 33.536 [37]; or c) a new $K_{NR\_ProSe}$, if the direct communication is between the 5G ProSe remote UE and the 5G ProSe UE-to-network relay UE and the security procedure over control plane as specified in 3GPP TS 33.503 is used, the target UE shall derive $K_{NR\_ProSe}$ as specified in 3GPP TS 33.536 [37]; and the target UE shall choose the 2 LSBs of $K_{NRP}$ ID to ensure that the resultant $K_{NRP}$ ID will be unique in the target UE. The target UE shall form $K_{NRP}$ ID from the received MSB of $K_{NRP}$ ID and its chosen 2 LSBs of $K_{NRP}$ ID and shall store the complete $K_{NRP}$ ID with $K_{NRP}$/$K_{NR\_ProSe}$.

NOTE 1: If the direct communication is not between the 5G ProSe remote UE and the 5G ProSe UE-to-network relay UE, the $K_{NRP}$ ID holds the ID that corresponds to $K_{NRP}$. If the direct communication is between the 5G ProSe remote UE and the 5G ProSe UE-to-network relay UE, the $K_{NRP}$ ID holds the ID that corresponds to $K_{NRP}$ (if security procedure over user plane is used) or $K_{NR\_ProSe}$ (if security procedure over control plane is used).

If the GPI is included in the PROSE DIRECT LINK SECURITY MODE COMMAND message and the direct communication is between the 5G ProSe remote UE and the 5G ProSe UE-to-network relay UE, the target UE shall derive the UP-PRUK and obtain the UP-PRUK ID from the GPI, and use the UP-PRUK in deriving the $K_{NRP}$, according to the security procedure over user plane as specified in 3GPP TS 33.503 [34].

If the target UE accepts the PROSE DIRECT LINK SECURITY MODE COMMAND message, the target UE shall create a PROSE DIRECT LINK SECURITY MODE COMPLETE message. In this message, the target UE:

a) if the 5G ProSe direct link security mode control procedure was triggered during a 5G ProSe direct link establishment procedure:

1) shall include the PQFI and the corresponding PC5 QoS parameters if the 5G ProSe direct link is not for 5G ProSe direct communication between the 5G ProSe remote UE and the 5G ProSe UE-to-network relay UE; or 2) may include the PQFI and the corresponding PC5 QoS parameters if the 5G ProSe direct link is for 5G ProSe direct communication between 5G ProSe layer-3 remote UE and 5G ProSe layer-3 UE-to-network relay UE;

NOTE 2: The PQFI and the corresponding PC5 QoS parameters are not included if the 5G ProSe direct link is for 5G ProSe direct communication between 5G ProSe layer-2 remote UE and 5G ProSe layer-2 UE-to-network relay UE.

b) if IP communication is used and the 5G ProSe direct link security mode control procedure was triggered during a 5G ProSe direct link establishment procedure, shall include an IP address configuration IE set to one of the following values:

1) "IPv6 router" if only IPV6 address allocation mechanism is supported by the target UE, i.e., acting as an IPV6 router;

2) "DHCPv4 server" if only IPV4 address allocation mechanism is supported by the target UE, i.e., acting as a DHCPv4 server;

3) "DHCPv4 server & IPV6 Router" if both IPv4 and IPV6 address allocation mechanism are supported by the target UE; or 4) "address allocation not supported" if neither IPv4 nor IPV6 address allocation mechanism is not supported by the target UE;

NOTE 3: The UE doesn't include an IP address configuration IE nor a link local IPV6 address IE if Ethernet or Unstructured data unit type is used for communication.

c) if IP communication is used, the IP address configuration IE is set to "address allocation not supported" and the 5G ProSe direct link security mode control procedure was triggered during a 5G ProSe direct link establishment procedure, shall include a link local IPv6 address IE formed locally based on IETF RFC 4862 [25];

d) if a new $K_{NRP}$ was derived or a new $K_{NRP}$ Or $K_{NR\_ProSe}$ was received, shall include the 2 LSBs of $K_{NRP}$ ID; and e) if the 5G ProSe direct link security mode control procedure was triggered during a 5G ProSe direct link establishment procedure, shall include its UE 5G ProSe direct user plane security policy for this 5G ProSe direct link. In the case where the different ProSe services are mapped to the different 5G ProSe direct user plane security policies, when more than one ProSe identifier is included in the PROSE DIRECT LINK ESTABLISHMENT REQUEST message, each of the user plane security polices of those ProSe services shall be compatible, e.g., "user plane integrity protection not needed" and "user plane integrity protection required" are not compatible.

If the selected integrity protection algorithm is not the null integrity protection algorithm, the target UE shall form the $K_{NRP\text{-}sess}$ ID from the MSB of $K_{NRP\text{-}sess}$ ID it had sent in the PROSE DIRECT LINK ESTABLISHMENT REQUEST message or PROSE DIRECT LINK REKEYING REQUEST message and the LSB of $K_{NRP\text{-}sess}$ ID received in the PROSE DIRECT LINK SECURITY MODE COMMAND message. The target UE shall use the $K_{NRP\text{-}sess}$ ID to identify the new security context.

After the PROSE DIRECT LINK SECURITY MODE COMPLETE message is generated, the target UE shall pass this message to the lower layers for transmission along with the target UE's layer-2 ID for 5G ProSe direct communication and the initiating UE's layer-2 ID for 5G ProSe direct communication, NRPIK (or $K_{relay\text{-}int}$ when applicable), NRPEK (or $K_{relay\text{-}enc}$ when applicable) if applicable, $K_{NRP\text{-}sess}$ ID, the selected security algorithm as specified in 3GPP TS 33.536 and an indication of activation of the 5G ProSe direct signalling security protection for the 5G ProSe direct link with the new security context, if applicable.

NOTE 4: The PROSE DIRECT LINK SECURITY MODE COMPLETE message and further 5G ProSe direct signalling messages are integrity protected and ciphered (if applicable) at the lower layer using the new security context.

If the 5G ProSe direct link security mode control procedure was triggered during a 5G ProSe direct link re-keying procedure, the target UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

7.2.10.4 5G ProSe Direct Link Security Mode Control Procedure Completion by the Initiating UE Upon receiving a PROSE DIRECT LINK SECURITY MODE COMPLETE message, the initiating UE shall stop timer T5089. If the selected integrity protection algorithm is not the null integrity protection algorithm, the UE checks the integrity of the PROSE DIRECT LINK SECURITY MODE COMPLETE message. If the integrity check passes, the initiating UE shall then continue the procedure which triggered the 5G ProSe direct link security mode control procedure. If the selected integrity protection algorithm is the null integrity protection algorithm, the UE continues the procedure without checking the integrity protection.

After receiving the PROSE DIRECT LINK SECURITY MODE COMPLETE message, the initiating UE shall delete the old security context it has for the target UE, if any.

7.2.10.5 5G ProSe Direct Link Security Mode Control Procedure not Accepted by the Target UE If the PROSE DIRECT LINK SECURITY MODE COMMAND message cannot be accepted, the target UE shall send a PROSE DIRECT LINK SECURITY MODE REJECT message and the target UE shall abort the ongoing procedure that triggered the initiation of the 5G ProSe direct link security mode control procedure unless the ongoing procedure is a 5G ProSe direct link establishment procedure and the Target user info is not included in the PROSE DIRECT LINK ESTABLISHMENT REQUEST message. The PROSE DIRECT LINK SECURITY MODE REJECT message contains a PC5 signalling protocol cause IE indicating one of the following cause values:

#5: lack of resources for 5G ProSe direct link;
#7: integrity failure;
#8: UE security capabilities mismatch;
#9: LSB of $K_{NRP\text{-}sess}$ ID conflict;
#10: UE PC5 unicast signalling security policy mismatch;
#14: Authentication synchronisation error; or
#111: protocol error, unspecified.

If this 5G ProSe direct link security mode control procedure is triggered during the 5G ProSe direct link establishment procedure and the implementation-specific maximum number of established NR 5G ProSe direct links has been reached, then the target UE shall send a PROSE DIRECT LINK SECURITY MODE REJECT message containing PC5 signalling protocol cause value #5 "lack of resources for 5G ProSe direct link".

If the PROSE DIRECT LINK SECURITY MODE COMMAND message cannot be accepted because the 5G ProSe direct link security mode control procedure was triggered during a 5G ProSe direct link establishment procedure, that the selected security algorithms IE in the PROSE DIRECT LINK SECURITY MODE COMMAND message included the null integrity protection algorithm and the target UE's 5G ProSe direct signalling integrity protection policy is set to "Signalling integrity protection required", the target UE shall include PC5 signalling protocol cause #10 "UE PC5 unicast signalling security policy mismatch" in the PROSE DIRECT LINK SECURITY MODE REJECT message.

If the PROSE DIRECT LINK SECURITY MODE COMMAND message cannot be accepted because the 5G ProSe direct link security mode control procedure was triggered during a 5G ProSe direct link re-keying procedure, the integrity protection algorithm currently in use for the 5G ProSe direct link is different from the null integrity protection algorithm and the selected security algorithms IE in the PROSE DIRECT LINK SECURITY MODE COMMAND message include the null integrity protection algorithm, the target UE, the target UE shall include PC5 signalling protocol cause #10 "UE PC5 unicast signalling security policy mismatch" in the PROSE DIRECT LINK SECURITY MODE REJECT message.

If the target UE detects that the received UE security capabilities IE in the PROSE DIRECT LINK SECURITY MODE COMMAND message has been altered compared to the latest values that the target UE sent to the initiating UE in the PROSE DIRECT LINK ESTABLISHMENT REQUEST message or PROSE DIRECT LINK REKEYING REQUEST message, the target UE shall include PC5 signalling protocol cause #8 "UE security capabilities mismatch" in the PROSE DIRECT LINK SECURITY MODE REJECT message.

If the target UE detects that the LSB of $K_{NRP\text{-}sess}$ ID included in the PROSE DIRECT LINK SECURITY MODE COMMAND message are set to the same value as those received from another UE in response to the target UE's PROSE DIRECT LINK ESTABLISHMENT REQUEST message, the target UE shall include PC5 signalling protocol cause #9 "LSB of $K_{NRP\text{-}sess}$ ID conflict" in the PROSE DIRECT LINK SECURITY MODE REJECT message.

If the 5G ProSe direct link security mode control procedure is for direct communication between the 5G ProSe remote UE and the 5G ProSe UE-to-network relay UE, and the PROSE DIRECT LINK SECURITY MODE COM- MAND message cannot be accepted due to a synchronisation error when processing the authentication vector contained in the GPI sent by the 5G ProSe UE-to-network relay UE to the 5G ProSe remote UE, if any, the target UE shall include PC5 signalling protocol cause #14 "Authentication synchronisation error" in the PROSE DIRECT LINK SECURITY MODE REJECT message and shall include the RAND and AUTS parameters in the PROSE DIRECT LINK SECURITY MODE REJECT message.

After the PROSE DIRECT LINK SECURITY MODE REJECT message is generated, the target UE shall pass this message to the lower layers for transmission along with the initiating UE's layer-2 ID for 5G ProSe direct communication and the target UE's layer-2 ID for 5G ProSe direct communication.

Upon receipt of the PROSE DIRECT LINK SECURITY MODE REJECT message, the initiating UE shall stop timer T5089, provide an indication to the lower layer of deactivation of the 5G ProSe direct security protection and deletion of security context for the 5G ProSe direct link, if applicable and:

a) if the PC5 signalling protocol cause IE in the PROSE DIRECT LINK SECURITY MODE REJECT message is set to #9 "LSB of $K_{NRP\text{-}sess}$ ID conflict", retransmit the PROSE DIRECT LINK SECURITY MODE COMMAND message with a different value for the LSB of $K_{NRP\text{-}sess}$ ID and restart timer T5089;

b) if the PC5 signalling protocol cause IE in the PROSE DIRECT LINK SECURITY MODE REJECT message is set to #14 "Authentication synchronisation error", the message contained a RAND and an AUTS, and the 5G ProSe direct link security mode control procedure is for direct communication between the 5G ProSe remote UE and the 5G ProSe UE-to-network relay UE, may fetch a fresh GPI from the PKMF by sending a Key Request message including RAND and AUTS as specified in 3GPP TS 33.503 [34]; or c) if the PC5 signalling protocol cause IE is set to the value other than #9 "LSB of $K_{NRP\text{-}sess}$ ID conflict" and other than #14 "Authentication synchronisation error", abort the ongoing procedure that triggered the initiation of the 5G ProSe direct link security mode control procedure.

7.2.10.6 Abnormal Cases 7.2.10.6.1 Abnormal Cases at the Initiating UE a) Timer T5089 expires.

The initiating UE shall retransmit the PROSE DIRECT LINK SECURITY MODE COMMAND message and restart timer T5089. After reaching the maximum number of allowed retransmissions, the initiating UE shall abort the 5G ProSe direct link security mode control procedure, shall provide an indication to the lower layer of deactivation of the 5G ProSe direct security protection and deletion of security context for the 5G ProSe direct link, if applicable and shall abort the ongoing procedure that triggered the initiation of the 5G ProSe direct link security mode control procedure.

NOTE 1: The maximum number of allowed retransmissions is UE implementation specific.

b) The need to use this 5G ProSe direct link no longer exists before the 5G ProSe direct link security mode control procedure is completed.

The initiating UE shall abort the procedure, shall provide an indication to the lower layer of deactivation of the 5G ProSe direct security protection and deletion of security context for the 5G ProSe direct link, if applicable and shall abort the ongoing procedure that triggered the initiation of the 5G ProSe direct link security mode control procedure.

c) If PROSE DIRECT LINK MODIFICATION REQUEST message or PROSE DIRECT LINK IDENTIFIER UPDATE REQUEST message is received when the timer T5089 is running, the initiating UE shall discard the PROSE DIRECT LINK MODIFICATION REQUEST message or PROSE DIRECT LINK IDENTIFIER UPDATE REQUEST message.

d) For the same 5G ProSe direct link, if PROSE DIRECT LINK RELEASE REQUEST message is received when the timer T5089 is running, the initiating UE shall stop the timer T5089, abort the 5G ProSe direct link security mode control procedure and proceed with the 5G ProSe direct link release procedure.

NOTE 2: The abnormal cases as described in bullet c) or d) only happen when the 5G ProSe direct link security mode control procedure is used to establish security between two UEs during a 5G ProSe direct link re-keying procedure.

[ . . . ]

10.3.1 ProSe Direct Link Establishment Request 10.3.1.1 Message Definition

This message is sent by a UE to another peer UE to establish a direct link. See table 10.3.1.1.1.

Message type: PROSE DIRECT LINK ESTABLISHMENT REQUEST

Significance: dual

Direction: UE to peer UE

[Table 10.3.1.1.1 of 3GPP TS 24.554 V18.1.0, entitled "PROSE DIRECT LINK ESTABLISHMENT REQUEST message content", is reproduced as FIG. 18]

Editor's note: The security parameters for 5G ProSe UE-to-UE relay and the parameters for 5G ProSe layer-2 UE-to-UE relay are FFS.

10.3.1.2 Target User Info

The UE shall include this IE if the target UE's application layer ID is received from upper layers or known based on the unicast layer-2 ID of target UE (i.e. destination layer-2 ID) as described in clause 5.8.2.4 of 3GPP TS 23.304 [3], or if the UE receives the user info ID of the 5G ProSe UE-to-network relay UE during the 5G ProSe UE-to-network relay discovery procedure, or if:

1) the UE is acting as the source 5G ProSe end UE and the user info ID of the target 5G ProSe end UE is obtained during the 5G ProSe UE-to-UE relay discovery procedure; or 2) the UE is acting as the 5G ProSe UE-to-UE relay UE and the user info ID of the target 5G ProSe end UE is obtained in the PROSE DIRECT LINK ESTABLISHMENT REQUEST message from the source 5G ProSe end UE.

[ . . . ]

10.3.1.7 Relay Service Code

The UE shall include this IE if the 5G ProSe direct link establishment procedure is for direct communication between the 5G ProSe remote UE and the 5G ProSe UE-to-network relay UE or between the 5G ProSe end UE and the 5G ProSe UE-to-UE relay UE.

10.3.1.8 ProSe Identifiers

The UE shall include this IE if the 5G ProSe direct link establishment procedure is not for 5G ProSe direct communication between the 5G ProSe remote UE and the 5G ProSe UE-to-network relay UE.

10.3.1.9 UE Identity

The UE shall include this IE if the 5G ProSe direct link establishment procedure is for direct communication between the 5G ProSe remote UE and the 5G ProSe UE-to-network relay UE.

[ . . . ]

10.3.1.14 UE-to-UE Relay UE User Info

The UE shall include this IE if:

1) the user info ID of the 5G ProSe UE-to-UE relay UE is obtained during the 5G ProSe UE-to-UE relay discovery procedure and the 5G ProSe direct link establishment procedure is for 5G ProSe direct communication between the source 5G ProSe end UE and the 5G ProSe UE-to-UE relay UE; or
2) the UE is acting as the 5G ProSe UE-to-UE relay UE.

10.3.1.15 Target End UE Layer-2 ID

The UE shall include this IE if the target end UE layer-2 ID is available to the source 5G ProSe end UE via the previous direct communication and the 5G ProSe direct link establishment procedure is for 5G ProSe direct communication between the source 5G ProSe end UE and the 5G ProSe UE-to-UE relay UE.

10.3.2 ProSe Direct Link Establishment Accept 10.3.2.1 Message Definition

This message is sent by a UE to another peer UE to accept the received PROSE DIRECT LINK ESTABLISHMENT REQUEST message. See table 10.3.2.1.1.

Message type: PROSE DIRECT LINK ESTABLISHMENT ACCEPT

Significance: dual

Direction: UE to peer UE

[Table 10.3.2.1.1 of 3GPP TS 24.554 V18.1.0, entitled "PROSE DIRECT LINK ESTABLISHMENT ACCEPT message content", is reproduced as FIG. 19]

Editor's note: The security parameters for 5G ProSe UE-to-UE relay and the parameters for 5G ProSe layer-2 UE-to-UE relay are FFS.

10.3.2.2 IP Address Configuration

The UE shall include this IE if IP communication is used.

10.3.2.3 Target Link Local IPv6 Address

The UE shall include this IE if IP communication is used and the IP address configuration is set to "address allocation not supported".

[ . . . ]

10.3.2.6 UE-to-UE relay UE user info

The UE shall include this IE if the 5G ProSe direct link establishment procedure is for 5G ProSe direct communication between the (source or target) 5G ProSe end UE and the 5G ProSe UE-to-UE relay UE.

[ . . . ]

3GPP TS 23.304 describes support of UE-to-UE Relay. In general, a relay UE may be used to support communication between two (Layer-2 or Layer-3) Proximity-based Services (ProSe) End UEs in case these two UEs cannot communicate with each other directly. A UE-to-UE Relay UE establishes one PC5 link with each of the two ProSe End UEs containing a source ProSe end UE (e.g. on first PC5 hop) and a target ProSe end UE (e.g. on second PC5 hop) for forwarding traffic of the concerned ProSe service(s) between the two ProSe End UEs. If a source 5G ProSe End UE would like to communicate with multiple target 5G ProSe End UEs, the ($1^{st}$ hop) PC5 link between the source 5G ProSe Layer-3 End UE and the 5G ProSe UE-to-UE relay UE can be shared for multiple target 5G ProSe End UEs while the ($2^{nd}$ hop) PC5 links may be established individually between the 5G ProSe UE-to-UE relay UE and target 5G ProSe End UEs.

For establishing the PC5 links, the layer-2 link establishment procedure not integrated discovery as specified in clause 6.7.1 of 3GPP TS 23.304 or the layer-2 link establishment procedure integrated discovery as specified in clause 6.7.3 in of 3GPP TS 23.304 may be used (i.e. the former one may be used if the layer-2 link establishment procedure is initiated toward a relay UE or the source end UE has selected a specific relay UE, and the later one may be used if the layer-2 link establishment procedure is initiated toward any relay UE or the source end UE has not discovered any relay UE yet). For the shared PC5 link, the Layer-2 link modification procedure shall be used. According to 3GPP TS 23.304, a PC5 link may be associated with a relay service code and can support one or more services identified by one or more ProSe identifiers.

Clause 6.4.3.7.4 of 3GPP TS 23.304 states that User Info ID of target 5G ProSe End UE can be optionally included in the $1^{st}$ hop Direct Communication Request (DCR) message as well as the $2^{nd}$ hop DCR message. This implies that the service-oriented link establishment procedure introduced in clause 6.4.3.1 of 3GPP TS 23.304 could be also supported for UE-to-UE relay communication. A source end UE could send a $1^{st}$ hop DCR message not including any user info of target 5G ProSe end UE to a relay UE. In response to reception of the $1^{st}$ hop DCR message, the relay UE may send a $2^{nd}$ hop DCR message also not including any user info of target 5G ProSe end UE. Both the $1^{st}$ hop DCR message and the $2^{nd}$ hop DCR message may include a relay service code used for identifying a connectivity service. It is possible that more than one target 5G ProSe end UEs could receive the $2^{nd}$ hop DCR message from the relay UE and these target 5G ProSe end UEs may be interested in the connectivity service or they could match the relay service code. In this situation, each of these target 5G ProSe end UEs may continue the corresponding link establishment procedure with the relay UE to establish individual $2^{nd}$ hop PC5 link between the relay UE and each target 5G ProSe end UE. For example, there are a first target end UE and a second target end UE and they receive the $2^{nd}$ hop DCR message from the relay UE. The first target end UE may then establish a first $2^{nd}$ hop PC5 link with the relay UE, and the second target end UE may then establish a second $2^{nd}$ hop PC5 link with the relay UE as well. The first target end UE could send a first $2^{nd}$ hop Direct Communication Accept (DCA) message to the relay UE for completing establishment of the first $2^{nd}$ hop PC5 link. The second target end UE could send a second $2^{nd}$ hop DCA message to the relay UE for completing establishment of the second $2^{nd}$ hop PC5 link. After that, the relay UE may respond a $1^{st}$ hop DCA message to the source end UE.

According to 3GPP TS 24.554, the source user info IE included in the PROSE DIRECT LINK ESTABLISHMENT ACCEPT message (i.e. the Direct Communication Accept message) is set to the user info ID of the target 5G ProSe end UE if the 5G ProSe direct link establishment procedure is for 5G ProSe direct communication between the 5G ProSe end UE and the 5G ProSe UE-to-UE relay UE. In general, the relay UE could send the $1^{st}$ hop DCA message including only one user info of either the first target end UE or the second target end UE since such source user info IE of the PROSE DIRECT LINK ESTABLISHMENT ACCEPT message is specified for indicating only one user info ID or one application layer ID. For example, the $1^{st}$ hop DCA message may include the user info of the first target end UE. Since the second target end UE also participates the U2U relay communication with the source end UE via the relay UE, the relay UE may additionally initiate e.g. a link modification procedure with the source end UE to modify the $1^{st}$ hop PC5 link for adding the second target end UE.

Figure 20A:
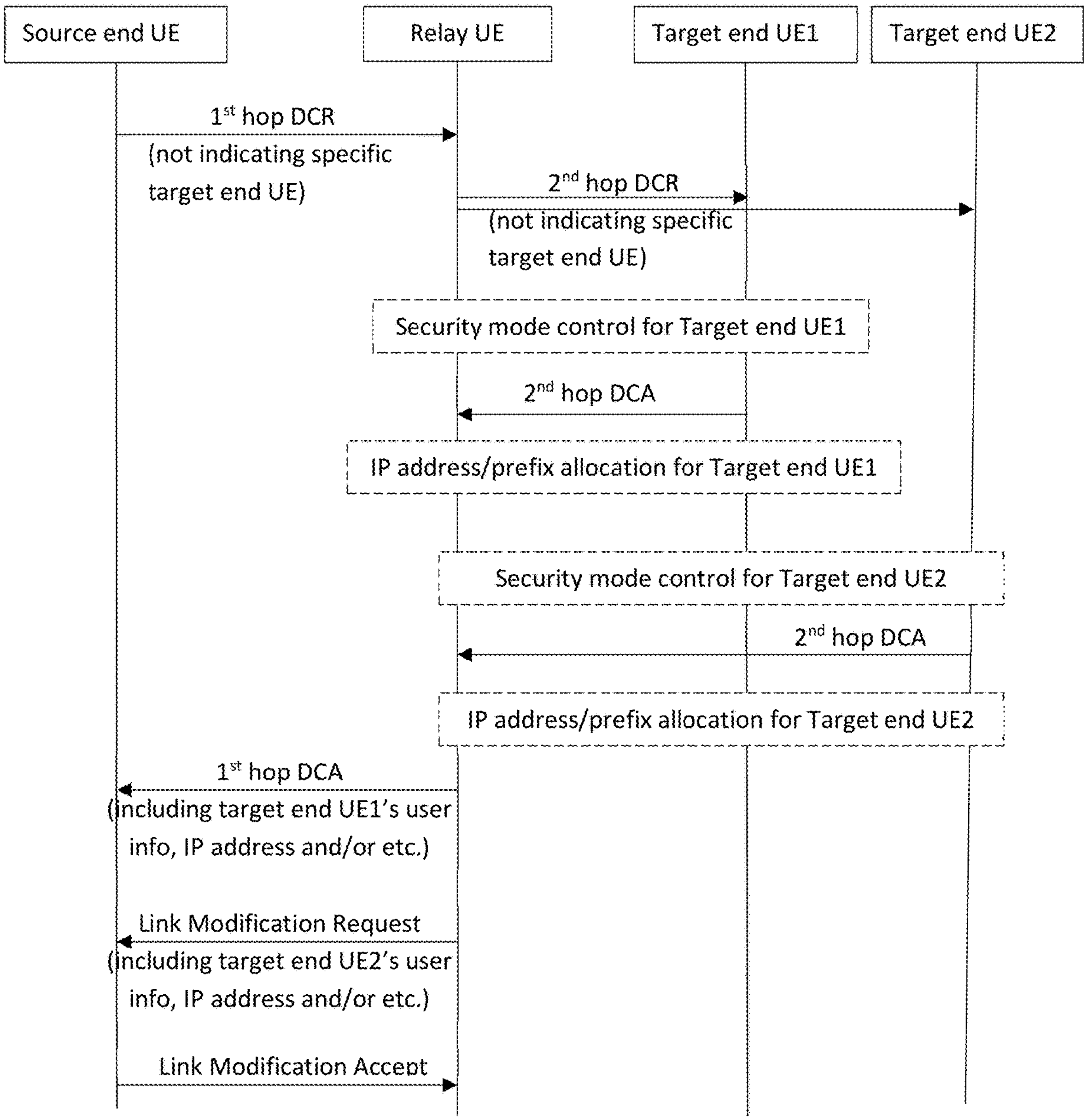
FIG. 20A is a message chart diagram according to one exemplary embodiment.

In addition, the bullet h) in clause 7.2.2.3 of 3GPP TS 24.554 is specified for the relay UE to include a target 5G ProSe layer-3 end UE IP address IE set to the IP address of the target 5G ProSe layer-3 end UE in the PROSE DIRECT LINK ESTABLISHMENT ACCEPT message, if the 5G ProSe direct link establishment procedure is for 5G ProSe direct communication between the source 5G ProSe layer-3 end UE and the 5G ProSe layer-3 UE-to-UE relay UE, and the data unit type for the communication is IP. Similarly, following above examples, the relay UE may also include an IP address of the first target end UE in the $1^{st}$ hop DCA message. The relay UE may need to initiate the link modification procedure with the source end UE to modify the $1^{st}$ hop PC5 link to add the second target end UE together with an IP address of the second target end UE. The concept could be illustrated in FIG. 20A.

Figure 20B:
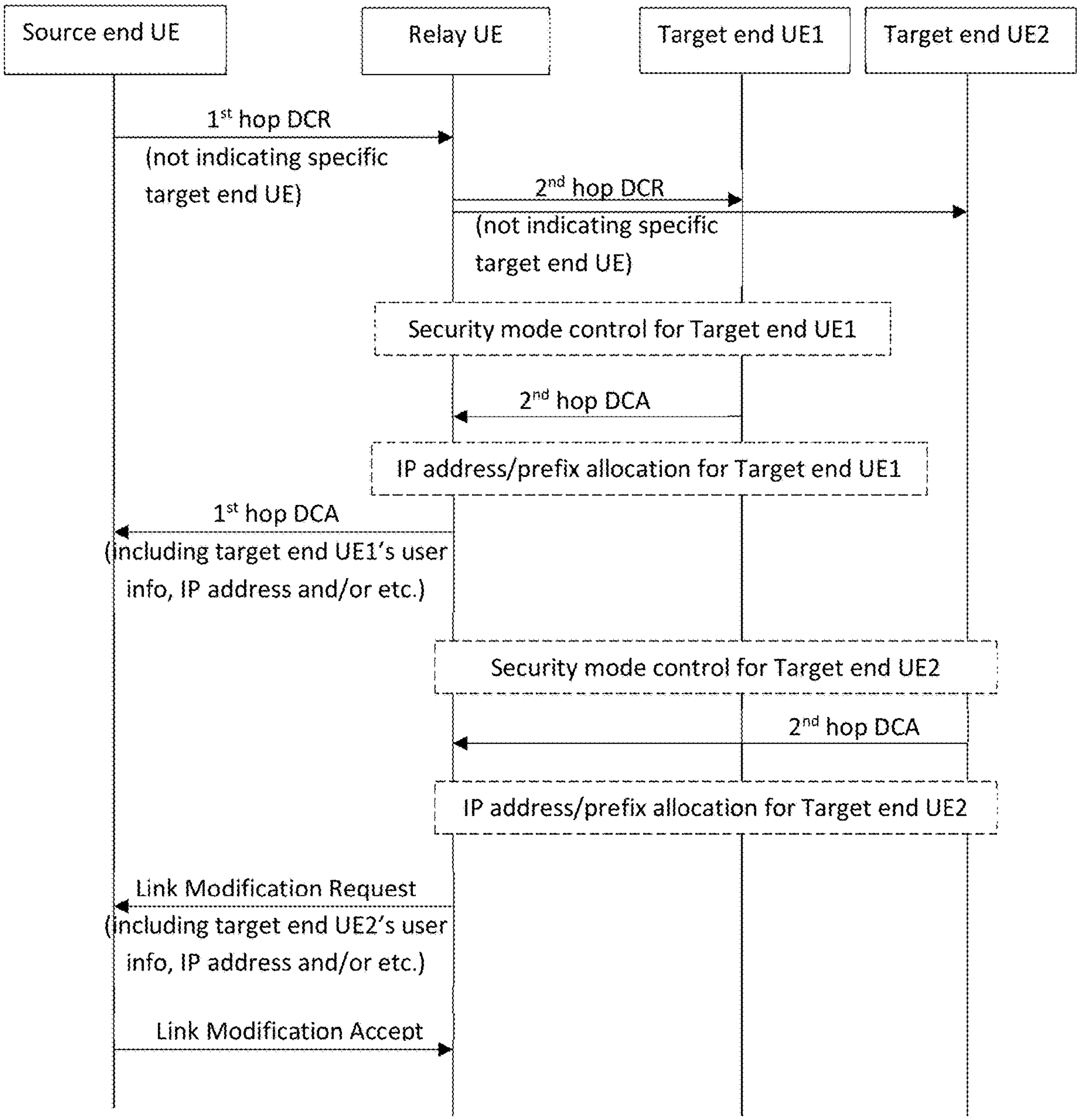
FIG. 20B is a message chart diagram according to one exemplary embodiment.

Alternatively, FIG. 20B could illustrate that the first target end UE could send the first $2^{nd}$ hop DCA message to the relay UE for completing establishment of the first $2^{nd}$ hop PC5 link. In response to reception of the first $2^{nd}$ hop DCA message, the relay UE may respond a $1^{st}$ hop DCA message to the source end UE. The relay UE could also receive the second $2^{nd}$ hop DCA message from the second target end UE for completing establishment of the second $2^{nd}$ hop PC5 link. Since the second target end UE also participates the U2U relay communication with the source end UE via the relay UE, the relay UE may additionally initiate e.g. a link modification procedure with the source end UE to modify the $1^{st}$ hop PC5 link for adding the second target end UE.

In terms of latency and signalling overhead reduction, it would be beneficial for the relay UE to indicate/include the user info of the second target end UE in addition to the user info of the first target end UE in the $1^{st}$ hop DCA message and thus the source end UE by receiving the $1^{st}$ hop DCA message could understand the $1^{st}$ hop PC5 link is established to communicate with both the first target end UE and the second target end UE via the relay UE. The relay UE could also include the IP address of the first target end UE and the IP address of the second target end UE to be used for communication with the source end UE in the $1^{st}$ hop DCA message.

Thus, the source user info IE in PROSE DIRECT LINK ESTABLISHMENT ACCEPT message could be further specified and thus to include one or more application layer IDs or user info IDs of target 5G ProSe end UEs. Alternatively, a new IE (which is different from the existing source user info IE) in PROSE DIRECT LINK ESTABLISHMENT ACCEPT message could be specified for the case of U2U relay communication and thus to include one or more application layer IDs or user info IDs of target 5G ProSe end UEs.

It is also possible that the PROSE DIRECT LINK ESTABLISHMENT ACCEPT message could be further specified as to include one or more application layer IDs or user info IDs of target 5G ProSe end UEs. The existing source user info IE may be set to the one or more application layer IDs or user info IDs of target 5G ProSe end UEs. Alternatively, a new IE (which is different from the existing source user info IE) in PROSE DIRECT LINK ESTABLISHMENT ACCEPT message could be specified and set to the one or more application layer IDs or user info IDs of target 5G ProSe end UEs. In this manner, the existing source user info IE may be set to e.g. zero "0". The source end UE may ignore the existing source user info IE in the $1^{st}$ hop DCA message. Alternatively, the existing source user info IE may be set to one of the one or more application layer IDs or user info IDs of target 5G ProSe end UEs, and the new IE may be set to remaining part of the one or more application layer IDs or user info IDs of target 5G ProSe end UEs. For example, the existing source user info IE may be set to application layer ID or user info ID of the first target end UE, and the new IE may be set to application layer ID or user info ID of the second target end UE.

Furthermore, the target 5G ProSe layer-3 end UE IP address IE or similar purpose IE in PROSE DIRECT LINK ESTABLISHMENT ACCEPT message could be specified to include one or more IP addresses of target 5G ProSe end UEs.

Figure 21:
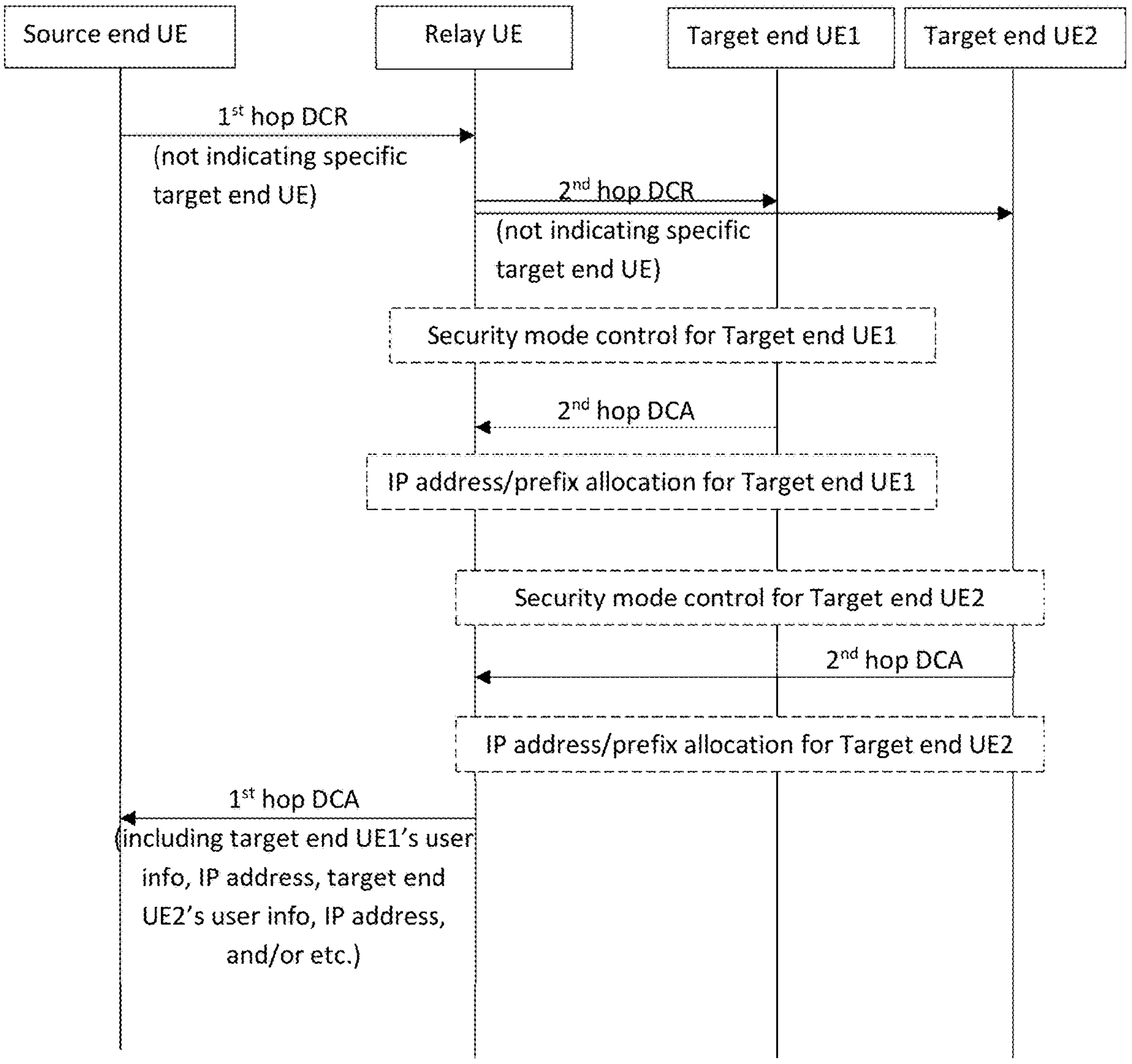
FIG. 21 is a message chart diagram according to one exemplary embodiment.

The above solutions could be illustrated in FIG. 21.

More specifically, said PC5 link could be a PC5 connection, unicast link, direct link, layer-2 link, and/or etc.

More specifically, said source end UE could be a source 5G ProSe End UE.

More specifically, said target end UE could be a target 5G ProSe End UE.

More specifically, said relay UE could be a 5G ProSe UE-to-UE relay UE.

More specifically, said user info could be a user info ID, application layer ID or a upper layer ID.

More specifically, the $1^{st}$ hop DCR message could be sent by using a source layer-2 ID of the source end UE and a destination layer-2 ID. The destination layer-2 ID could be a broadcast layer-2 ID associated with the relay service code or the connectivity service or could be used for link establishment procedure with integrated discovery.

More specifically, the $2^{nd}$ hop DCR message could be sent by using a source layer-2 ID of the relay UE and a destination layer-2 ID. The destination layer-2 ID could be a broadcast layer-2 ID associated with the relay service code or the connectivity service or could be used for link establishment procedure with integrated discovery.

More specifically, the first $2^{nd}$ hop DCA message could be sent by using a layer-2 ID of the first target end UE as Source and a layer-2 ID of the relay UE as Destination.

More specifically, the second $2^{nd}$ hop DCA message could be sent by using a layer-2 ID of the second target end UE as Source and a layer-2 ID of the relay UE as Destination.

More specifically, the $1^{st}$ hop DCA message could be sent by using a layer-2 ID of the relay UE as Source and a layer-2 ID of the source end UE as Destination.

Figure 23:
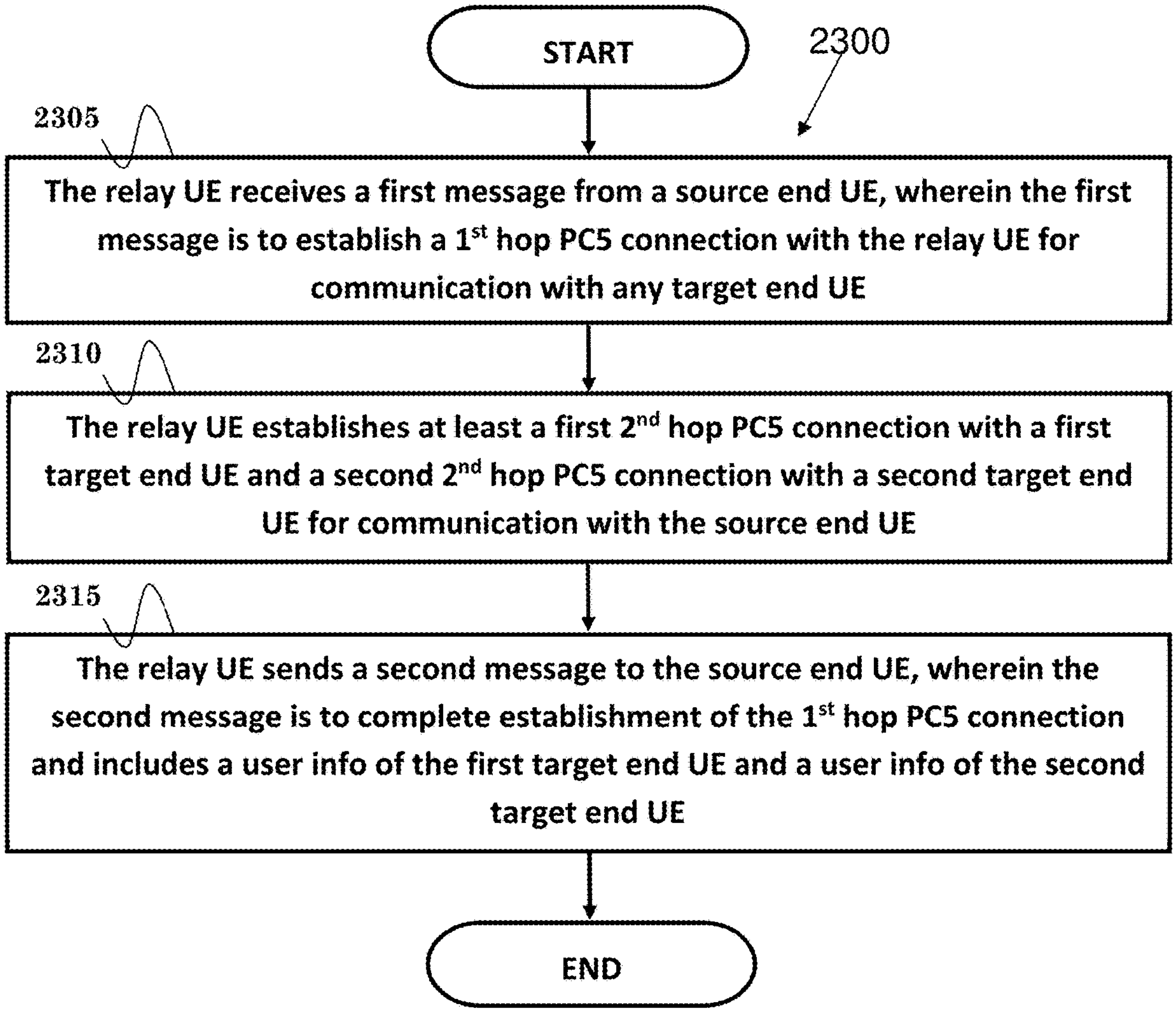
FIG. 23 is a flow chart according to one exemplary embodiment.

FIG. 23 is a flow chart 2300 of a method for a relay UE. In step 2305, the relay UE receives a first message from a source end UE, wherein the first message is to establish a $1^{st}$ hop PC5 connection with the relay UE for communication with any target end UE. In step 2310, the relay UE establishes at least a first $2^{nd}$ hop PC5 connection with a first target end UE and a second $2^{nd}$ hop PC5 connection with a second target end UE for communication with the source end UE. In step 2315, the relay UE sends a second message to the source end UE, wherein the second message is to complete establishment of the $1^{st}$ hop PC5 connection and includes a user info of the first target end UE and a user info of the second target end UE.

In one embodiment, the relay UE could send a third message in response to reception of the first message, wherein the third message is to establish $2^{nd}$ hop PC5 connection with any target end UE for communication with the source end UE. The relay UE could receive a fourth message from the first target end UE, wherein the fourth message is to complete establishment of the first $2^{nd}$ hop PC5 connection with the relay UE for communication with the source end UE. The relay UE could receive a fifth message from the second target end UE, wherein the fifth message is to complete establishment of the second $2^{nd}$ hop PC5 connection with the relay UE for communication with the source end UE.

In one embodiment, the first message may include a user info of the source end UE, a user info of the relay UE, a relay service code, and/or etc. and includes no user info of any target end UE. The second message may include the user info of the source end UE, the user info of the relay UE, the relay service code, a IP address of the first target end UE, a IP address of the second target end UE, and/or etc. The third message may include the user info of the source end UE, the user info of the relay UE, the relay service code, and/or etc. and includes no user info of any target end UE. The fourth message may include the user info of the source end UE, the user info of the relay UE, the relay service code, the user info of the first target end UE, and/or etc. The fifth message may include the user info of the source end UE, the user info of the relay UE, the relay service code, the user info of the second target end UE, and/or etc.

In one embodiment, the first/third message may be a Direct Communication Request message or a PROSE DIRECT LINK ESTABLISHMENT REQUEST message. The second/fourth/fifth message may be a Direct Communication Accept message or a PROSE DIRECT LINK ESTABLISHMENT Accept message.

In one embodiment, the user info may be a user info ID or an application layer ID.

Referring back to FIGS. 3 and 4, in one exemplary embodiment from the perspective of a relay UE, the relay UE 300 includes a program code 312 stored in the memory 310. The CPU 308 could execute program code 312 to enable the relay UE (i) to receive a first message from a source end UE, wherein the first message is to establish a $1^{st}$ hop PC5 connection with the relay UE for communication with any target end UE, (ii) to establish at least a first $2^{nd}$ hop PC5 connection with a first target end UE and a second $2^{nd}$ hop PC5 connection with a second target end UE for communication with the source end UE, and (iii) to send a second message to the source end UE, wherein the second message is to complete establishment of the $1^{st}$ hop PC5 connection and includes a user info of the first target end UE and a user info of the second target end UE. Furthermore, the CPU 308 can execute the program code 312 to perform all of the above-described actions and steps or others described herein.

Figure 22:
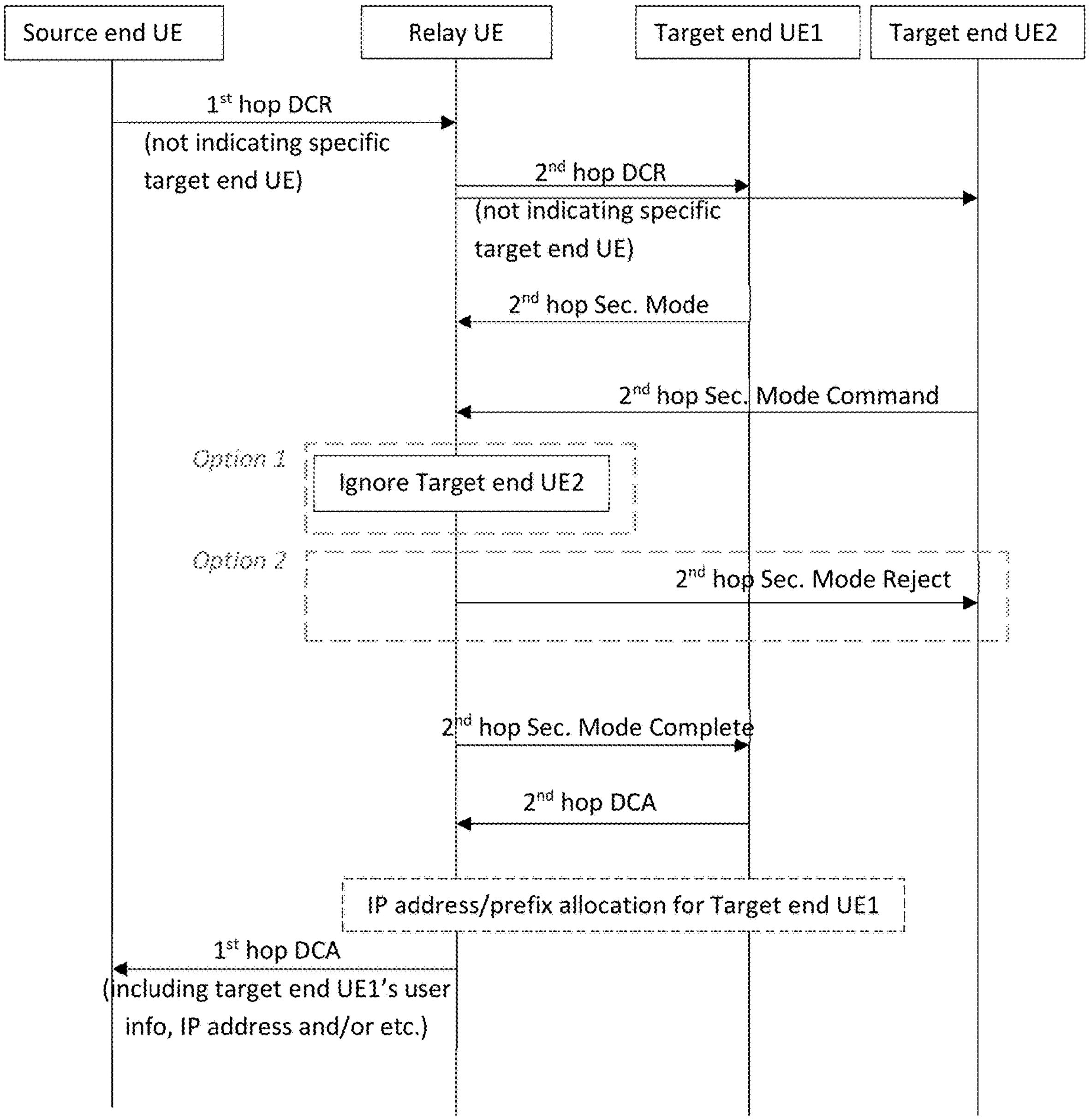
FIG. 22 is a message chart diagram according to one exemplary embodiment.

Alternatively, given the link establishment procedure with integrated discovery initiated by the source end UE, the relay UE may be limited to accept one target end UE for this source end UE. If the relay UE may first (start to) perform a first security context establishment with the first target end UE, the relay UE may not (additionally) perform a second security context establishment with the second target end UE. For example, in the first security context establishment, the relay UE could receive a first security mode command message from the first target end UE for establishing a first security context for the first $2^{nd}$ hop PC5 link. The relay UE could then send a first security mode complete message to the first target end UE for completing the first security context establishment. In the second security context establishment, the relay UE could receive a second security mode command message from the second target end UE for establishing a second security context for the second $2^{nd}$ hop PC5 link. Since the relay UE has received/accepted the first security mode command message, the relay UE could respond a reject message corresponding to the second security mode command message to the second target end UE. Instead of sending the reject message, the relay UE may (just) discard/ignore the second security mode command message received from the second target end UE. This concept could be illustrated in FIG. 22.

It is also feasible for the relay UE to make decision performing the first security context establishment or the second security context establishment after receiving the first security mode command message and the second security mode command message. The decision could be made based on e.g. channel quality and/or etc. For example, based on the reception of the first security mode command message, the relay UE could measure channel quality between the relay UE and the first target end UE; and based on the reception of the second security mode command message, the relay UE could measure channel quality between the relay UE and the second target end UE. If the channel quality between the relay UE and the first target end UE is better than the channel quality between the relay UE and the second target end UE, the relay UE could then perform the first security context establishment with the first target end UE (and reject/ignore the second security context establishment with the second target end UE). Otherwise (i.e. if the channel quality between the relay UE and the second target end UE is better), the relay UE could then perform the second security context establishment with the second target end UE (and reject/ignore the first security context establishment with the first target end UE).

An example of text proposal on top of 3GPP TS 24.554 is provided below. It is noted that "ongoing 5G ProSe direct link security mode control procedure" could mean that from the target UE of the security mode control procedure perspective the target UE could consider the security mode control procedure is still ongoing till the DCA message from the initiating UE of the security mode control procedure is received.

7.2.10.3 5G ProSe direct link security mode control procedure accepted by the target UE

[ . . . ]

The target UE shall determine whether or not the PROSE DIRECT LINK SECURITY MODE COMMAND message can be accepted by:

a) checking that the selected security algorithms IE in the PROSE DIRECT LINK SECURITY MODE COMMAND message does not include the null integrity protection algorithm if the target UE's 5G ProSe direct signalling integrity protection policy is set to "Signalling integrity protection required";
b) asking the lower layers to check the integrity of the PROSE DIRECT LINK SECURITY MODE COMMAND message using NRPIK (or $K_{relay\text{-}int}$ when applicable) and the selected integrity protection algorithm, if the selected integrity protection algorithm is not the null integrity protection algorithm;
c) checking that the received UE security capabilities have not been altered compared to the values that the target UE sent to the initiating UE in the PROSE DIRECT LINK -continued

| 7.2.10.3 5G ProSe direct link security mode control procedure accepted by the target UE |
|---|
| ESTABLISHMENT REQUEST message or PROSE DIRECT LINK REKEYING REQUEST message; [ . . . ]<br>d) if the 5G ProSe direct link security mode control procedure was triggered during a 5G ProSe direct link establishment procedure,<br>1) checking that the received UE 5G ProSe direct signalling security policy has not been altered compared to the values that the target UE sent to the initiating UE in the PROSE DIRECT LINK ESTABLISHMENT REQUEST message; and<br>2) checking that the LSB of $K_{NRP\text{-}sess}$ ID included in the PROSE DIRECT LINK SECURITY MODE COMMAND message are not set to the same value as those received from another UE in response to the target UE's PROSE DIRECT LINK ESTABLISHMENT REQUEST message; ~~and~~<br>e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms IE in the PROSE DIRECT LINK SECURITY MODE COMMAND message do not include the null integrity protection algorithm; and<br>f) if the target UE is acting as a 5G ProSe UE-to-UE relay UE and the 5G ProSe direct link security mode control procedure was triggered during a 5G ProSe direct link establishment procedure for direct communication between the 5G ProSe UE-to-UE relay UE and target 5G ProSe end UE with integrated discovery,<br>1) checking that there is no ongoing 5G ProSe direct link security mode control procedure during the 5G ProSe direct link establishment procedure for direct communication between the 5G ProSe UE-to-UE relay UE and target 5G ProSe end UE with integrated discovery; and<br>2) checking that there is no 5G ProSe direct link established between the 5G ProSe UE-to-UE relay UE and a target 5G ProSe end UE in the 5G ProSe direct link establishment procedure for direct communication between the 5G ProSe UE-to-UE relay UE and target 5G ProSe end UE with integrated discovery.<br>NOTE: The target UE may receive multiple PROSE DIRECT LINK SECURITY MODE COMMAND messages from target 5G ProSe end UEs and select one of the target 5G ProSe end UEs for performing the 5G ProSe direct link security mode control procedure. |

Another example of text proposal on top of 3GPP TS 24.554 is provided below. It is noted that in the following text proposal "yyy" could be replaced with an integer and "Target 5G ProSe end UE sought" could be replaced with another wording e.g. "the target UE does not continue the procedure". It may be also feasible to reuse the existing cause value e.g. #5 or #111 in the reject message.

| 7.2.10.5 5G ProSe direct link security mode control procedure not accepted by the target UE |
|---|
| If the PROSE DIRECT LINK SECURITY MODE COMMAND message cannot be accepted, the target UE shall send a PROSE DIRECT LINK SECURITY MODE REJECT message and the target UE shall abort the ongoing procedure that triggered the initiation of the 5G ProSe direct link security mode control procedure unless the ongoing procedure is a 5G ProSe direct link establishment procedure and the Target user info is not included in the PROSE DIRECT LINK ESTABLISHMENT REQUEST message. The PROSE DIRECT LINK SECURITY MODE REJECT message contains a PC5 signalling protocol cause IE indicating one of the following cause values:<br>#5: lack of resources for 5G ProSe direct link;<br>#7: integrity failure;<br>#8: UE security capabilities mismatch;<br>#9: LSB of $K_{NRP\text{-}sess}$ ID conflict;<br>#10: UE PC5 unicast signalling security policy mismatch;<br>#14: Authentication synchronisation error; ~~or~~<br>#yyy: Target 5G ProSe end UE sought; or<br>#111: protocol error, unspecified.<br>[ . . . ]<br>If this 5G ProSe direct link security mode control procedure is triggered during the 5G ProSe direct link establishment procedure for direct communication between the 5G ProSe UE-to-UE relay UE and target 5G ProSe end UE with integrated discovery, then the target UE shall send a PROSE DIRECT LINK SECURITY MODE REJECT message containing PC5 signalling protocol cause value #yyy "Target 5G ProSe end UE sought". |

Figure 24:
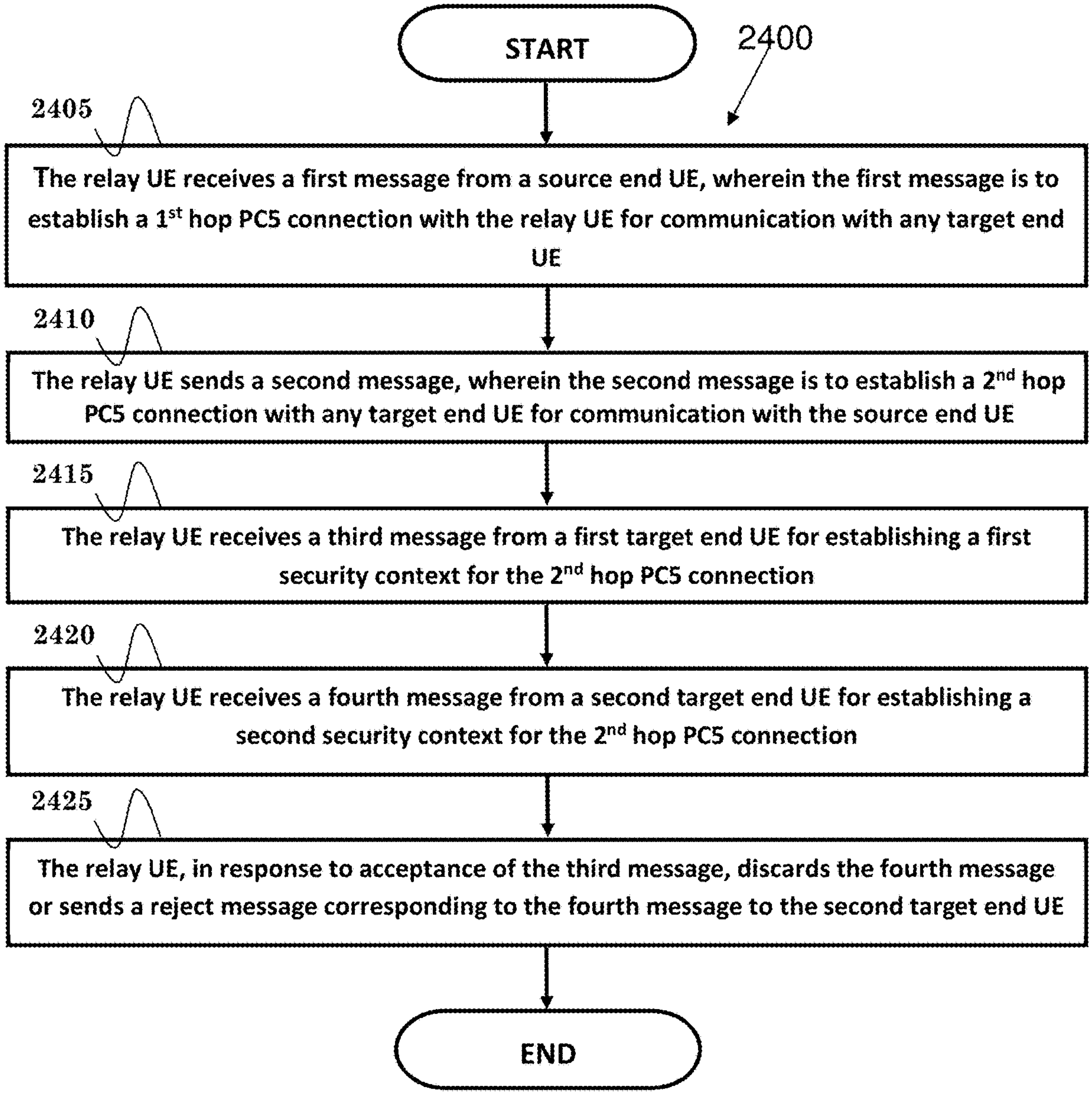
FIG. 24 is a flow chart according to one exemplary embodiment.

FIG. 24 is a flow chart 2400 of a method for a relay UE. In step 2405, the relay UE receives a first message from a source end UE, wherein the first message is to establish a 1$^{st}$ hop PC5 connection with the relay UE for communication with any target end UE. In step 2410, the relay UE sends a second message, wherein the second message is to establish a 2$^{nd}$ hop PC5 connection with any target end UE for communication with the source end UE. In step 2415, the relay UE receives a third message from a first target end UE for establishing a first security context for the $2^{nd}$ hop PC5 connection. In step 2420, the relay UE receives a fourth message from a second target end UE for establishing a second security context for the $2^{nd}$ hop PC5 connection. In step 2425, the relay UE, in response to acceptance of the third message, discards the fourth message or sends a reject message corresponding to the fourth message to the second target end UE.

In one embodiment, the relay UE could send a fifth message corresponding to the third message to the first target end UE, wherein the fifth message is to complete the establishment of the first security context. The relay UE could receive a sixth message from the first target end UE for completing the establishment of the $2^{nd}$ hop PC5 connection. The relay UE could send a seventh message to the source end UE for completing the establishment of the $1^{st}$ hop PC5 connection.

In one embodiment, the first message may include at least one of a user info of the source end UE, a user info of the relay UE, a relay service code and/or etc. and includes no user info of any target end UE. The second message may include at least one of the user info of the source end UE, a user info of the relay UE, the relay service code and/or etc. and includes no user info of any target end UE. The sixth message may include at least a user info of the first target end UE. The seventh message may include at least the user info of the first target end UE.

In one embodiment, the first/second message may be a Direct Communication Request message or a PROSE DIRECT LINK ESTABLISHMENT REQUEST message. The sixth/seventh message may be a Direct Communication Accept message or a PROSE DIRECT LINK ESTABLISHMENT ACCEPT message. The third/fourth message may be a Security Mode Command message or a PROSE DIRECT LINK SECURITY MODE COMMAND message. The fifth message may be a Security Mode Complete message or a PROSE DIRECT LINK SECURITY MODE COMPLETE message.

In one embodiment, the reject message may be a Security Mode Reject message or a PROSE DIRECT LINK SECURITY MODE REJECT message. In one embodiment, the user info may be a user info ID or an application layer ID.

Referring back to FIGS. 3 and 4, in one exemplary embodiment from the perspective of a relay UE, the relay UE 300 includes a program code 312 stored in the memory 310. The CPU 308 could execute program code 312 to enable the relay UE (i) to receive a first message from a source end UE, wherein the first message is to establish a $1^{st}$ hop PC5 connection with the relay UE for communication with any target end UE, (ii) to send a second message, wherein the second message is to establish a $2^{nd}$ hop PC5 connection with any target end UE for communication with the source end UE, (iii) to receive a third message from a first target end UE for establishing a first security context for the $2^{nd}$ hop PC5 connection, (iv) to receives a fourth message from a second target end UE for establishing a second security context for the $2^{nd}$ hop PC5 connection, and (v) to discard, in response to acceptance of the third message, the fourth message or send a reject message corresponding to the fourth message to the second target end UE. Furthermore, the CPU 308 can execute the program code 312 to perform all of the above-described actions and steps or others described herein.

Figure 25:
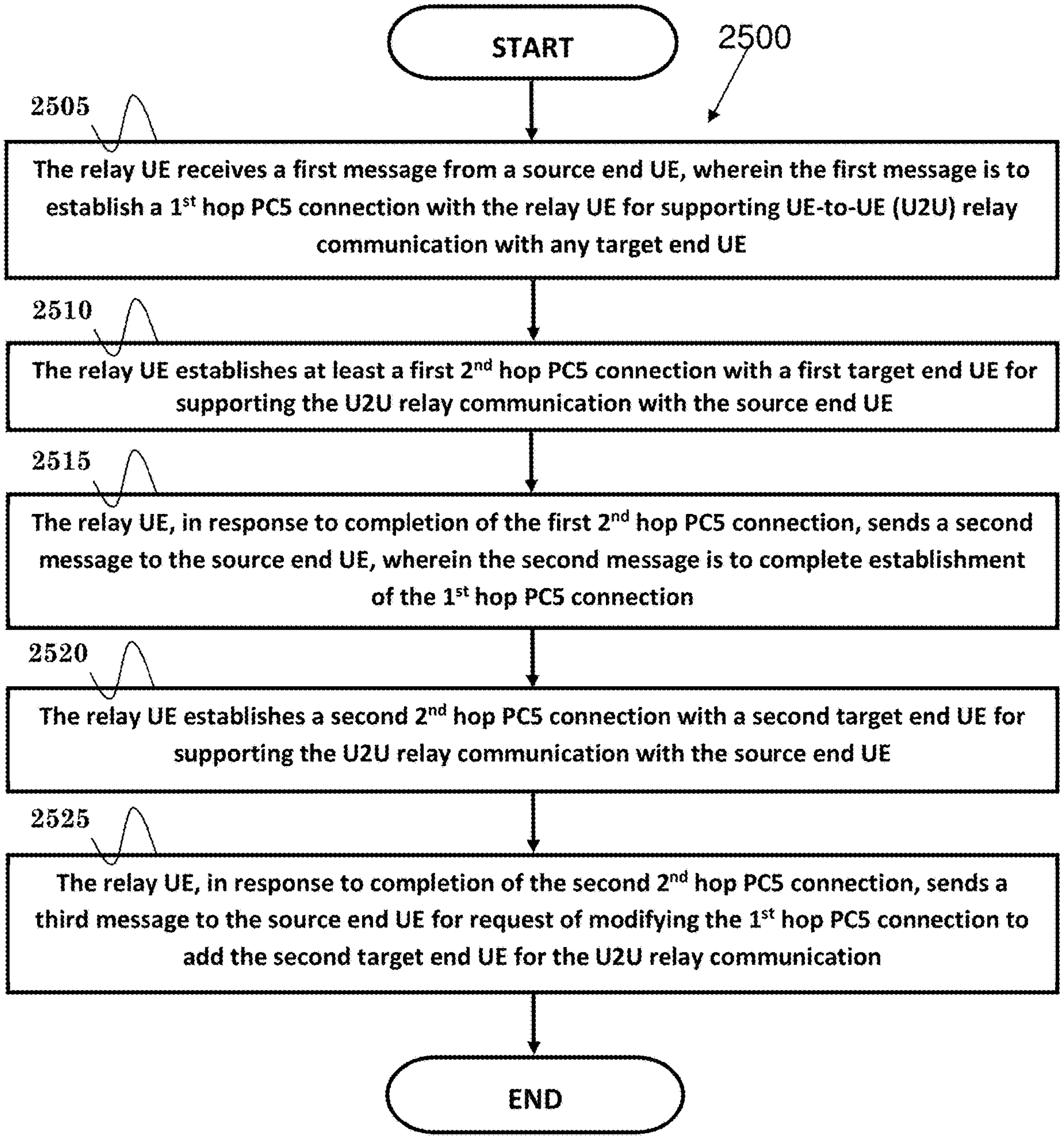
FIG. 25 is a flow chart according to one exemplary embodiment.

FIG. 25 is a flow chart 2500 of a method for a relay UE. In step 2505, the relay UE receives a first message from a source end UE, wherein the first message is to establish a $1^{st}$ hop PC5 connection with the relay UE for supporting UE-to-UE (U2U) relay communication with any target end UE. In step 2510, the relay UE establishes at least a first $2^{nd}$ hop PC5 connection with a first target end UE for supporting the U2U relay communication with the source end UE. In step 2515, the relay UE, in response to completion of the first $2^{nd}$ hop PC5 connection, sends a second message to the source end UE, wherein the second message is to complete establishment of the $1^{st}$ hop PC5 connection. In step 2520, the relay UE establishes a second $2^{nd}$ hop PC5 connection with a second target end UE for supporting the U2U relay communication with the source end UE. In step 2525, the relay UE, in response to completion of the second $2^{nd}$ hop PC5 connection, sends a third message to the source end UE for request of modifying the $1^{st}$ hop PC5 connection to add the second target end UE for the U2U relay communication.

In one embodiment, the first message may include no user info of any target end UE. The second message may include the user info of the source end UE, the user info of the relay UE, the relay service code, a user info of the first target end UE. The third message may include a user info of the second target end UE.

In one embodiment, first message may be a Direct Communication Request message or a PROSE DIRECT LINK ESTABLISHMENT REQUEST message, the second message is a Direct Communication Accept message or a PROSE DIRECT LINK ESTABLISHMENT ACCEPT message, and the third message is a Link Modification Request message or a PROSE DIRECT LINK MODIFICATION REQUEST message.

Referring back to FIGS. 3 and 4, in one exemplary embodiment from the perspective of a relay UE, the relay UE 300 includes a program code 312 stored in the memory 310. The CPU 308 could execute program code 312 to enable the relay UE (i) to receive a first message from a source end UE, wherein the first message is to establish a $1^{st}$ hop PC5 connection with the relay UE for supporting UE-to-UE (U2U) relay communication with any target end UE, (ii) to establish at least a first $2^{nd}$ hop PC5 connection with a first target end UE for supporting the U2U relay communication with the source end UE, (iii) to send, in response to completion of the first $2^{nd}$ hop PC5 connection, a second message to the source end UE, wherein the second message is to complete establishment of the $1^{st}$ hop PC5 connection and includes a user info of the first target end UE, (iv) to establish a second $2^{nd}$ hop PC5 connection with a second target end UE for supporting the U2U relay communication with the source end UE, and (v) to send, in response to completion of the second $2^{nd}$ hop PC5 connection, a third message to the source end UE for request of modifying the $1^{st}$ hop PC5 connection to add the second target end UE for the U2U relay communication, wherein the third message includes a user info of the second target end UE. Furthermore, the CPU 308 can execute the program code 312 to perform all of the above-described actions and steps or others described herein.

Figure 26:
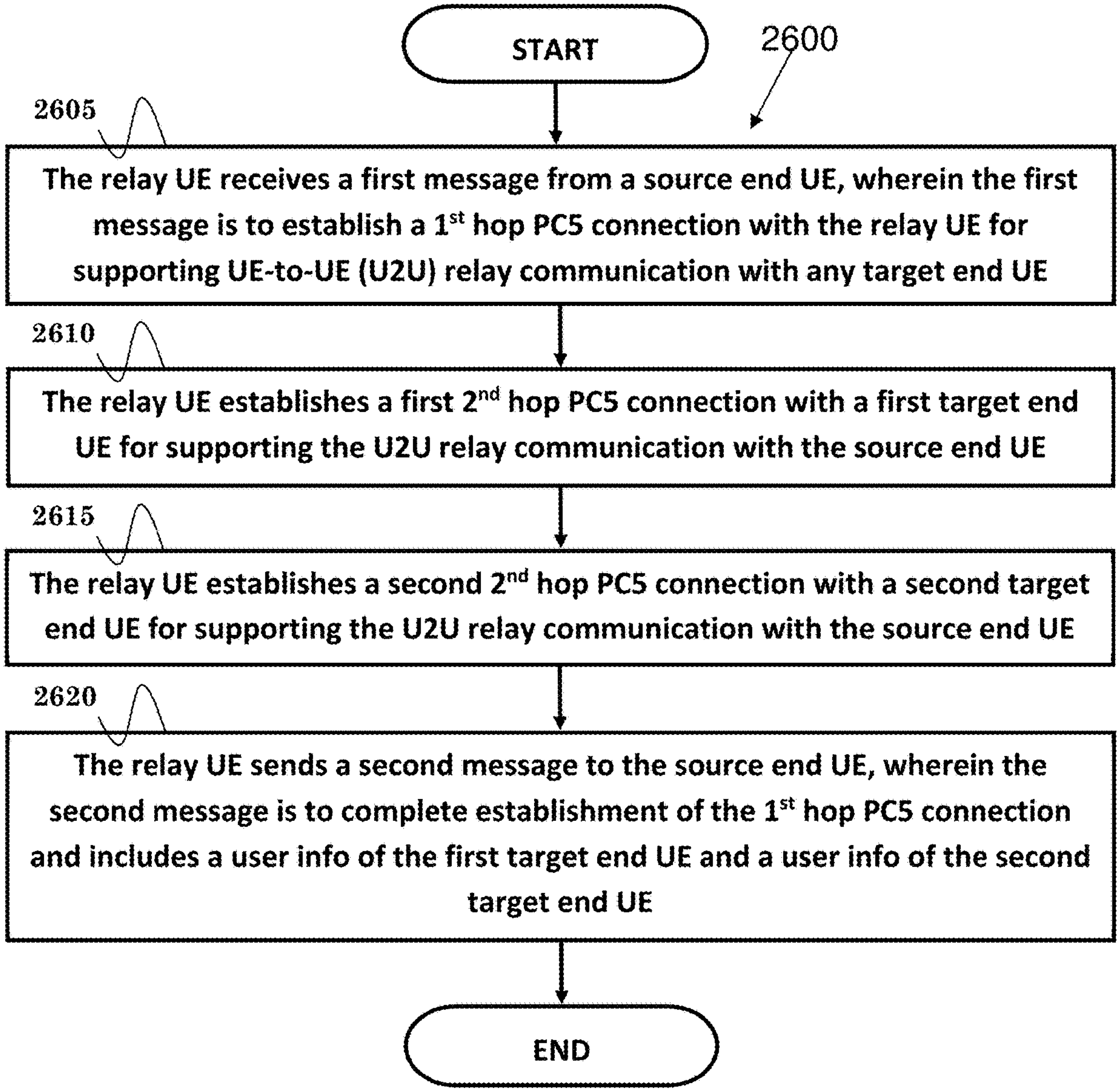
FIG. 26 is a flow chart according to one exemplary embodiment.

FIG. 26 is a flow chart 2600 of a method for a relay UE. In step 2605, the relay UE receives a first message from a source end UE, wherein the first message is to establish a $1^{st}$ hop PC5 connection with the relay UE for supporting UE-to-UE (U2U) relay communication with any target end UE. In step 2610, the relay UE establishes a first $2^{nd}$ hop PC5 connection with a first target end UE for supporting the U2U relay communication with the source end UE. In step 2615, the relay UE establishes a second $2^{nd}$ hop PC5 connection with a second target end UE for supporting the U2U relay communication with the source end UE. In step 2620, the relay UE sends a second message to the source end UE, wherein the second message is to complete establishment of the $1^{st}$ hop PC5 connection and includes a user info of the first target end UE and a user info of the second target end UE.

In one embodiment, the first message may include a user info of the source end UE, a relay service code, and/or etc., and may include no user info of any target end UE. The first message may be a Direct Communication Request message or a PROSE DIRECT LINK ESTABLISHMENT REQUEST message, and the second message may be a Direct Communication Accept message or a PROSE DIRECT LINK ESTABLISHMENT ACCEPT message.

Referring back to FIGS. 3 and 4, in one exemplary embodiment from the perspective of a relay UE, the relay UE 300 includes a program code 312 stored in the memory 310. The CPU 308 could execute program code 312 to enable the relay UE (i) to receive a first message from a source end UE, wherein the first message is to establish a $1^{st}$ hop PC5 connection with the relay UE for supporting UE-to-UE (U2U) relay communication with any target end UE, (ii) to establish a first $2^{nd}$ hop PC5 connection with a first target end UE for supporting the U2U relay communication with the source end UE, (iii) to establish a second $2^{nd}$ hop PC5 connection with a second target end UE for supporting the U2U relay communication with the source end UE, and (iii) to send a second message to the source end UE, wherein the second message is to complete establishment of the $1^{st}$ hop PC5 connection and includes a user info of the first target end UE and a user info of the second target end UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:

the relay UE receives a first message from a source end UE, wherein the first message is to establish a 1$^{st}$ hop PC5 connection with the relay UE for supporting UE-to-UE (U2U) relay communication with any target end UE;

the relay UE establishes at least a first 2$^{nd}$ hop PC5 connection with a first target end UE for supporting the U2U relay communication with the source end UE;

the relay UE, in response to completion of the first 2$^{nd}$ hop PC5 connection, sends a second message to the source end UE, wherein the second message is to complete establishment of the 1$^{st}$ hop PC5 connection;

the relay UE establishes a second 2$^{nd}$ hop PC5 connection with a second target end UE for supporting the U2U relay communication with the source end UE; and the relay UE, in response to completion of the second 2$^{nd}$ hop PC5 connection, sends a third message to the source end UE for request of modifying the 1$^{st}$ hop PC5 connection to add the second target end UE for the U2U relay communication.

2. The method of claim 1, wherein the first message includes no user info of any target end UE.

3. The method of claim 1, wherein the second message includes the user info of the source end UE, the user info of the relay UE, the relay service code, a user info of the first target end UE.

4. The method of claim 1, wherein the third message includes a user info of the second target end UE.

5. The method of claim 1, wherein the first message is a Direct Communication Request message or a PROSE DIRECT LINK ESTABLISHMENT REQUEST message, the second message is a Direct Communication Accept message or a PROSE DIRECT LINK ESTABLISHMENT ACCEPT message, and the third message is a Link Modification Request message or a PROSE DIRECT LINK MODIFICATION REQUEST message.

6. A relay User Equipment (UE), comprising:

a control circuit;

a processor installed in the control circuit; and a memory installed in the control circuit and operatively coupled to the processor;

wherein the processor is configured to execute a program code stored in the memory to:

receive a first message from a source end UE, wherein the first message is to establish a 1$^{st}$ hop PC5 connection with the relay UE for supporting UE-to-UE (U2U) relay communication with any target end UE;

establish at least a first 2$^{nd}$ hop PC5 connection with a first target end UE for supporting the U2U relay communication with the source end UE;

send, in response to completion of the first 2$^{nd}$ hop PC5 connection, a second message to the source end UE, wherein the second message is to complete establishment of the 1$^{st}$ hop PC5 connection;

establish a second 2$^{nd}$ hop PC5 connection with a second target end UE for supporting the U2U relay communication with the source end UE; and send, in response to completion of the second 2$^{nd}$ hop PC5 connection, a third message to the source end UE for request of modifying the 1$^{st}$ hop PC5 connection to add the second target end UE for the U2U relay communication.

7. The relay UE of claim 6, wherein the first message includes no user info of any target end UE.

8. The relay UE of claim 6, wherein the second message includes the user info of the source end UE, the user info of the relay UE, the relay service code, a user info of the first target end UE.

9. The relay UE of claim 6, wherein the third message includes a user info of the second target end UE.

10. The relay UE of claim 6, wherein the first message is a Direct Communication Request message or a PROSE DIRECT LINK ESTABLISHMENT REQUEST message, the second message is a Direct Communication Accept message or a PROSE DIRECT LINK ESTABLISHMENT ACCEPT message, and the third message is a Link Modification Request message or a PROSE DIRECT LINK MODIFICATION REQUEST message.

11. A method for a relay User Equipment (UE), comprising:

the relay UE receives a first message from a source end UE, wherein the first message is to establish a 1$^{st}$ hop PC5 connection with the relay UE for supporting UE-to-UE (U2U) relay communication with any target end UE;

the relay UE establishes a first 2$^{nd}$ hop PC5 connection with a first target end UE for supporting the U2U relay communication with the source end UE;

the relay UE establishes a second 2$^{nd}$ hop PC5 connection with a second target end UE for supporting the U2U relay communication with the source end UE; and the relay UE sends a second message to the source end UE, wherein the second message is to complete establishment of the 1$^{st}$ hop PC5 connection and includes a user info of the first target end UE and a user info of the second target end UE.

12. The method of claim 11, wherein the first message includes a user info of the source end UE, a relay service code, and/or etc. and includes no user info of any target end UE.

13. The method of claim 11, wherein the first message is a Direct Communication Request message or a PROSE DIRECT LINK ESTABLISHMENT REQUEST message, and the second message is a Direct Communication Accept message or a PROSE DIRECT LINK ESTABLISHMENT ACCEPT message.

14. A relay User Equipment (UE), comprising:

a control circuit;

a processor installed in the control circuit; and a memory installed in the control circuit and operatively coupled to the processor;

wherein the processor is configured to execute a program code stored in the memory to:

receive a first message from a source end UE, wherein the first message is to establish a $1^{st}$ hop PC5 connection with the relay UE for supporting UE-to-UE (U2U) relay communication with any target end UE;

establish a first $2^{nd}$ hop PC5 connection with a first target end UE for supporting the U2U relay communication with the source end UE;

establish a second $2^{nd}$ hop PC5 connection with a second target end UE for supporting the U2U relay communication with the source end UE; and send a second message to the source end UE, wherein the second message is to complete establishment of the $1^{st}$ hop PC5 connection and includes a user info of the first target end UE and a user info of the second target end UE.

15. The relay UE of claim 14, wherein the first message includes a user info of the source end UE, a relay service code, and/or etc. and includes no user info of any target end UE.

16. The relay UE of claim 14, wherein the first message is a Direct Communication Request message or a PROSE DIRECT LINK ESTABLISHMENT REQUEST message, and the second message is a Direct Communication Accept message or a PROSE DIRECT LINK ESTABLISHMENT ACCEPT message.

* * * * *